US012705678B2

(12) United States Patent
Lee et al.

(10) Patent No.: US 12,705,678 B2
(45) Date of Patent: Aug. 11, 2026

(54) INTELLECTUAL-PROPERTY ANALYSIS PLATFORM

(71) Applicant: Moat Metrics, Inc., Spokane, WA (US)

(72) Inventors: Lewis C. Lee, Atherton, CA (US); Samuel Cameron Fleming, Spokane, WA (US); Adam Parish, Spokane, WA (US); Timothy Seegan, Spokane, WA (US); Rohitasva Dutta, New York, NY (US); Joseph Dumoulin, Spokane, WA (US)

(73) Assignee: Moat Metrics, Inc., Spokane, WA (US)

( * ) Notice: Subject to any disclaimer, the term of this patent is extended or adjusted under 35 U.S.C. 154(b) by 253 days.

(21) Appl. No.: 17/478,640

(22) Filed: Sep. 17, 2021

(65) Prior Publication Data

US 2023/0086930 A1 Mar. 23, 2023

(51) Int. Cl.
*G06Q 50/18* (2012.01)
*G06Q 30/0201* (2023.01)

(52) U.S. Cl.
CPC ....... *G06Q 50/184* (2013.01); *G06Q 30/0201* (2013.01)

(58) Field of Classification Search
CPC ......................... G06Q 50/184; G06Q 30/0201
See application file for complete search history.

(56) References Cited

U.S. PATENT DOCUMENTS 5,754,840 A 5/1998 Rivette et al.
6,175,824 B1 1/2001 Breitzman et al.
6,389,418 B1 5/2002 Boyack et al.
6,556,992 B1 * 4/2003 Barney .................. G06Q 40/06
(Continued)

FOREIGN PATENT DOCUMENTS

CN 105677727 A 6/2016
JP 2004500617 A * 1/2004
(Continued)

OTHER PUBLICATIONS

Peter Cowan "How an innovation and IP value-chain view can transform portfolio value" (2016) (https://www.iam-media.com/article/how-innovation-and-ip-value-chain-view-can-transform-portfolio-value) (Year: 2016).*
(Continued)

*Primary Examiner* — Sujay Koneru
(74) *Attorney, Agent, or Firm* — Lee & Hayes, P.C.

(57) ABSTRACT

Systems and methods for generation and use of intellectual-property (IP) analysis platform architectures are disclosed. A scoring component may be utilized to produce scores for IP assets using user seeded searches in varying areas of interest, such as, for example, target technical fields, targeted publications, targeted products, and/or competitor entity portfolios. The scoring component may be further utilized to produce an interactive graphical element including a spatial representation of the scoring of IP assets. The interactive graphical element may include various functionalities and/or information associated with the of IP assets. The scoring component may utilize data from a coverage component, an opportunity component and/or an exposure component to assess a comprehensive score associated with a group of IP assets of a targeted entity.

15 Claims, 24 Drawing Sheets

(56) References Cited

U.S. PATENT DOCUMENTS 7,346,518 B1* 3/2008 Frank .................... G06Q 99/00 705/310
7,493,262 B2 2/2009 Hagelin
7,546,265 B1 6/2009 Donner
7,606,757 B1 10/2009 Poltorak
7,657,476 B2 2/2010 Barney
7,676,375 B1 3/2010 Neifeld et al.
7,684,965 B2 3/2010 Sekine et al.
7,792,728 B2 9/2010 Poltorak
7,840,460 B2 11/2010 Williams
7,949,581 B2 5/2011 Barney
8,095,581 B2 1/2012 Stobbs et al.
8,121,852 B2 2/2012 Frank et al.
8,145,639 B2 3/2012 Williams
8,145,640 B2 3/2012 Williams
8,160,947 B2 4/2012 Oey
8,161,049 B2 4/2012 Williams
8,341,063 B1 12/2012 Cernyar
8,355,932 B2 1/2013 Malackowski et al.
8,538,794 B2 9/2013 Marko et al.
8,620,800 B1 12/2013 Micaelian
8,650,108 B1 2/2014 Schram et al.
8,924,237 B2 12/2014 Herz et al.
9,075,849 B2 7/2015 Barney
9,251,243 B2 2/2016 Stec
9,305,278 B2 4/2016 Gross et al.
9,633,403 B2* 4/2017 Mohanty ................ G06Q 40/06
9,846,694 B1 12/2017 Cook
10,013,726 B1* 7/2018 Jung .................... G06Q 50/184
10,366,461 B2 7/2019 Edmund et al.
10,528,609 B2 1/2020 Crouse et al.
10,579,651 B1 3/2020 Nagai
10,657,368 B1 5/2020 Edmund
10,755,045 B2 8/2020 Crouse et al.
11,069,011 B1 7/2021 Jung et al.
11,461,862 B2 10/2022 Lundberg
11,509,540 B2 11/2022 Bernardi et al.
11,676,231 B1 6/2023 Crouse et al.
11,861,528 B1 1/2024 Brager
2002/0032659 A1* 3/2002 Waters .................. G06Q 30/02 705/54
2002/0046038 A1 4/2002 Prokoski
2002/0077835 A1 6/2002 Hagelin
2002/0077942 A1* 6/2002 Wilkinson ............. G06Q 40/12 705/30
2002/0099637 A1* 7/2002 Wilkinson ............. G06Q 40/06 705/36 R
2002/0111821 A1 8/2002 Kunikiyo
2002/0178015 A1 11/2002 Zee
2002/0184130 A1 12/2002 Blasko
2003/0036945 A1* 2/2003 Del Vecchio .......... G06Q 10/10 705/310
2004/0181427 A1* 9/2004 Stobbs ................ G06Q 50/184 705/310
2004/0220842 A1 11/2004 Barney
2005/0149420 A1* 7/2005 Hagelin ............... G06Q 50/184 705/35
2005/0209946 A1 9/2005 Ballow et al.
2005/0261927 A1 11/2005 Bilak et al.
2006/0080136 A1* 4/2006 Frank ............... G06Q 10/06313 705/310
2006/0200395 A1 9/2006 Masuyama et al.
2007/0073625 A1* 3/2007 Shelton ................. G06Q 90/00 705/59
2007/0073748 A1 3/2007 Barney
2007/0136206 A1 6/2007 Kwok
2007/0156478 A1 7/2007 Breene et al.
2007/0198320 A1* 8/2007 Lloyd ................... G06Q 30/02 705/7.31
2007/0208669 A1* 9/2007 Rivette ................ G06Q 50/184 705/310
2007/0250487 A1* 10/2007 Reuther ................. G06F 16/35
2007/0276796 A1* 11/2007 Sampson ............. G06F 16/353
2007/0294232 A1* 12/2007 Gibbs .................... G06Q 10/10 707/999.005
2008/0086503 A1 4/2008 Frank et al.
2008/0114668 A1* 5/2008 Peters ................. G06Q 50/184 705/310
2008/0133338 A1 6/2008 Frank et al.
2008/0201187 A1 8/2008 Ng et al.
2008/0249957 A1 10/2008 Masuyama et al.
2009/0037342 A1 2/2009 Kennedy
2009/0259506 A1* 10/2009 Barney ................. G06Q 10/10 705/35
2010/0070522 A1* 3/2010 Nazar ................... G06Q 10/10 715/764
2010/0100491 A1 4/2010 Frank et al.
2010/0131513 A1* 5/2010 Lundberg .............. G06Q 10/10 707/769
2010/0180223 A1* 7/2010 Speier ..................... G06F 16/34 707/769
2010/0191564 A1* 7/2010 Lee .................... G06Q 10/1091 705/310
2010/0250340 A1 9/2010 Lee et al.
2011/0047085 A1 2/2011 Ottosen
2011/0047166 A1* 2/2011 Stading ................ G06F 16/332 707/E17.109
2011/0184884 A1 7/2011 Lyons et al.
2011/0246473 A1 10/2011 Stec
2011/0276396 A1* 11/2011 Rathod .............. G06F 16/2428 707/706
2011/0289096 A1 11/2011 Barney
2012/0010925 A1 1/2012 Mitra
2012/0109642 A1 5/2012 Stobbs et al.
2012/0191757 A1 7/2012 Gross et al.
2012/0278244 A1* 11/2012 Lee ..................... G06Q 50/184 705/310
2013/0085964 A1 4/2013 Marais
2013/0166460 A1 6/2013 Mohanty et al.
2013/0204799 A1 8/2013 Curtis
2013/0282571 A1 10/2013 Lundberg
2013/0339088 A1* 12/2013 Olsen ................ G06Q 30/0202 705/7.31
2013/0346323 A1 12/2013 Lundberg
2014/0075004 A1 3/2014 Van Dusen et al.
2014/0156544 A1 6/2014 Sabattini et al.
2014/0164262 A1 6/2014 Graham
2014/0201193 A1 7/2014 Kim et al.
2014/0258153 A1 9/2014 Lundberg
2014/0279583 A1 9/2014 Surdeanu
2014/0279584 A1 9/2014 Lee et al.
2014/0289675 A1* 9/2014 Stading .............. G06F 16/3331 715/810
2014/0304176 A1 10/2014 Radding et al.
2014/0351252 A1 11/2014 Stec
2014/0368511 A1 12/2014 Baumgartner et al.
2015/0012800 A1* 1/2015 Yang ................ H03M 13/2957 714/769
2015/0026079 A1 1/2015 Walker et al.
2015/0033301 A1 1/2015 Pianese et al.
2015/0178847 A1 6/2015 Tabata et al.
2015/0248738 A1* 9/2015 Pullman ................ G06Q 10/00 705/310
2015/0339605 A1 11/2015 Reville et al.
2015/0347489 A1 12/2015 Sherwin
2016/0004768 A1 1/2016 Barney
2016/0042460 A1 2/2016 Hudak et al.
2016/0048936 A1 2/2016 Perkowski et al.
2016/0148327 A1 5/2016 Buchholz
2016/0314146 A1 10/2016 Carothers et al.
2016/0350886 A1 12/2016 Jessen et al.
2017/0154337 A1 6/2017 Wingate-Whyte et al.
2018/0144421 A1 5/2018 Williams et al.
2018/0189909 A1 7/2018 Zellner et al.
2018/0240209 A1 8/2018 Malherek
2018/0253810 A1* 9/2018 Edmund .............. G06F 40/263
2018/0285996 A1 10/2018 Ma
2018/0300323 A1 10/2018 Lee et al.
2018/0300829 A1 10/2018 Crabtree et al.
2019/0005595 A1 1/2019 Tautenhan et al.
2019/0079979 A1 3/2019 Chan

(56) References Cited

U.S. PATENT DOCUMENTS

| | | | | |
|---|---|---|---|---|
| 2020/0192727 | A1 | 6/2020 | Savenkov et al. | |
| 2020/0301672 | A1 | 9/2020 | Li et al. | |
| 2020/0334773 | A1 | 10/2020 | Spangenberg et al. | |
| 2021/0004918 | A1 | 1/2021 | Lee et al. | |
| 2021/0004919 | A1 | 1/2021 | Lee et al. | |
| 2021/0004920 | A1 | 1/2021 | Lee et al. | |
| 2021/0004921 | A1 | 1/2021 | Lee et al. | |
| 2021/0004922 | A1 | 1/2021 | Lee et al. | |
| 2021/0034960 | A1 | 2/2021 | Khapali et al. | |
| 2021/0044439 | A1 | 2/2021 | Yang | |
| 2021/0056304 | A1* | 2/2021 | Mikami | G06F 40/30 |
| 2021/0201339 | A1 | 7/2021 | Ahlgren et al. | |
| 2021/0350484 | A1 | 11/2021 | Crouse et al. | |
| 2021/0390644 | A1 | 12/2021 | Chen et al. | |
| 2021/0398223 | A1 | 12/2021 | Lee et al. | |
| 2022/0100358 | A1 | 3/2022 | Tobias et al. | |
| 2022/0101464 | A1 | 3/2022 | Lee et al. | |
| 2022/0103586 | A1 | 3/2022 | Shao et al. | |
| 2022/0180317 | A1 | 6/2022 | Andrews | |
| 2022/0245378 | A1 | 8/2022 | Bradley, III | |
| 2022/0292607 | A1 | 9/2022 | Davies et al. | |
| 2023/0032564 | A1 | 2/2023 | Ishii et al. | |
| 2023/0044901 | A1 | 2/2023 | Spangenberg | |
| 2023/0080680 | A1 | 3/2023 | Cochrane et al. | |
| 2023/0086106 | A1 | 3/2023 | Andrews | |
| 2023/0087206 | A1 | 3/2023 | Lee | |
| 2023/0089425 | A1 | 3/2023 | Lee | |
| 2023/0090090 | A1 | 3/2023 | Dutta | |
| 2024/0104419 | A1 | 3/2024 | Meng et al. | |

FOREIGN PATENT DOCUMENTS

| | | | |
|---|---|---|---|
| WO | WO2016157214 | A1 | 10/2016 |
| WO | WO2020072033 | A1 | 4/2020 |
| WO | WO2021003187 | A1 | 1/2021 |

OTHER PUBLICATIONS

The PCT Search Report and Written Opinion mailed Jan. 11, 2023 for PCT application No. PCT/US22/43258, 17 pages.

Office Action for U.S. Appl. No. 17/478,664, mailed on May 26, 2023, Dutta, "Intellectual-Property Analysis Platform ", 27 Pages.

Bringing additional value to your firm, aon webpages, retrieved at <<https://www.aon.com/getmedia/ea62d0de-6fd6-4c89-8cc3-87a605dd3871/Slide-deck-Intellectual-Property-Solutions-Webinar-10-12-2020-gecomprimeerd.aspx>>, 2020, 26 pgs.

Insurance Risk Study, Fourteenth Edition, Global Risk, Profitability, and Growth Metrics, acturialpost co uk, aon plc 2019, retrieved at <<https://www.acturialpost.co.uk/downloads/cat_1/Aon%20Insurance%20Risk%20Study%202019.pdf>>, 18 pgs.

Intellectual Property—Risk Landscape, aon webpages, aon plc 2019, retrieved at <<https://www.aon.com/getmedia/3732fc66-11a9-45a3-911c-b2b33d41d302/Aon_IP-Risk-Landscape-Whitepaper_20190215.aspx, 2019, 8 pgs.

Intellectual Property Solutions for M&A and Market Transactions, aon webpages, aon plc 2019, retrieved at <<https://www.aon.com/getmedia/73c1aed6-b976-4755-902b-c56025449457/IP-for-MA-Transactions-Brochure.aspx>>, 2 pgs.

Office Action for U.S. Appl. No. 17/478,506, mailed on Sep. 21, 2023, Lee, "Intellectual-Property Analysis Platform ", 77 Pages.

Office Action for U.S. Appl. No. 17/478,576, mailed on Oct. 20, 2024, Lee, "Intellectual-Property Analysis Platform", 48 pages.

Office Action for U.S. Appl. No. 17/478,576, mailed on Sep. 19, 2023, Lee, "Intellectual-Property Analysis Platform", 51 pages.

Office Action for U.S. Appl. No. 17/478,603, mailed on Sep. 15, 2023, David Craig Andrews, "Intellectual- Property Analysis Platform", 31 pages.

Office Action for U.S. Appl. No. 17/478,664, mailed on Sep. 20, 2023, Rohitasva Dutta, "Intellectual-Property Analysis Platform", 11 pages.

Realize IP Data, Aon Quality of Intellectual Property Report, Aon webpages, Aon plc 2020, retrieved at <<https://www.aon.comgetmedia/ced6ab71-16b5-49ea-9914-935e5c1f8f2e/Qolp-Brochure_Jan21.pdf.aspx?ext=pdf>>, 2020, 8 pgs.

Unlock the Value of Intellectual Property, aon webpages, aon plc 2020, retrieved at <<https://www.aon.com/getmedia/e39260a9-53c0-4044-bcb9-0c4f0258dfbe/IP-Fund-Brochure-Revisions_non-insurance-version_v03.pdf.aspx>>, 2020, 9 pgs.

Aon launches Quality of Intellectual Property Solution, intelligentinsurer webpages, retrieved at <<https://www.imtelligentinsurer.com/news/aon-launches-quality-of-intellectual-property-solution-24096>>, 2020, 1 pg.

Aon, Intellectual Property Solutions, aon webpages, aon plc 2020, retrieved at <<https://aon-tech.com?jet_download=7121>>, 2020, 2 pgs.

Aon's New Quality of Intellectual Property Solution Helps Companies Realize Full Value of Their IP Portfolio, aon mediaroomwebpages, Nov. 10, 2020, retrieved at <<https://aon.mediaroom.com/2020-11-10-Aons-New-Quality-of-Intellectual-Property-Solution-Helps-Companies_Realize-Full-Value-of-their-IP-Portfolio>>, 2020, 2 pgs.

Office Action for U.S. Appl. No. 17/478,664, mailed on Jun. 5, 2024, Dutta, "Intellectual-Property Analysis Platform ", 11 Pages.

Office Action for U.S. Appl. No. 17/478,506, Dated Jul. 31, 2024, 97 pages.

Office Action for U.S. Appl. No. 17/457,603, mailed on Sep. 20, 2024, Andrews, "Intellectual-Property Analysis Platform", 48 pages.

Office Action for U.S. Appl. No. 17/478,603, dated Feb. 7, 2025, 21 Pages.

Office Action for US Patent Application Feb. 12, 2024, Andrews, "Intellectual-Property Analysis Platform", 39 Pages.

Office Action for U.S. Appl. No. 17/478,664, mailed on Dec. 21, 2023, Dutta, "Intellectual-Property Analysis Platform", 11 Pages.

Office Action for U.S. Appl. No. 17/478,576, mailed on Dec. 27, 2024, Lee, "Intellectual-Property Analysis Platform", 44 pgs.

Office Action for U.S. Appl. No. 17/478,640, mailed on Dec. 28, 2023, Lee, "Intellectual-Property Analysis Platform", 10 pages.

Office Action for U.S. Appl. No. 17/478,576, mailed on Feb. 1, 2024, Lee, "Intellectual-Property Analysis Platform", 48 pages.

Office Action for U.S. Appl. No. 17/478,664, mailed on Feb. 27, 2024, Dutta, "Intellectual-Property Analysis Platform", 12 Pages.

Office Action for U.S. Appl. No. 17/478,506, mailed on Feb. 8, 2024, Lee, "Intellectual-Property Analysis Platform", 92 Pages.

Office Action for U.S. Appl. No. 17/478,576, dated Apr. 11, 2025, 58 Pages.

Office Action for U.S. Appl. No. 17/478,603, dated May 21, 2025, 22 Pages.

Office Action for U.S. Appl. No. 17/478,603, dated Oct. 21, 2025, 10 Pages.

Office Action for U.S. Appl. No. 17/478,576, dated Mar. 6, 2026, 64 Pages.

Office Action for U.S. Appl. No. 17/478,576, dated Nov. 14, 2025, 68 Pages.

* cited by examiner

Figure 10A:
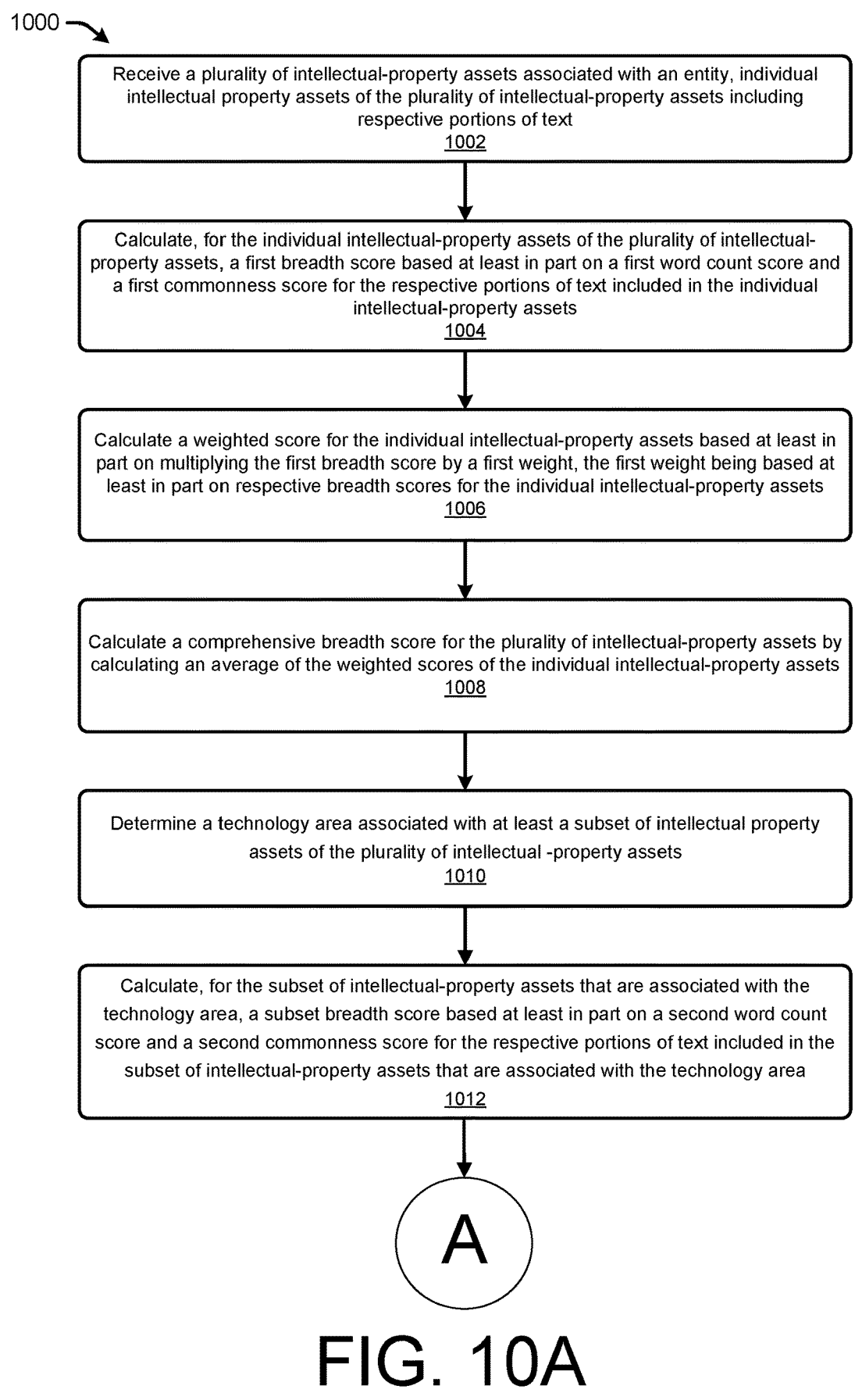

1000

Receive a plurality of intellectual-property assets associated with an entity, individual intellectual property assets of the plurality of intellectual-property assets including respective portions of text
1002

Calculate, for the individual intellectual-property assets of the plurality of intellectual-property assets, a first breadth score based at least in part on a first word count score and a first commonness score for the respective portions of text included in the individual intellectual-property assets
1004

Calculate a weighted score for the individual intellectual-property assets based at least in part on multiplying the first breadth score by a first weight, the first weight being based at least in part on respective breadth scores for the individual intellectual-property assets
1006

Calculate a comprehensive breadth score for the plurality of intellectual-property assets by calculating an average of the weighted scores of the individual intellectual-property assets
1008

Determine a technology area associated with at least a subset of intellectual property assets of the plurality of intellectual -property assets
1010

Calculate, for the subset of intellectual-property assets that are associated with the technology area, a subset breadth score based at least in part on a second word count score and a second commonness score for the respective portions of text included in the subset of intellectual-property assets that are associated with the technology area
1012

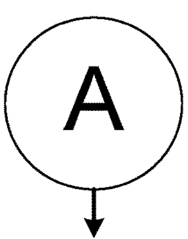

Calculate a subset weighted score for the subset of intellectual-property assets that are associated with the technology area by multiplying individual subset breadth scores by a second weight based at least in part on a value of the respective subset breadth score for individual subset intellectual-property assets that are associated with the technology area
1014

Calculate a technology breadth score for the subset of intellectual-property assets that are associated with the technology area by calculating an average of the individual subset weighted scores
1016

Generate a graphical user interface (GUI) configured to display on a computing device, the GUI including at least one of the comprehensive breadth score or the technology breadth score
1018

Cause the GUI to be displayed via a display of the computing device score
1020

FIG. 10B

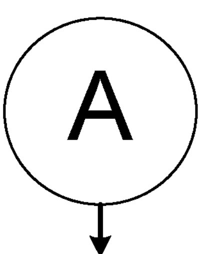

Determine a third number of third intellectual-property assets that are associated with the art unit and filed between a third date and a fourth date, the third date and the fourth date being different from the first date and the second date
1514

Determine a fourth number of fourth intellectual-property assets that are associated with the art unit and filed by the entity between the third date and the fourth date
1516

Generate a second percentile ranking based at least in part on comparing the fourth number of fourth intellectual-property assets filed by the entity to the third number of third intellectual-property assets filed between the third date and the fourth date
1518

Generate a graphical user interface (GUI) configured to display on a computing device, the GUI including the first percentile ranking and the second percentile ranking
1520

Cause the GUI to be displayed via a display of the computing device
1522

FIG. 15B

INTELLECTUAL-PROPERTY ANALYSIS PLATFORM

BACKGROUND

Analyzing an intellectual-property portfolio of a particular entity with respect to one or more entities having a similar intellectual-property portfolio may provide various insights and can be valuable. However, it can be difficult to identify information that can be derived from data that has rarely been analyzed and it can also be challenging to determine which types of data can be utilized to make decisions. Disclosed herein are improvements in technology and solutions to technical problems that can be used to, among other things, analyze and generate visual representations of intellectual-property portfolios of various entities.

BRIEF DESCRIPTION OF THE DRAWINGS

The detailed description is set forth below with reference to the accompanying FIGURES. In the FIGURES, the left-most digit(s) of a reference number identifies the figure in which the reference number first appears. The use of the same reference numbers in different FIGURES indicates similar or identical items. The systems depicted in the accompanying FIGURES are not to scale and components within the FIGURES may be depicted not to scale with each other.

FIG. 10A illustrates an example flow diagram of an example process for analyzing IP assets to generate a user interface configured to present a comprehensive score for the IP assets.

FIG. 10B illustrates an example flow diagram of an example process for analyzing IP assets to generate a user interface configured to present a comprehensive score for the IP assets.

FIG. 15B illustrates an example flow diagram of an example process for generating data representing a percentile ranking with regard to IP asset filing and generating a graphical user interface displaying the result sets.

DETAILED DESCRIPTION

Figure 1:
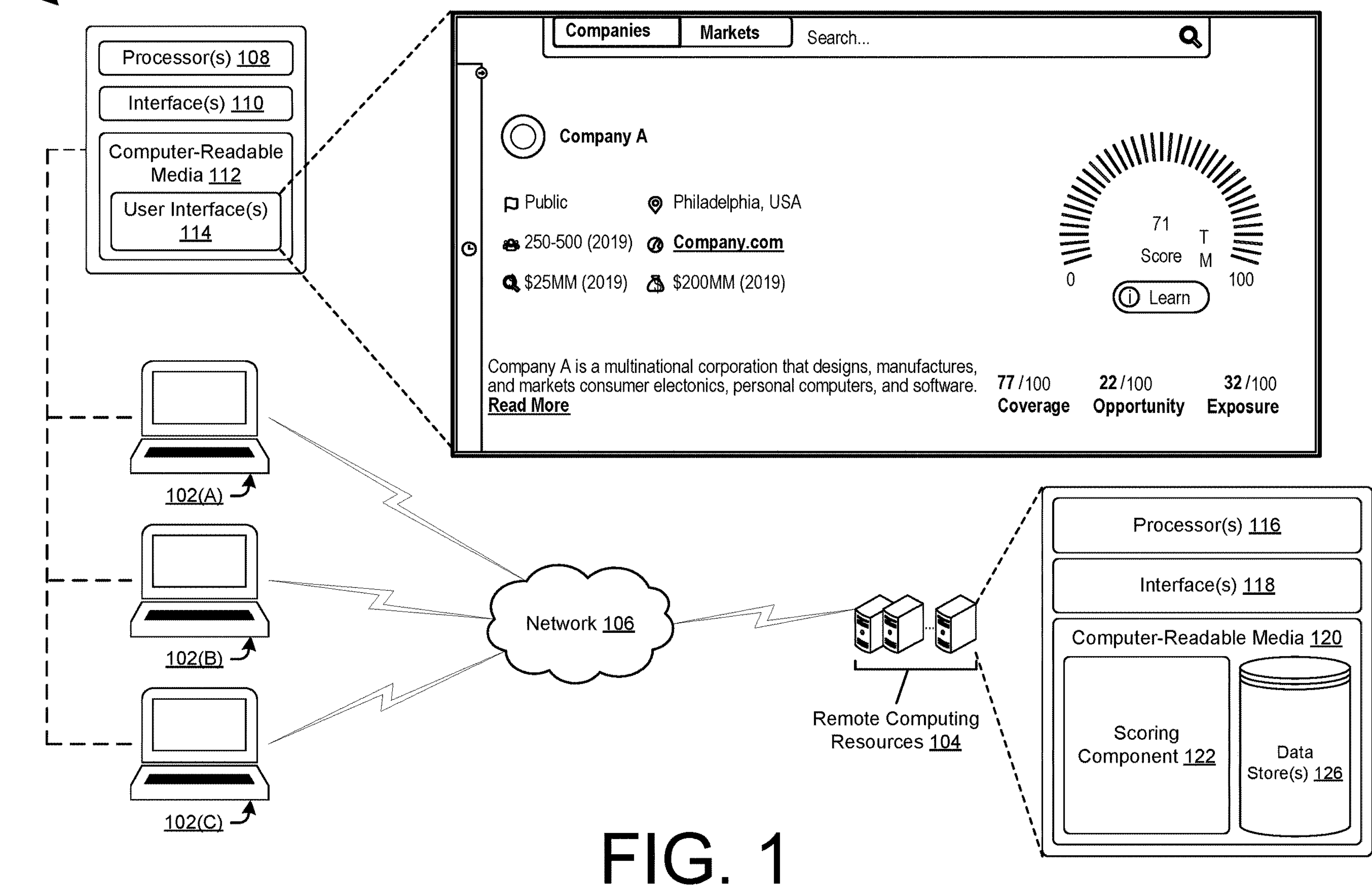
FIG. 1 illustrates a schematic diagram of an example environment for an intellectual-property analysis platform architecture.

Systems and methods for generation and use of an intellectual-property analysis platform are disclosed. Take, for example, an entity that would find it beneficial to utilize a platform to analyze a corpus of intellectual-property (IP) assets in an efficient manner by targeting technical fields, subject matters, and/or competitor entities and to determine i) an overall coverage and/or identify gaps in coverage; ii) a potential market opportunity; and iii) a potential exposure associated with the IP assets included in the targeted technical fields, subject matters, and/or competitor entities portfolios. For example, an entity may desire to know a comprehensive breadth score, revenue alignment data, filing frequency data, or litigation campaign data associated with the IP assets associated with a technical field, a subject matter, and/or a competitor entities for patentability determinations, for infringement determinations, for asset acquisition purposes, for research and development purposes, for insurance purposes, and the like. Generally, a user may search a database of such documents using keyword searching, such as, for example, a technical term, a target product, or an identifier of a target entity. To gather a reasonable number of results that does not unduly limit the documents in those results, users may employ broad keyword searching and then review each document to determine whether each document should be considered in class or out of class for the purposes at hand. However, taking patents and patent applications as an example, the potential corpus of documents, even if looking just to patents and patent applications filed in the United States, easily numbers in the thousands if not tens of thousands or more. Additionally, grouping the patents into groupings based on one or more shared technical fields, subject matters, and/or by similar entities may become cumbersome, especially when dealing with a large corpus. In light of this, an IP analysis platform that is configured to identify IP assets that may be determined to be similar to the IP portfolio of one or more target entities, one or more target publications, and/or one or more target products and/or services and generate multiple result sets of varying levels of granularity would be beneficial. Additionally, an interactive graphical element including a spatial representation of the metrics associated with the IP assets may be desirable to accurately and efficiently visualize an analysis of the IP assets.

Described herein is an IP analysis platform that is configured to produce a qualitative analysis of IP assets using asset data obtained from a number of different sources in varying areas of interest, such as, for example, target technical fields, targeted publications, targeted products, and/or competitor entity portfolios. The platform may include a scoring component that may include various sub-components, such as, a coverage component, an opportunity component, an exposure component, and a data store. In some examples, the coverage component may include various sub-components, such as, a geographic distribution component, an expiration component, a comprehensive breadth score component, a diversity component, a revenue alignment component and/or an invalidity component. In some cases, the opportunity component may include various sub-components, such as, a filing velocity component, a predictive analytics component, and/or a precedence component. In some examples, the exposure component may include various sub-component, such as, a litigation campaign component and/or an alignment to exposure component. In some examples, the datastore may be a secure datastore accessible by the system and utilized to securely store user account data including a project library, an IP asset library including one or more IP assets, and/or historical data. The IP analysis platform may be accessible to users via one or more user interfaces that may be configured to display information associated with analysis report(s) associated with a user account of the user and/or one or more user account(s) associated with the user account. Additionally, or alternatively, the user interface(s) may be configured to receive user input.

The IP analysis platform may be configured to display a user interface for presenting information associated with the analysis report(s) and/or analysis associated with the user account. For example, the user interface may include selectable portions that when selected, may present information associated with the coverage component, the opportunity component, and/or the exposure component. Additionally, or alternatively, the IP analysis platform may be configured to cause the user interface to present information associated with the coverage component, the opportunity component, and/or the exposure component using different views. Additionally, or alternatively, the user interface(s) may include one or more information windows for presenting information associated with the analysis report(s) associated with the user account.

When a user accesses the IP analysis platform using a user account, the user interface may be caused to display one or more pages that present portions of the information associated with the coverage component, the opportunity component, and/or the exposure component using information windows that are relevant to that page. Pages that may be accessed by a user account may include for example, comprehensive score page, a market analysis page, an IP to revenue alignment page, a comprehensive breadth score page, a geographic distribution page, a litigation trend page, a litigation campaign page, a filing velocity page, and/or the like. As mentioned above, each page presents information using information windows that are relevant to that page.

In some examples, the comprehensive score page may include a number of views that may be presented in response to selection of a corresponding view selection element. For example, the comprehensive score page may display a comprehensive score indicating an IP coverage associated with the IP asset portfolio and/or a subset of the IP asset portfolio. The comprehensive score page may also display a coverage score (e.g., coverage metric), an opportunity score (e.g., an opportunity metric), and an exposure metric (e.g., an exposure metric) that are used by the IP analysis platform to generate the comprehensive score. The comprehensive score page may also include other information (e.g., company name, location, website, revenue data, employee data, and/or summary data) associated with an entity in which the analysis report is based on.

In some examples, the market analysis page may include a number of views that may be presented in response to selection of a corresponding view selection element. For example, the market analysis page may display one or more markets associated with a technology area (e.g., music and video, smartphones, business/personal, wearable technology, tablets, etc.) as well as one or more metrics generated by the sub-components of the IP analysis platform. For example, the market analysis page may display a comprehensive breadth score associated with IP assets that are directed towards each market and/or technology area, a research and development value spent by an entity that was directed towards each market and/or technology area, a revenue value generated by an entity from each market and/or technology area, and/or a percentage of IP assets associated with an entity that are directed towards each market and/or technology area.

In some examples, the IP to revenue alignment page may include a number of views that may be presented in response to selection of a corresponding view selection element. For example, the revenue alignment page may display one or more markets associated with a technology area (e.g., music and video, smartphones, business/personal, wearable technology, tablets, etc.) as well as one or more metrics generated by the sub-components of the IP analysis platform. In some cases, the IP revenue alignment page may illustrate a revenue generated by an entity from each of the markets and/or technology areas. The revenue alignment page may also display an indication of a percentage of revenue generated in a market and/or technology area of a total amount of revenue generated by the entity to a percentage of intellectual-property assets directed to the one or more technology areas from a total amount of intellectual-property assets filed by the entity. In some examples, the IP to revenue alignment page may display an indication of a percentage of revenue obtained by other entities for each of the markets and/or technology areas and the percentage of intellectual-property assets associated with the other entities directed towards the markets and/or technology areas.

In some examples, the comprehensive breadth score page may include a number of views that may be presented in response to selection of a corresponding view selection element. For example, the comprehensive breadth score page may display one or more markets associated with a technology area (e.g., music and video, smartphones, business/personal, wearable technology, tablets, etc.) as well as one or more metrics generated by the sub-components of the IP analysis platform. In some cases, the metrics may include a comprehensive breadth score associated with IP assets directed to each of the markets and/or technology areas as well as an overall (e.g., total) comprehensive breadth score for the total IP assets (e.g., the IP asset portfolio). In some cases, the comprehensive breadth scores may be plotted on a line graph illustrating how the comprehensive breadth scores have changed year-to-year for each market and/or technology area. The comprehensive breadth score page may also illustrate values associated with the IP assets of a given entity, such as number active worldwide IP assets, number of active U.S. IP assets, number of IP asset families, and/or average age of an IP asset.

In some examples, the geographic distribution page may include a number of views that may be presented in response to selection of a corresponding view selection element. For example, the geographic distribution page may present a map showing regions in which portions of IP assets from an IP asset portfolio of an entity are filed. In some cases, the geographic distribution page may further present a table illustrating pending IP assets and granted IP assets and the associated regions in which they have been filed.

In some examples, the litigation trend page may include a number of views that may be presented in response to selection of a corresponding view selection element. For example, the litigation trend page may present litigation data (e.g., amount of defendant damages, amount of plaintiff cases, amount of defendant cases, average case duration, etc.) associated with an entity, a market, and/or technology area. In some cases, the litigation data may be plotted in a line graph over a period of time (e.g., 1 year, 5 years, 10 years, etc.). In some cases, the line graphs may be collapsible or expandable.

In some examples, the litigation campaign page may include a number of views that may be presented in response to selection of a corresponding view selection element. For example, the litigation campaign page may illustrate litigation campaign data associated with a particular market and/or technology area. In some cases, the litigation campaign data may be a graphic, such as a, for example, a heatmap, a bar graph, a line graph, and/or any trend analysis graph. In some examples the graphic may include a bubble (e.g., a circle) illustrating an identified litigation campaign. In some cases, different aspects of the bubble may represent different characteristics of the litigation campaign. For example, a size of the circle may correspond to a total number of defendants targeted in the litigation campaign, a color of the circle may indicate a non-practicing entity (NPE) status of the litigation campaign, the x-axis may represent the number of days since the filing of the most recent case in the litigation campaign, and the y-axis may represent a total number of cases filed in the litigation campaign.

In some examples, the compliance page may include a number of views that may be presented in response to selection of a corresponding view selection element. For example, a graphic may include a data graph, such as, for example, a heatmap, a bar graph, a line graph, and/or any trend analysis graph. For example, the graphic may include a heat map comprised of cells, each cell indicating a level of exposure associated with a grouping of supply relationships between a client and its vendors. The level of exposure may be based on an amount of annual spending between a client and a vendor, a level of compliance exposure associated with a vendor account, and/or an age of the vendor account and/or the contract associated with the client account and the vendor account. For example, a client that has entered into a supply contract with a vendor in which the annual amount of spending is high relative to additional annual amounts of spending associated with additional supply contracts, and the vendor account has a low level of compliance with the contract associated with the client, then the relationship between the client account and that vendor account may be represented as a high level of exposure on the heatmap. Additionally, or alternatively, as that supply contract ages, then the level of exposure representing the relationship between the client account and the vendor account may continue to increase. Additionally, or alternatively, each cell of the heatmap may include a visual indication of the exposure level, such as, for example, a color. Additionally, or alternatively, each cell of the heatmap may include an indication of the amount of spending between the client account and each of the vendor accounts that are associated with that cell. Additionally, or alternatively, each cell of the heatmap may include an indication of the age of an associated supply contract and/or an amount of time a vendor account has resided in that cell (exposure category). In some examples, the compliance page may include a compliance overview window including content to provide an indication of the number of compliant vendor accounts that are associated with the client account. Additionally, or alternatively, the compliance overview window may include content to provide an indication of the number of non-compliant vendor accounts that are associated with the client account. In some examples, the content may include a percentage, a graphic indicating the number, or the like. Additionally, or alternatively, the compliance overview window may include one or more compliance indication windows that may include an indication of the number of vendor accounts associated with the client account that are pending registration, the number of vendor accounts associated with the client account that are pending contract acceptance, and/or the number of vendor accounts associated with the client account that have non-compliant insurance.

In some examples, the filing velocity page may include a number of views that may be presented in response to selection of a corresponding view selection element. For example, the filing velocity page may present a graph showing a number of IP assets filed by an entity directed towards a particular market and/or technology area with respect to a total number of IP assets filed that were directed towards the particular market and/or technology area. In some cases, the filing velocity page may illustrate other entities that have filed IP assets directed towards the particular market and/or technology area with respect to the total number of IP assets filed that were directed towards the particular market and/or technology area. In some cases, the filing velocity page may receive user input to switch which markets and/or technology areas and/or select sub-categories within a market and/or technology area.

As mentioned above, the IP analysis platform may include a datastore. In some examples, the datastore may include data corresponding to user accounts, projects, IP assets, historical data, saved results from previous interactions the user account has made with the IP analysis platform, and/or market data. The analysis report(s) may include, for example, coverage metric results, opportunity metric results, exposure metric results, seeded search queries, similarity results, comprehensive breadth score results, revenue alignment results, filing velocity results and/or litigation campaign results. The analysis report(s) may be stored with respect to the user account(s). The IP asset(s) may be stored with respect to an IP asset library. In some examples, the IP asset library may include data associated with IP assets and/or related to a corresponding IP asset, such as, for example, licensing data, and/or standard essential patent data. The historical data may be stored with respect to the user account(s) and/or independently in the data store(s). In some examples, the historical data may include historical data associated with an entity, a publication, an IP asset, and/or a user account. For example, the historical data may include data specific to mergers and acquisitions associated with a particular entity and/or IP asset. The market data may include market data associated with an entity, an IP asset, a technological area, a product and/or service, and/or standardized market data, and/or any other non-IP related data of the like.

In some examples, a user interface generation component may be configured to generate user interface element(s) and/or user interface pages described above using data received from other components utilized by the system. In some examples, the user interface generation component may be communicatively coupled to the other components stored thereon the computer-readable media. In some examples, the user interface generation component may generate user interfaces configured to present information associated with analysis reports associated with a user account. Additionally, or alternatively, the user interface generation component may generate user interfaces including confidential information and may be configured to be accessible by only users with predetermined qualifications. For example, the user interface generation component may cause only a portion of information to be displayed based on the type of account that is accessing the system. For example, when a user accesses the system, the system may determine that the account type of the account that the user has utilized to access the system may be one of, for example, a client user account and/or an administrative user account. In some examples, the user interface generation component may generate interactive graphical elements and/or dynamic animation sequences associated with the interactive graphical elements.

Take for example, a user accessing the IP analysis platform to interact with, conduct research, and/or create a new analysis report. The scoring component may be configured to receive data representing an analysis report. Additionally, or alternatively, the scoring component may be configured to receive data representing a research query that is unassociated with an analysis. It should be appreciated that the operations described herein may be executed in association with and/or standalone from analysis reports. The analysis report may be created by and associated with a user account and/or one or more user accounts that are associated with the user account. The analysis reports may be stored in association with the user account data in the secure datastore. In some examples, the analysis reports may be utilized to organize and/or separate searches, identified similar IP assets and/or entities.

As mentioned above, the IP analysis platform may include a scoring component that includes sub-components, such as, a coverage component utilized to determine an overall coverage and/or identify gaps in coverage, an opportunity component utilized to determine a potential market opportunity, and an exposure component utilized to determine a potential exposure associated with the IP assets. In some examples, each of the coverage component, the opportunity component, and the exposure component may include one or more sub-components.

For example, the coverage component may include various sub-components, such as, a geographic distribution component, an expiration component, a comprehensive breadth score component, a diversity component, a revenue alignment component and/or an invalidity component. In some examples, the coverage component may utilize the one or more sub-components to make determinations and/or generate data to be displayed on the user interface. For example, each of the sub-components may generate a metric to be utilized by the coverage component to generate a coverage metric. In some examples, the coverage metric may be generated for an IP asset portfolio of an entity accessing the IP analysis platform, a sub-set of the IP asset portfolio (e.g., for a particular market and/or technology), an IP asset portfolio of another entity (e.g., business competitor) associated with the entity accessing the IP analysis platform, and/or a sub-set of the IP asset portfolio (e.g., for a particular market and/or technology) of the other entity. The coverage metric may indicate a comprehensive score indicating an IP coverage associated with the IP asset portfolio and/or a subset of the IP asset portfolio.

In some examples, the geographic distribution component may make determinations and/or generate data to be displayed on the user interface. For example, a user may specify one or more target entities, one or more target publications, and/or one or more target products that the geographic distribution component may utilize to generate a geographic distribution search. In some examples, the geographic distribution component may be configured to identify one or more target entities utilizing data representing one or more target publications and/or one or more target products. The results of the geographic distribution search may include an identification of which countries and/or regions that individual IP assets of an IP asset portfolio are filed. In some examples, the geographic distribution component may determine which countries and/or regions the IP assets of the IP asset portfolio are filed for a given entity, market, and/or technology area. In some cases, the geographic distribution component may determine a metric based at least in part on which countries the IP assets are filed. For example, the geographic distribution component may determine a gross domestic product (GDP) value associated with each country and/or region in which an entity has filed IP assets. The geographic distribution component may generate a metric based on which countries and/or regions the IP assets are filed and the GDP of those respective countries and/or regions. In some cases, if a country that the IP assets are filed in have a higher GDP, the geographic distribution component may generate a positive metric. Additionally, and/or alternatively, if a country that the IP assets are filed in have a lower GDP, the geographic distribution component may generate a negative metric. In some examples, the metrics generated by the geographic distribution component may be used by the coverage component to generate a coverage metric.

In some examples, the expiration component may make determinations and/or generate data to be displayed on the user interface. For example, a user may specify one or more target entities, one or more target publications, and/or one or more target products that the expiration component may utilize to generate an expiration search. In some examples, the expiration component may be configured to identify one or more target entities utilizing data representing one or more target publications and/or one or more target products. The results of the expiration search may include determining a number and/or a breadth score associated with individual IP assets of an asset portfolio. In some cases, the expiration component may determine that a number of IP assets of an asset portfolio are about to expire and that a breadth score of these IP assets are high. In this case, the expiration component may generate a negative metric to be provide to the coverage component. Additionally, and/or alternatively, the expiration component may determine that a number of IP assets of an asset portfolio are about to expire and that a breadth score of these IP assets are low. In this case, the expiration component may generate a less negative metric to be provide to the coverage component.

In some examples, the comprehensive breadth score component may make determinations and/or generate data to be displayed on the user interface. For example, a user may specify one or more target entities, one or more target publications, and/or one or more target products that the comprehensive breadth score component may utilize to generate a comprehensive breadth search. In some examples, the comprehensive breadth score component may be configured to identify one or more target entities utilizing data representing one or more target publications and/or one or more target products. The results of the comprehensive breadth search may include a comprehensive breadth score for an IP asset portfolio of an entity accessing the IP analysis platform, a sub-set of the IP asset portfolio (e.g., for a particular market and/or technology), an IP asset portfolio of another entity (e.g., business competitor) associated with the entity accessing the IP analysis platform, and/or a sub-set of the IP asset portfolio (e.g., for a particular market and/or technology) of the other entity. The comprehensive breadth score for a group of IP assets (e.g., a portfolio of IP assets and/or a sub-set of the portfolio of IP assets) may be based on weighted breadth scores calculated for individual IP assets of the group of IP assets. For example, the comprehensive breadth score component may receive or otherwise identify a plurality of IP assets associated with an entity and calculate, for the individual IP assets of the plurality of IP assets, a breadth score based at least in part on a word count score and a commonness score for the respective portions of text included in the individual intellectual-property assets. In some cases, the word count score may be based on a word count associated with respective portions of text and word counts associated with portions of text from at least one other IP asset of the plurality of IP assets. In some cases, the commonness score may be based on a frequency in which words within the respective portion of text are found in the portions of text from at least one other IP asset. Once the breadth score is calculated for individual IP assets of the group of IP assets, the comprehensive breadth score component may calculate a weighted score for the individual IP assets based on multiplying the breadth score by a weight that is determined by the respective breadth scores for the individual IP assets. For example, the comprehensive breadth score component may assign a lower weight (e.g., 1) to an IP asset determined to have a low breadth score, a medium weight (e.g., 2) to an IP asset determined to have a medium breadth score, and a higher weight (e.g., 3) to an IP asset determined to have a high breadth score. Once the weighted breadth scores are determined, the comprehensive breadth score component may calculate a comprehensive score for the group of IP assets by calculating an average of the weighted scores of the individual IP assets. In some examples, the comprehensive breadth score component may provide the comprehensive score for the group of IP assets to the coverage component to be used in calculating a coverage metric.

In some cases, the comprehensive breadth score component can calculate the comprehensive breadth score for a group of IP assets based on a market and/or technology area. In some examples, the comprehensive breadth score component can calculate the comprehensive breadth score over multiple periods of time such that a visualization of how the comprehensive breadth score for a group of IP assets has changed over time can be depicted. In some cases, the comprehensive breadth score for a group of IP assets may have changed due to a new IP asset that has been filed, a new IP asset that has granted, a, IP asset that has expired, a and IP asset that has been abandoned and/or a breadth score for an IP asset that has changed.

In some examples, the diversity component may make determinations and/or generate data to be displayed on the user interface. For example, a user may specify one or more target entities, one or more target publications, and/or one or more target products that the diversity component may utilize to generate a diversity search. In some examples, the diversity component may be configured to identify one or more target entities utilizing data representing one or more target publications and/or one or more target products. The results of the diversity search may include a metric indicating how diversified a group of IP assets are over a given market and/or technology area.

In some examples, the revenue alignment component may make determinations and/or generate data to be displayed on the user interface. For example, a user may specify one or more target entities, one or more target publications, and/or one or more target products that the revenue alignment component may utilize to generate a revenue alignment search. In some examples, the revenue alignment component may be configured to identify one or more target entities utilizing data representing one or more target publications and/or one or more target products. The results of the revenue alignment search may include a metric indicating how a group of IP assets associated with an entity and with a given market and/or technology area aligns with the revenue generated by that market and/or technology area for the entity. For example, the revenue alignment component may identify one or more market areas and/or technology areas associated with an entity accessing the IP analysis platform. The revenue alignment component may identify revenue streams of the entity that are associate with the one or more market areas and/or one or more technology areas and identify a number of IP assets that are associated with the entity as well as the one or more technology areas. In some cases, the revenue alignment component may determine a percentage of revenue generated in a market area and/or technology area of a total amount of revenue generated by the entity and may determine a percentage of IP assets directed to the one or more market areas and/or one or more technology areas from among a group of IP assets filed by the entity. The revenue alignment component may then generate an alignment metric based at least in part on the number of the IP assets associated with the one or more market areas and/or one or more technology areas and the one or more revenue streams associated with the one or more market areas and/or one or more technology areas. In some examples, the revenue alignment component may identify the market and/or technology areas by accessing a taxonomy of market sets and/or a taxonomy of technology areas provided by a third-party resource and/or stored on the database. In this way, the revenue alignment component may illustrate if an entity is revenue heavy (e.g., greater percentage of revenue generated than percentage of IP assets filed) or is more IP asset heavy (e.g., greater percentage of IP assets filed than percentage of revenue generated) for individual market areas and/or technology areas.

In some cases, the revenue alignment component may also generate a metric illustrating a revenue alignment for multiple other entities. For example, the revenue alignment component may determine a percentage of revenue generated in a market area and/or technology area of a total amount of revenue generated by a group of entities and may determine a percentage of IP assets directed to the one or more market areas and/or one or more technology areas from among a group of IP assets filed by the group of entities. In this way, the revenue alignment component may illustrate a comparison of a revenue alignment metric associated with the entity to a revenue alignment metric associated with multiple other entities generating revenue and filing IP assets in an individual market area and/or technology area.

In some examples, the invalidity component may make determinations and/or generate data to be displayed on the user interface. For example, a user may specify one or more target entities, one or more target publications, and/or one or more target products that the invalidity component may utilize to generate a geographic distribution search. In some examples, the invalidity component may be configured to identify one or more target entities utilizing data representing one or more target publications and/or one or more target products. The results of the invalidity search may include citation data associated with a group of IP assets and/or individual IP assets associated with an entity accessing the IP analysis platform. In some cases, the invalidity component may generate an invalidity metric indicating a likelihood that an IP asset may be considered to be invalid if it were to be challenged in a court of law. In some cases, the invalidity component may generate the invalidity metric based on a density of other IP assets cited during prosecution of the IP asset, a density of other IP assets in which the IP asset was cited during prosecution, and/or litigation data associated with the other IP assets (e.g., result of invalidity challenges of the other IP assets). In some cases, the invalidity metric may be utilized by other component and/or sub-components to impact other metrics, such as the comprehensive breadth score metric.

In some cases, the coverage component may utilize any metric generated by the various sub-components to generate a coverage metric associated with a group of IP assets associated with an entity and/or other entities. In some cases, other determinations may affect the coverage metric, such as, legal status of an IP asset (e.g., ownership of the IP asset), how a breadth scope of claims change during prosecution of an IP asset, etc.

In some cases, the opportunity component may include various sub-components, such as, a filing velocity component, a predictive analytics component, and/or a precedence component. In some examples, the opportunity component may utilize the one or more sub-components to make determinations and/or generate data to be displayed on the user interface. For example, each of the sub-components may generate a metric to be utilized by the opportunity component to generate an opportunity metric. In some examples, the opportunity metric may be generated for an IP asset portfolio of an entity accessing the IP analysis platform, a sub-set of the IP asset portfolio (e.g., for a particular market and/or technology), an IP asset portfolio of another entity (e.g., business competitor) associated with the entity accessing the IP analysis platform, and/or a sub-set of the IP asset portfolio (e.g., for a particular market and/or technology) of the other entity. The opportunity metric may indicate a potential market area and/or technology area opportunity associated with the IP asset portfolio and/or a subset of the IP asset portfolio.

In some examples, the filing velocity component may make determinations and/or generate data to be displayed on the user interface. For example, a user may specify one or more target entities, one or more target publications, and/or one or more target products that the filing velocity component may utilize to generate a filing velocity search. In some examples, the filing velocity component may be configured to identify one or more target entities utilizing data representing one or more target publications and/or one or more target products. The results of the filing velocity search may include a filing velocity metric indicating a percentile rank of an entity for filing of IP assets in a given market area and/or technology area. For example, the filing velocity component may identify a total amount of IP assets filed that are directed towards or otherwise associated with a given market area and/or technology area for a period of time (e.g., a year, five years, ten years, etc.) The filing velocity component may then identify a number of IP assets filed by individual entities, such as an entity accessing the IP analysis platform and associated entity competitors, during that time period directed towards or otherwise associated with the market area and/or the technology area. In some examples, the filing velocity component may then generate a percentile ranking for each entity based at least in part on comparing the number of IP assets filed by the individual entities during the time period to the total number of IP assets filed during the time period. In some examples, the percentile ranking of each entity may be utilized as a metric for the opportunity component to generate an opportunity metric. For example, a low percentile ranking (e.g., 10%, 20%, 30%) may indicate that an entity is underperforming with regard to a number of IP assets filed in a particular market area and/or technology area. Additionally, and/or alternatively, a high percentile ranking (e.g., 70%, 80%, 90%) may indicate that an entity is overperforming with regard to a number of IP assets filed in a particular market area and/or technology area.

In some examples, the filing velocity component may identify a total amount of IP assets filed that are directed towards or otherwise associated with an IP art unit for a period of time (e.g., a year, five years, ten years, etc.) The filing velocity component may then identify a number of IP assets filed by individual entities, such as an entity accessing the IP analysis platform and associated entity competitors, during that time period directed towards or otherwise associated with the IP art unit. In some examples, the filing velocity component may then generate a percentile ranking for each entity based at least in part on comparing the number of IP assets filed by the individual entities during the time period to the total number of IP assets filed during the time period. In some examples, the percentile ranking of each entity may be utilized as a metric for the opportunity component to generate an opportunity metric. For example, a low percentile ranking (e.g., 10%, 20%, 30%) may indicate that an entity is underperforming with regard to a number of IP assets filed in a particular IP art unit. Additionally, and/or alternatively, a high percentile ranking (e.g., 70%, 80%, 90%) may indicate that an entity is overperforming with regard to a number of IP assets filed in a particular IP art unit.

In some examples, the predictive analytics component may make determinations and/or generate data to be displayed on the user interface. For example, a user may specify one or more target entities, one or more target publications, and/or one or more target products that the predictive analytics component may utilize to generate a predictive analytics search. In some examples, the predictive analytics component may be configured to identify one or more target entities utilizing data representing one or more target publications and/or one or more target products. The results of the predictive analytics search may include a predicted comprehensive breadth score for a pending IP asset associated with an entity. For example, the predictive analytics component may determine an examiner and/or an art unit associated with at least one pending IP asset filed or otherwise associated with the entity. In some cases, the predictive analytics component may determine a comprehensive breadth score, as discussed herein, for at least one originally filed claim of an IP asset (e.g., application) previously examined by the examiner and/or previously filed in the art unit. The predictive analytics component may then determine a comprehensive breadth score for an issued version of the originally filed claim of the application and generate an examiner metric and/or an art unit metric based at least in part on a difference between the comprehensive breadth score of the originally filed claims and the comprehensive breadth score of the issued claims. In this way, the predictive analytics component may determine an effect that a particular examiner and/or art unit may have on a comprehensive breadth score of a potentially allowable claim. For example, the predictive analytics component may determine predicted breadth score for a pending IP asset based at least in part on the examiner metric and/or the art unit metric. In some cases, the predicted breadth score may be utilized by the opportunity component to generate the opportunity metric.

In some cases, the predictive analytics component may generate a predicted issue date for a pending IP asset associated with an entity based on an average length of prosecution associated with an examiner and/or an art unit. In some cases, the predicted issue date may be utilized by the opportunity component to generate the opportunity metric.

In some examples, the precedence component may make determinations and/or generate data to be displayed on the user interface. For example, a user may specify one or more target entities, one or more target publications, and/or one or more target products that the precedence component may utilize to generate a precedence search. In some examples, the precedence component may be configured to identify one or more target entities utilizing data representing one or more target publications and/or one or more target products. The results of the precedence search may include metric data indicating a historical precedence associated with an IP asset. For example, the precedence component may identify a particular market area and/or technology area associated with an IP asset and determine a number of similar IP assets filed within the identified market area and/or technology area. In some examples, if the number of other IP assets is low, then the precedence metric associated with the IP asset may be high. Additionally, and/or alternatively, if the number of other IP assets is high, then the precedence metric associated with the IP asset may be low. Once the precedence component determines a precedence metric, the precedence metric may be provided to the opportunity component and utilized to generate the opportunity metric.

In some examples, the exposure component may include various sub-component, such as, a litigation campaign component and/or an alignment to exposure component. In some examples, the exposure component may utilize the one or more sub-components to make determinations and/or generate data to be displayed on the user interface. For example, each of the sub-components may generate a metric to be utilized by the exposure component to generate an exposure metric. In some examples, the exposure metric may be generated for an IP asset portfolio of an entity accessing the IP analysis platform, a sub-set of the IP asset portfolio (e.g., for a particular market and/or technology), an IP asset portfolio of another entity (e.g., business competitor) associated with the entity accessing the IP analysis platform, and/or a sub-set of the IP asset portfolio (e.g., for a particular market and/or technology) of the other entity. The exposure metric may indicate a potential exposure and/or risk (e.g. potential risk of litigation) associated with a market area and/or technology area associated with the IP asset portfolio and/or a subset of the IP asset portfolio. In some examples, the exposure component may identify the levels of exposure associated with the result sets and/or IP assists associated with an entity, and may aggregate the data indicating the levels of exposure associated with the result sets and/or IP asset to determine an overall level of exposure for an entity. In some examples, the exposure assessment component may be utilized in combination with any of the components described above. Additionally, or alternatively, the exposure component may make determinations and/or generate data to be displayed on the user interface.

In some examples, the litigation campaign component may make determinations and/or generate data to be displayed on the user interface. For example, a user may specify one or more target entities, one or more target publications, and/or one or more target products that the litigation campaign component may utilize to generate a litigation campaign search. In some examples, the litigation campaign component may be configured to identify one or more target entities utilizing data representing one or more target publications and/or one or more target products. The results of the litigation campaign search may include data indicating a potential likelihood of litigation associated with a particular market area and/or technology area. For example, the litigation campaign component may identify a litigation campaign associated with a market area and/or technology area by determining that an entity has filed at least two cases associated with the market area and/or technology area within the same calendar year. Once the litigation campaign component determines that the at least two cases are part of a litigation campaign directed towards a particular market area and/or technology area, the litigation campaign component may determine a period of time since the most recent filing of a case included in the litigation campaign, a number of defendants associated with the litigation campaign, and/or a non-practicing entity (NPE) status of the litigation campaign (e.g., whether the entity associated with the litigation campaign is an NPE or a practicing entity). In some examples, the litigation campaign component may obtain litigation data (e.g., defendant information, plaintiff information, case filing information, etc.) from a third party resource and may store the data in the database. In some cases, the data generated by the litigation campaign component may be provided to the exposure component and utilized to generate an exposure metric.

In some examples, the alignment to exposure component may make determinations and/or generate data to be displayed on the user interface. For example, a user may specify one or more target entities, one or more target publications, and/or one or more target products that the alignment to exposure component may utilize to generate an alignment to exposure search. In some examples, the alignment to exposure component may be configured to identify one or more target entities utilizing data representing one or more target publications and/or one or more target products. The results of the alignment to exposure search may include metric data indicating a potential exposure metric associate with a group of IP assets associated with an entity with regard to potential litigation. For example, the alignment to exposure component may determine a market area and/or technology area associated with a group of IP assets filed and/or otherwise associated with an entity, such as an entity utilizing the IP analysis platform. The alignment to exposure component may then identifying a litigation history (e.g., past litigation and current litigation) associated with the technology area and/or market area. In some cases, if there is a large amount of litigation associated with the market area and/or technology area, the alignment to exposure component may determine that the group of IP assets are at a greater risk of litigation. Additionally, and/or alternatively, if there is a small amount of litigation associated with the market area and/or technology area, the alignment to exposure component may determine that the group of IP assets are at a lesser risk of litigation. In some cases, the data generated by the alignment to exposure component may be provided to the exposure component and utilized to generate an exposure metric.

In some examples, the scoring component may utilize the coverage component, the opportunity component, the exposure component, and the respective metrics associated with each component to generate an overall score for a group of IP assets associated with an entity. The overall score may indicate i) an overall coverage and/or identify gaps in coverage; ii) a potential market opportunity; and/or iii) a potential exposure associated with the IP assets. included in the targeted technical fields, subject matters, and/or competitor entities portfolios.

In some examples, the scoring component may be configured to receive data representing a seeded search query and may perform a search operation in a number of ways and provide data and/or metrics to the various other components and sub-components discussed herein. A seeded search query may include one or more instances of target data as described in more detail below. In some examples, the seeded search query may indicate an identification of one or more target entities. Additionally, or alternatively, the seeded search query may indicate an identification of one or more target publications, such as, for example, an IP asset. Additionally, or alternatively, the seeded search query may indicate an identification of one or more target products and/or services. In some examples, the IP analysis platform may be configured to receive additional data associated with the seeded search query. For example, the scoring component may be configured to receive additional data via one or more actionable elements included on a graphical user interface (GUI) presented on a computing device and accessible to a user account. Additionally, or alternatively, the scoring component may be configured to utilize the data representing a seeded search query to make various identifications and determinations associated with IP assets and/or entities, among other things.

In some examples, the seeded search query may indicate the identification of the one or more target entities, and the scoring component may utilize the data to identify IP assets that are associated with the target entity. In some examples, the scoring component may access one or more database(s) including a listing of all of the available IP assets associated with the target entity (e.g., an IP asset portfolio). Additionally, or alternatively, the scoring component may generate a result set including IP assets having an assignee associated with the entity.

Additionally, or alternatively, the seeded search query may indicate the identification of the one or more target publications may utilize the data representing the seeded search query to identify IP assets (or IP asset portfolios) that are determined to be similar to the target publication. The scoring component may identify similar IP assets using various techniques. For example, the scoring component may generate a vector representation of the target publication and use the vector representation to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset, and turns it into a vector form as a list of floating-point numbers based at least in part on the document's text contents. This vector form may be called an embedding. This embedding may be used to calculate distance, and therefore similarity, between documents.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for an IP analysis platform architecture. The architecture 100 may include, for example, one or more user devices 102(*a*)-(*c*), also described herein as electronic devices 102(*a*)-(*c*), and/or a remote computing resources 104 associated with the IP analysis platform. Some or all of the devices and systems may be configured to communicate with each other via a network 106.

The electronic devices 102 may include components such as, for example, one or more processors 108, one or more network interfaces 110, and/or computer-readable media 112. The computer-readable media 112 may include components such as, for example, one or more user interfaces 114. As shown in FIG. 1, the electronic devices 102 may include, for example, a computing device, a mobile phone, a tablet, a laptop, and/or one or more servers. The components of the electronic device 102 will be described below by way of example. It should be understood that the example provided herein is illustrative and should not be considered the exclusive example of the components of the electronic device 102.

By way of example, the user interface(s) 114 may include one or more of the user interfaces described elsewhere herein, such as the user interfaces described with respect to FIGS. 3-7, corresponding to a comprehensive score user interface, market analysis user interface, an IP to revenue alignment user interface, a comprehensive breadth score user interface, a geographic distribution user interface, a litigation trend user interface, a compliance user interface, a litigation campaign user interface, a filling velocity user interface, etc. It should be understood that while the user interface(s) 114 are depicted as being a component of the computer-readable media 112 of the electronic devices 102 (*a*)-(*c*), the user interface(s) 114 may additionally or alternatively be associated with the remote computing resources 104. The user interface(s) 114 may be configured to display information associated with the IP analysis platform and to receive user input associated with the IP analysis platform.

The remote computing resources 104 may include one or more components such as, for example, one or more processors 116, one or more network interfaces 118, and/or computer-readable media 120. The computer-readable media 120 may include one or more components, such as, for example, a scoring component 122 and/or one or more data store(s) 124. The scoring component 122 may be configured to receive user input data as described herein for indicating target data representing at least one of an entity, publication, and/or product utilized to generate seeded search queries that utilize the target data to determine a representative entity and return results including IP assets associated with the representative entity and/or one or more entities that have IP assets that are determined to be similar to the IP assets of the representative entity. The scoring component 122 may also be configured to generate vector representations of the entities and/or IP assets such that the scoring component 122 may rank and/or otherwise analyze the results from the search query by utilizing vector representations. The scoring component 122 may also be configured to utilize the vector representations of the entities and/or the IP assets associated with the entities to generate result sets including comprehensive breadth scores, revenue alignment metrics, IP asset filing metrics, and/or litigation campaign metrics associated with the technical fields, products or technologies of interest, IP assets associated with particular market areas and/or technical areas, etc. The scoring component 122 may also be configured to generate an interactive graphical element, that may be configured to respond to various user inputs representing manipulations to the interactive graphical element, for presenting a spatial representation of the one or more metrics included in a selected result set.

The data store(s) 124 of the remote computing resources 104 may include data corresponding to user accounts, analysis reports, historical data, and/or intellectual-property assets The analysis reports may include, for example, seeded search queries, similar entity and/or publication results, metric results, and/or the spatial representation of the metric results. The analysis reports may be stored with respect to the user account of the data store 124. The IP assets may be stored with respect to an IP asset library of the data store 124.

Figure 2:
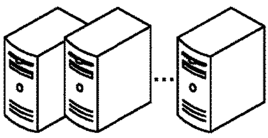
FIG. 2 illustrates a component diagram of example components of a remote computing resource for the intellectual-property analysis platform.

As shown in FIG. 2, several of the components of the remote computing resources 104 and/or the electronic devices 102 and the associated functionality of those components as described herein may be performed by one or more of the other systems and/or by the electronic devices 102. Additionally, or alternatively, some or all of the components and/or functionalities associated with the electronic devices 102 may be performed by the remote computing resource(s) 104.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 108 and/or 116, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or 116 may possess its own local memory, which also may store program components, program data, and/or one or more operating systems.

The computer-readable media 112 and/or 120 may include volatile and nonvolatile memory, removable and non-removable media implemented in any method or technology for storage of information, such as computer-readable instructions, data structures, program component, or other data. Such computer-readable media 112 and/or 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 112 and/or 120 may be implemented as computer-readable storage media ("CRSM"), which may be any available physical media accessible by the processor(s) 108 and/or 116 to execute instructions stored on the computer-readable media 112 and/or 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 112 and/or 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or 118 may enable messages between the components and/or devices shown in system 100 and/or with one or more other remote systems, as well as other networked devices. Such network interface (s) 110 and/or 118 may include one or more network interface controllers (NICs) or other types of transceiver devices to send and receive messages over the network 106.

For instance, each of the network interface(s) 110 and/or 118 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or 118 may include a wide area network (WAN) component to enable message over a wide area network.

In some instances, the remote computing resources 104 may be local to an environment associated with the electronic device(s) 102. For instance, the remote computing resources 104 may be located within the electronic device(s) 102. In some instances, some or all of the functionality of the remote computing resources 104 may be performed by the electronic device(s) 102. Also, while various components of the remote computing resources 104 have been labeled and named in this disclosure and each component has been described as being configured to cause the processor(s) 108 and/or 116 to perform certain operations, it should be understood that the described operations may be performed by some or all of the components and/or other components not specifically illustrated.

FIG. 2 illustrates a component diagram of example components 100 of a remote computing resource 104 for the vendor management platform. The remote computing resource 104 may include one or more components such as, for example, one or more processor(s) 116, one or more network interfaces 118, and/or computer-readable media 120. The computer-readable media may include one or more components, such as, for example, a scoring component 122 and/or one or more data stores 124. Some or all of the components and functionalities may be configured to communicate with each other.

The data store(s) 124 may include data corresponding to user account(s) 202, analysis report(s) 204, intellectual-property (IP) asset(s) 206(1)-(N), historical data 208, saved result(s) 242 from previous interactions the user account has made with the IP analysis platform, and/or market data 244. The analysis report(s) 204 may include, for example, seeded search queries, similarity results, metric results, and/or spatial representations of metrics. The analysis report(s) 204 may be stored with respect to the user account(s) 202. Additionally, or alternatively, the saved result(s) 242 may include, for example, seeded search queries, similarity results, metric results, and/or spatial representations of metric. The IP asset(s) 206(1)-(N) may be stored with respect to an IP asset library 210. In some examples, the IP asset library 210 may include data associated with IP assets and/or related to a corresponding IP asset, such as, for example, licensing data, and/or standard essential patent data. The historical data 208 may be stored with respect to the user account(s) 202 and/or independently in the data store(s) 124. In some examples, the historical data 208 may include historical data associated with an entity, a publication, an IP asset 206, and/or a user account 202. For example, the historical data 208 may include data specific to mergers and acquisitions associated with a particular entity and/or IP asset 206. The market data 244 may include market data associated with an entity, an IP asset 206, a technological area, a product and/or service, standardized market data, revenue data, and/or any other non-IP related data of the like. In some examples, the market data 244 may be obtained from a third-party resource.

As mentioned with respect to FIG. 1, the scoring component 122 may be configured to receive user input data as described herein for indicating target data representing at least one of an entity, publication, and/or product utilized to generate seeded search queries that utilize the target data to determine a representative entity and return results including one or more IP assets associated with the representative entity, one or more entities that have IP assets that are determined to be similar to the IP assets of the representative entity, market area and/or technology areas associated with the IP assets of the representative entity, revenue data associated with the market area and/or technology areas of the representative entity, revenue data associated with one or more entities that have IP assets that are determined to be similar to the IP assets of the representative entity, and/or litigation data associated with market area and/or technology areas associated with the IP assets of the representative entity. The scoring component 122 may also be configured to generate vector representations of the entities and/or IP assets such that the scoring component 122 may rank the results from the search query by utilizing vector representations. The scoring component 122 may also be configured to utilize the vector representations of the entities to generate result sets including metrics of selected entities associated with technical fields, IP assets, products or technologies of interest, etc. The scoring component 122 may also be configured to generate an interactive graphical element, that may be configured to respond to various user inputs representing manipulations to the interactive graphical element, for presenting a spatial representation of the one or more metrics included in a selected result set. The scoring component 122 may include one or more components, such as, a coverage component 212 utilized to determine an overall coverage and/or identify gaps in coverage, an opportunity component 214 utilized to determine a potential market opportunity, and an exposure component 216 utilized to determine a potential exposure associated with the IP assets. In some examples, each of the coverage component 212, the opportunity component 214, and the exposure component 216 may include one or more sub-components.

For example, the coverage component 212 may include various sub-components, such as, a geographic distribution component 218, an expiration component 220, a comprehensive breadth score component 222, a diversity component 224, a revenue alignment component 226 and/or an invalidity component 228. In some examples, the coverage component 212 may utilize the one or more sub-components to make determinations and/or generate data to be displayed on the user interface. For example, each of the sub-components may generate a metric to be utilized by the coverage component 212 to generate a coverage metric. In some cases, the opportunity component 214 may include various sub-components, such as, a filing velocity component 230, a predictive analytics component, 232 and/or a precedence component 234. In some examples, the opportunity component 214 may utilize the one or more sub-components to make determinations and/or generate data to be displayed on the user interface. For example, each of the sub-components may generate a metric to be utilized by the opportunity component 214 to generate an opportunity metric. In some examples, the exposure component 216 may include various sub-component, such as, a litigation campaign component 236 and/or an alignment to exposure component 238. In some examples, the exposure component 216 may utilize the one or more sub-components to make determinations and/or generate data to be displayed on the user interface. For example, each of the sub-components may generate a metric to be utilized by the exposure component 216 to generate an exposure metric. Additionally, or alternatively, the scoring component 122 may be configured to perform the operations described below with respect to the one or more components.

In some examples, the geographic distribution component 218 may make determinations and/or generate data to be displayed on the user interface. For example, a user may specify one or more target entities, one or more target publications, and/or one or more target products that the geographic distribution component 218 may utilize to generate a geographic distribution search. In some examples, the geographic distribution component 218 may be configured to identify one or more target entities utilizing data representing one or more target publications and/or one or more target products. The results of the geographic distribution search may include an identification of which countries and/or regions that individual IP assets of an IP asset portfolio are filed. In some examples, the geographic distribution component 218 may determine which countries and/or regions the IP assets of the IP asset portfolio are filed for a given entity, market, and/or technology area. In some cases, the geographic distribution component 218 may determine a metric based at least in part on which countries the IP assets are filed. For example, the geographic distribution component 218 may determine a gross domestic product (GDP) value associated with each country and/or region in which an entity has filed IP assets. The geographic distribution component 218 may generate a metric based on which countries and/or regions the IP assets are filed and the GDP of those respective countries and/or regions. In some cases, if a country that the IP assets are filed in have a higher GDP, the geographic distribution component 218 may generate a positive metric. Additionally, and/or alternatively, if a country that the IP assets are filed in have a lower GDP, the geographic distribution component 218 may generate a negative metric. In some examples, the metrics generated by the geographic distribution component 218 may be used by the coverage component 212 to generate a coverage metric.

In some examples, the expiration component 220 may make determinations and/or generate data to be displayed on the user interface. For example, a user may specify one or more target entities, one or more target publications, and/or one or more target products that the expiration component 220 may utilize to generate an expiration search. In some examples, the expiration component 220 may be configured to identify one or more target entities utilizing data representing one or more target publications and/or one or more target products. The results of the expiration search may include determining a number and/or a breadth score associated with individual IP assets of an asset portfolio. In some cases, the expiration component 220 may determine that a number of IP assets of an asset portfolio are about to expire and that a breadth score of these IP assets are high. In this case, the expiration component 220 may generate a negative metric to be provide to the coverage component 212. Additionally, and/or alternatively, the expiration component 220 may determine that a number of IP assets of an asset portfolio are about to expire and that a breadth score of these IP assets are low. In this case, the expiration component 220 may generate a less negative metric to be provide to the coverage component 212.

In some examples, the comprehensive breadth score component 222 may make determinations and/or generate data to be displayed on the user interface. For example, a user may specify one or more target entities, one or more target publications, and/or one or more target products that the comprehensive breadth score component 222 may utilize to generate a comprehensive breadth search. In some examples, the comprehensive breadth score component 222 may be configured to identify one or more target entities utilizing data representing one or more target publications and/or one or more target products. The results of the comprehensive breadth search may include a comprehensive breadth score for an IP asset portfolio of an entity accessing the IP analysis platform, a sub-set of the IP asset portfolio (e.g., for a particular market and/or technology), an IP asset portfolio of another entity (e.g., business competitor) associated with the entity accessing the IP analysis platform, and/or a sub-set of the IP asset portfolio (e.g., for a particular market and/or technology) of the other entity. The comprehensive breadth score for a group of IP assets (e.g., a portfolio of IP assets and/or a sub-set of the portfolio of IP assets) may be based on weighted breadth scores calculated for individual IP assets of the group of IP assets. For example, the comprehensive breadth score component 222 may receive or otherwise identify a plurality of IP assets associated with an entity and calculate, for the individual IP assets of the plurality of IP assets, a breadth score based at least in part on a word count score and a commonness score for the respective portions of text included in the individual intellectual-property assets. In some cases, the word count score may be based on a word count associated with respective portions of text and word counts associated with portions of text from at least one other IP asset of the plurality of IP assets. In some cases, the commonness score may be based on a frequency in which words within the respective portion of text are found in the portions of text from at least one other IP asset. Once the breadth score is calculated for individual IP assets of the group of IP assets, the comprehensive breadth score component 222 may calculate a weighted score for the individual IP assets based on multiplying the breadth score by a weight that is determined by the respective breadth scores for the individual IP assets. For example, the comprehensive breadth score component 222 may assign a lower weight (e.g., 1) to an IP asset determined to have a low breadth score, a medium weight (e.g., 2) to an IP asset determined to have a medium breadth score, and a higher weight (e.g., 3) to an IP asset determined to have a high breadth score. Once the weighted breadth scores are determined, the comprehensive breadth score component 222 may calculate a comprehensive score for the group of IP assets by calculating an average of the weighted scores of the individual IP assets. In some examples, the comprehensive breadth score component 222 may provide the comprehensive score for the group of IP assets to the coverage component 212 to be used in calculating a coverage metric.

In some cases, the comprehensive breadth score component 222 can calculate the comprehensive breadth score for a group of IP assets based on a market and/or technology area. In some examples, the comprehensive breadth score component 222 can calculate the comprehensive breadth score over multiple periods of time such that a visualization of how the comprehensive breadth score for a group of IP assets has changed over time can be depicted. In some cases, the comprehensive breadth score for a group of IP assets may have changed due to a new IP asset that has been filed, a new IP asset that has granted, a, IP asset that has expired, a and IP asset that has been abandoned and/or a breadth score for an IP asset that has changed.

In some examples, the diversity component 224 may make determinations and/or generate data to be displayed on the user interface. For example, a user may specify one or more target entities, one or more target publications, and/or one or more target products that the diversity component 224 may utilize to generate a diversity search. In some examples, the diversity component 224 may be configured to identify one or more target entities utilizing data representing one or more target publications and/or one or more target products. The results of the diversity search may include a metric indicating how diversified a group of IP assets are over a given market and/or technology area.

In some examples, the revenue alignment component 226 may make determinations and/or generate data to be displayed on the user interface. For example, a user may specify one or more target entities, one or more target publications, and/or one or more target products that the revenue alignment component 226 may utilize to generate a revenue alignment search. In some examples, the revenue alignment component 226 may be configured to identify one or more target entities utilizing data representing one or more target publications and/or one or more target products. The results of the revenue alignment search may include a metric indicating how a group of IP assets associated with an entity and with a given market and/or technology area aligns with the revenue generated by that market and/or technology area for the entity. For example, the revenue alignment component 226 may identify one or more market areas and/or technology areas associated with an entity accessing the IP analysis platform. The revenue alignment component 226 may identify revenue streams of the entity that are associate with the one or more market areas and/or one or more technology areas and identify a number of IP assets that are associated with the entity as well as the one or more technology areas. In some cases, the revenue alignment component 226 may determine a percentage of revenue generated in a market area and/or technology area of a total amount of revenue generated by the entity and may determine a percentage of IP assets directed to the one or more market areas and/or one or more technology areas from among a group of IP assets filed by the entity. The revenue alignment component 226 may then generate an alignment metric based at least in part on the number of the IP assets associated with the one or more market areas and/or one or more technology areas and the one or more revenue streams associated with the one or more market areas and/or one or more technology areas. In some examples, the revenue alignment component 226 may identify the market and/or technology areas by accessing a taxonomy of market sets and/or a taxonomy of technology areas provided by a third-party resource and/or stored on the database. In this way, the revenue alignment component 226 may illustrate if an entity is revenue heavy (e.g., greater percentage of revenue generated than percentage of IP assets filed) or is more IP asset heavy (e.g., greater percentage of IP assets filed than percentage of revenue generated) for individual market areas and/or technology areas.

In some cases, the revenue alignment component 226 may also generate a metric illustrating a revenue alignment for multiple other entities. For example, the revenue alignment component 226 may determine a percentage of revenue generated in a market area and/or technology area of a total amount of revenue generated by a group of entities and may determine a percentage of IP assets directed to the one or more market areas and/or one or more technology areas from among a group of IP assets filed by the group of entities. In this way, the revenue alignment component 226 may illustrate a comparison of a revenue alignment metric associated with the entity to a revenue alignment metric associated with multiple other entities generating revenue and filing IP assets in an individual market area and/or technology area.

In some examples, the invalidity component 228 may make determinations and/or generate data to be displayed on the user interface. For example, a user may specify one or more target entities, one or more target publications, and/or one or more target products that the invalidity component 228 may utilize to generate a geographic distribution search. In some examples, the invalidity component 228 may be configured to identify one or more target entities utilizing data representing one or more target publications and/or one or more target products. The results of the invalidity search may include citation data associated with a group of IP assets and/or individual IP assets associated with an entity accessing the IP analysis platform. In some cases, the invalidity component 228 may generate an invalidity metric indicating a likelihood that an IP asset may be considered to be invalid if it were to be challenged in a court of law. In some cases, the invalidity component 228 may generate the invalidity metric based on a density of other IP assets cited during prosecution of the IP asset, a density of other IP assets in which the IP asset was cited during prosecution, and/or litigation data associated with the other IP assets (e.g., result of invalidity challenges of the other IP assets). In some cases, the invalidity metric may be utilized by other component and/or sub-components to impact other metrics, such as the comprehensive breadth score metric.

In some cases, the coverage component 212 may utilize (e.g., aggregate) any metric generated by the various sub-components to generate a coverage metric associated with a group of IP assets associated with an entity and/or other entities. In some cases, other determinations may affect the coverage metric, such as, legal status of an IP asset (e.g., ownership of the IP asset), how a breadth scope of claims change during prosecution of an IP asset, etc.

In some examples, the filing velocity component 230 may make determinations and/or generate data to be displayed on the user interface. For example, a user may specify one or more target entities, one or more target publications, and/or one or more target products that the filing velocity component 230 may utilize to generate a filing velocity search. In some examples, the filing velocity component 230 may be configured to identify one or more target entities utilizing data representing one or more target publications and/or one or more target products. The results of the filing velocity search may include a filing velocity metric indicating a percentile rank of an entity for filing of IP assets in a given market area and/or technology area. For example, the filing velocity component 230 may identify a total amount of IP assets filed that are directed towards or otherwise associated with a given market area and/or technology area for a period of time (e.g., a year, five years, ten years, etc.) The filing velocity component 230 may then identify a number of IP assets filed by individual entities, such as an entity accessing the IP analysis platform and associated entity competitors, during that time period directed towards or otherwise associated with the market area and/or the technology area. In some examples, the filing velocity component 230 may then generate a percentile ranking for each entity based at least in part on comparing the number of IP assets filed by the individual entities during the time period to the total number of IP assets filed during the time period. In some examples, the percentile ranking of each entity may be utilized as a metric for the opportunity component 214 to generate an opportunity metric. For example, a low percentile ranking (e.g., 10%, 20%, 30%) may indicate that an entity is underperforming with regard to a number of IP assets filed in a particular market area and/or technology area. Additionally, and/or alternatively, a high percentile ranking (e.g., 70%, 80%, 90%) may indicate that an entity is overperforming with regard to a number of IP assets filed in a particular market area and/or technology area. In some examples, the filing velocity component 230 may determine a threshold percentile (e.g., 50%) in which the filing velocity component 230 may compare the percentile ranking of the entity (e.g., based on the number of IP assets filed by the entity) to in order to determine how the percentile ranking may affect the opportunity metric. For example, a percentile ranking of the entity being below the threshold percentile may indicate that an entity is underperforming with regard to a number of IP assets filed in a particular market area and/or technology area. Additionally, and/or alternatively, a percentile ranking of the entity being above the threshold percentile may indicate that an entity is overperforming with regard to a number of IP assets filed in a particular market area and/or technology area.

In some examples, the filing velocity component 230 may identify a total amount of IP assets filed that are directed towards or otherwise associated with an IP art unit for a period of time (e.g., a year, five years, ten years, etc.) The filing velocity component 230 may then identify a number of IP assets filed by individual entities, such as an entity accessing the IP analysis platform and associated entity competitors, during that time period directed towards or otherwise associated with the IP art unit. In some examples, the filing velocity component 230 may then generate a percentile ranking for each entity based at least in part on comparing the number of IP assets filed by the individual entities during the time period to the total number of IP assets filed during the time period. In some examples, the percentile ranking of each entity may be utilized as a metric for the opportunity component 214 to generate an opportunity metric. For example, a low percentile ranking (e.g., 10%, 20%, 30%) may indicate that an entity is underperforming with regard to a number of IP assets filed in a particular IP art unit. Additionally, and/or alternatively, a high percentile ranking (e.g., 70%, 80%, 90%) may indicate that an entity is overperforming with regard to a number of IP assets filed in a particular IP art unit.

In some examples, the predictive analytics component 232 may make determinations and/or generate data to be displayed on the user interface. For example, a user may specify one or more target entities, one or more target publications, and/or one or more target products that the predictive analytics component 232 may utilize to generate a predictive analytics search. In some examples, the predictive analytics component 232 may be configured to identify one or more target entities utilizing data representing one or more target publications and/or one or more target products. The results of the predictive analytics search may include a predicted comprehensive breadth score for a pending IP asset associated with an entity. For example, the predictive analytics component 232 may determine an examiner and/or an art unit associated with at least one pending IP asset filed or otherwise associated with the entity. In some cases, the predictive analytics component 232 may determine a comprehensive breadth score, as discussed herein, for at least one originally filed claim of an IP asset (e.g., application) previously examined by the examiner and/or previously filed in the art unit. The predictive analytics component 232 may then determine a comprehensive breadth score for an issued version of the originally filed claim of the application and generate an examiner metric and/or an art unit metric based at least in part on a difference between the comprehensive breadth score of the originally filed claims and the comprehensive breadth score of the issued claims. In this way, the predictive analytics component 232 may determine an effect that a particular examiner and/or art unit may have on a comprehensive breadth score of a potentially allowable claim. For example, the predictive analytics component 232 may determine predicted breadth score for a pending IP asset based at least in part on the examiner metric and/or the art unit metric. In some cases, the predicted breadth score may be utilized by the opportunity component 214 to generate the opportunity metric.

In some cases, the predictive analytics component 232 may generate a predicted issue date for a pending IP asset associated with an entity based on an average length of prosecution associated with an examiner and/or an art unit. In some cases, the predicted issue date may be utilized by the opportunity component 214 to generate the opportunity metric.

In some examples, the precedence component 234 may make determinations and/or generate data to be displayed on the user interface. For example, a user may specify one or more target entities, one or more target publications, and/or one or more target products that the precedence component 234 may utilize to generate a precedence search. In some examples, the precedence component 234 may be configured to identify one or more target entities utilizing data representing one or more target publications and/or one or more target products. The results of the precedence search may include metric data indicating a historical precedence associated with an IP asset. For example, the precedence component 234 may identify a particular market area and/or technology area associated with an IP asset and determine a number of similar IP assets filed within the identified market area and/or technology area. In some examples, if the number of other IP assets is low, then the precedence metric associated with the IP asset may be high. Additionally, and/or alternatively, if the number of other IP assets is high, then the precedence metric associated with the IP asset may be low. Once the precedence component 234 determines a precedence metric, the precedence metric may be provided to the opportunity component 214 and utilized to generate the opportunity metric.

In some cases, the opportunity component 214 may utilize (e.g., aggregate) any metric generated by the various sub-components to generate an opportunity metric associated with a group of IP assets associated with an entity and/or other entities.

In some examples, the litigation campaign component 236 may make determinations and/or generate data to be displayed on the user interface. For example, a user may specify one or more target entities, one or more target publications, and/or one or more target products that the litigation campaign component 236 may utilize to generate a litigation campaign search. In some examples, the litigation campaign component 236 may be configured to identify one or more target entities utilizing data representing one or more target publications and/or one or more target products. The results of the litigation campaign search may include data indicating a potential likelihood of litigation associated with a particular market area and/or technology area. For example, the litigation campaign component 236 may identify a litigation campaign associated with a market area and/or technology area by determining that an entity has filed at least two cases associated with the market area and/or technology area within the same calendar year. Once the litigation campaign component 236 determines that the at least two cases are part of a litigation campaign directed towards a particular market area and/or technology area, the litigation campaign component 236 may determine a period of time since the most recent filing of a case included in the litigation campaign, a number of defendants associated with the litigation campaign, and/or a non-practicing entity (NPE) status of the litigation campaign (e.g., whether the entity associated with the litigation campaign is an NPE or a practicing entity). In some examples, the litigation campaign component 236 may obtain litigation data (e.g., defendant information, plaintiff information, case filing information, etc.) from a third party resource and may store the data in the database. In some cases, the data generated by the litigation campaign component 236 may be provided to the exposure component 216 and utilized to generate an exposure metric.

In some examples, the alignment to exposure component 238 may make determinations and/or generate data to be displayed on the user interface. For example, a user may specify one or more target entities, one or more target publications, and/or one or more target products that the alignment to exposure component 238 may utilize to generate an alignment to exposure search. In some examples, the alignment to exposure component 238 may be configured to identify one or more target entities utilizing data representing one or more target publications and/or one or more target products. The results of the alignment to exposure search may include metric data indicating a potential exposure metric associate with a group of IP assets associated with an entity with regard to potential litigation. For example, the alignment to exposure component 238 may determine a market area and/or technology area associated with a group of IP assets filed and/or otherwise associated with an entity, such as an entity utilizing the IP analysis platform. The alignment to exposure component 238 may then identifying a litigation history (e.g., past litigation and current litigation) associated with the technology area and/or market area. In some cases, if there is a large amount of litigation associated with the market area and/or technology area, the alignment to exposure component 238 may determine that the group of IP assets are at a greater risk of litigation. Additionally, and/or alternatively, if there is a small amount of litigation associated with the market area and/or technology area, the alignment to exposure component 238 may determine that the group of IP assets are at a lesser risk of litigation. In some cases, the data generated by the alignment to exposure component 238 may be provided to the exposure component 238 and utilized to generate an exposure metric.

In some examples, the scoring component 122 may utilize data received from and/or metrics generated by the coverage component 212, the opportunity component 214, the exposure component 216, and the respective metrics associated with each component to generate an overall score for a group of IP assets associated with an entity. The overall score may indicate i) an overall coverage and/or identify gaps in coverage; ii) a potential market opportunity; and/or iii) a potential exposure associated with the IP assets. included in the targeted technical fields, subject matters, and/or competitor entities portfolios.

In some examples, the scoring component 122 may be configured to receive data representing a seeded search query and may perform a search operation in a number of ways and provide data and/or metrics to the various other components and sub-components discussed herein. A seeded search query may include one or more instances of target data. In some examples, the seeded search query may indicate an identification of one or more target entities. Additionally, or alternatively, the seeded search query may indicate an identification of one or more target publications, such as, for example, an IP asset. Additionally, or alternatively, the seeded search query may indicate an identification of one or more target products and/or services. In some examples, the IP analysis platform may be configured to receive additional data associated with the seeded search query. For example, the scoring component 122 may be configured to receive additional data via one or more actionable elements included on a graphical user interface (GUI) presented on a computing device and accessible to a user account. Additionally, or alternatively, the scoring component 122 may be configured to utilize the data representing a seeded search query to make various identifications and determinations associated with IP assets and/or entities, among other things.

The user interface generation component 240 may be configured to generate user interface element(s), window(s), page(s), and/or view(s) described below with respect to FIGS. 3-7 using data received from other components utilized by the IP analysis platform. In some examples, the user interface generation component 240 may be communicatively coupled to the other components stored thereon the computer-readable media 120. In some examples, the user interface generation component 240 may generate user interfaces configured to present information associated with user account(s) 202 data, analysis report(s) 204 data, and/or saved results 242. Additionally, or alternatively, the user interface generation component 240 may generate user interfaces including confidential information and may be configured to be accessible by only users with predetermined qualifications. For example, the user interface generation component 240 may cause only a portion of information to be displayed based on the type of account that is accessing the platform. For example, when a user accesses the system, the user interface generation component 240 may determine that the account type of the account that the user has utilized to access the system may be one of, for example, an internal user and/or an external user, and may only include a portion of the information to be displayed that is associated with that account type. In some examples, the user interface generation component 240 may generate notifications to send to the user accounts.

FIGS. 3-7 illustrate conceptual diagrams of example user interface(s) 300-700 that may receive user input and utilize the IP analysis platform to perform the various operations described above with respect to FIGS. 1 and 2 and/or the various operations described below with respect to FIGS. 8-17. The user interface(s) 300-700 may be generated by the user interface generation component 240 described with respect to FIG. 2 above. The user interface(s) 300-700 may be displayed on a display of an electronic device associated with a user account, such as the electronic device 102 as described with respect to FIG. 1 above. While example user interface(s) 300-700 are shown in FIGS. 3-7, the user interface(s) 300-700 are not intended to be construed as a limitation, and the user interface(s) 300-700 may be configured to present any of the data described herein.

Figure 3:
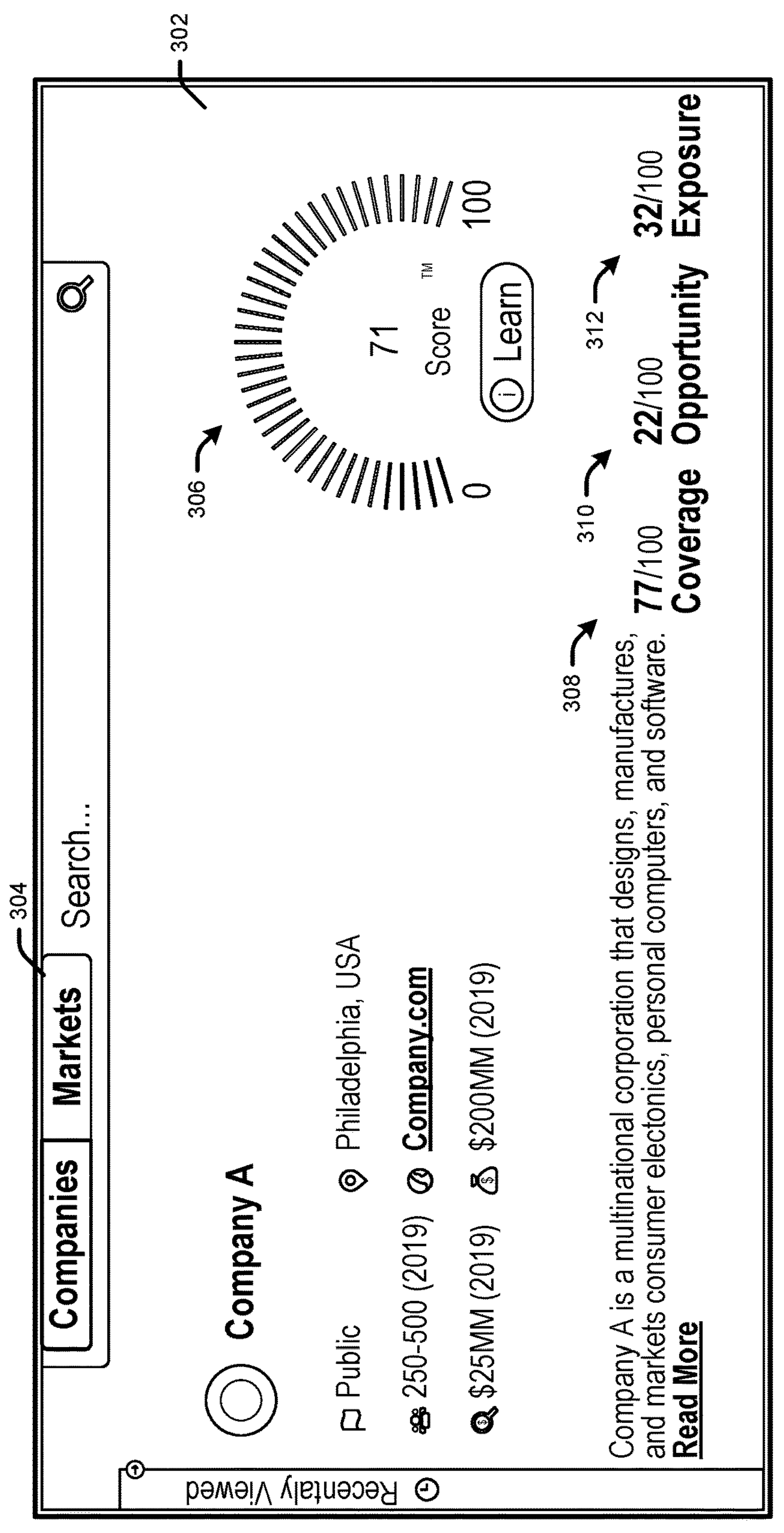
FIG. 3 illustrates an example user interface for displaying data associated with a user account representing intellectual-property score data and/or one or more actionable elements.

FIG. 3 illustrates an example user interface 300 configured to present data associated with a user account representing a user created IP analysis reports(s) associated with a user account. The user interface 300 may include a comprehensive score page 302 and be displayed on a display of an electronic device associated with a user account, such as, for example, the electronic device 102 as described with respect to FIG. 1 above.

In some examples, the comprehensive score page 302 may include a number of views that may be presented in response to selection of a corresponding view selection element 304. For example, the comprehensive score page 302 may display a comprehensive score 306 indicating an IP coverage associated with the IP asset portfolio and/or a subset of the IP asset portfolio. The comprehensive score page 302 may also display a coverage score 308 (e.g., coverage metric), an opportunity score 310 (e.g., an opportunity metric), and an exposure metric 312 (e.g., an exposure metric) that are used by the IP analysis platform to generate the comprehensive score 306. The comprehensive score page 302 may also include other information (e.g., company name, location, website, revenue data, employee data, and/or summary data) associated with an entity in which the analysis report is based on.

Figure 4A:
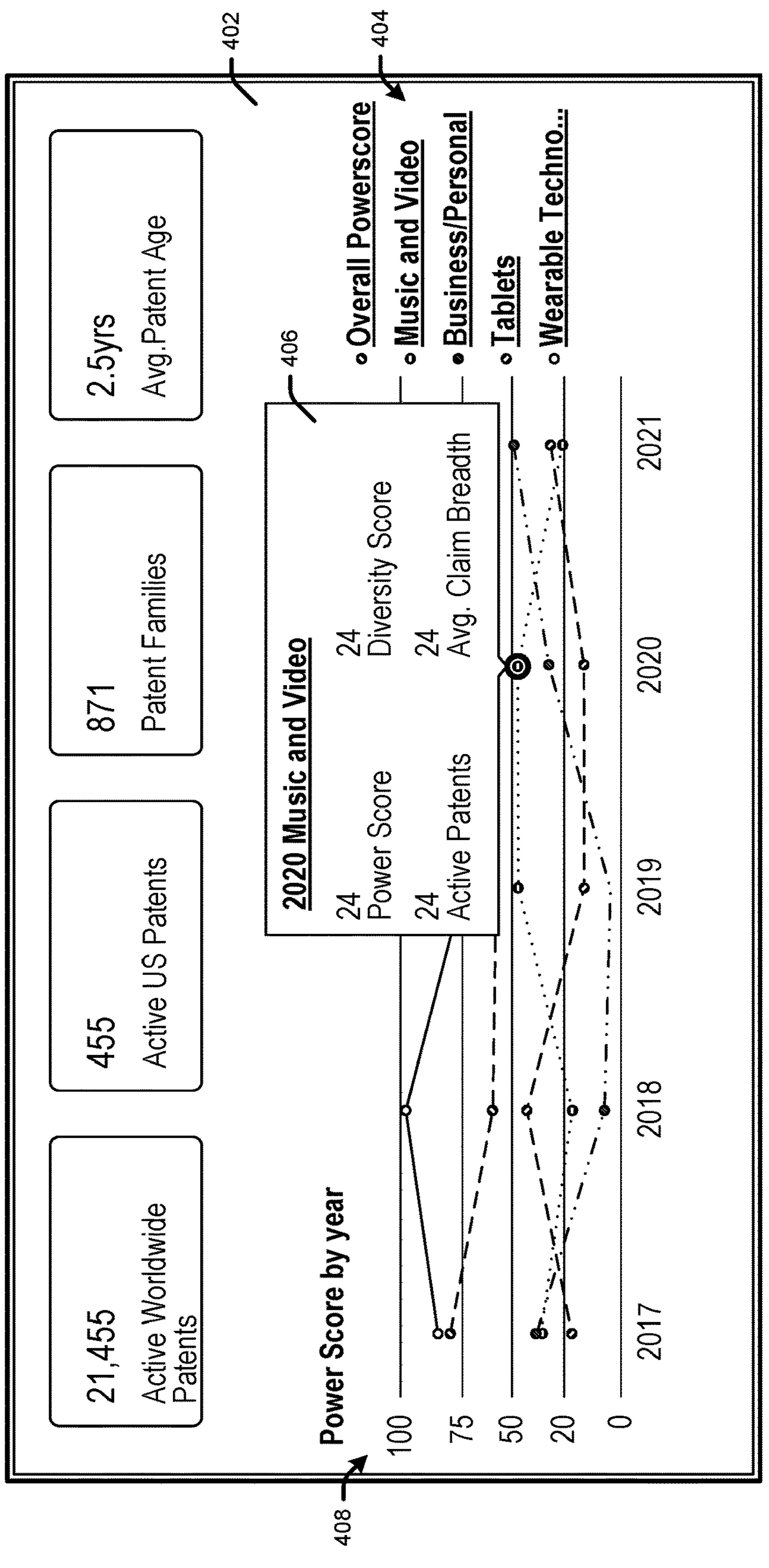
FIG. 4A illustrates an example user interface for displaying data associated with a user account representing an intellectual-property score data and/or one or more actionable elements.
Figure 4B:
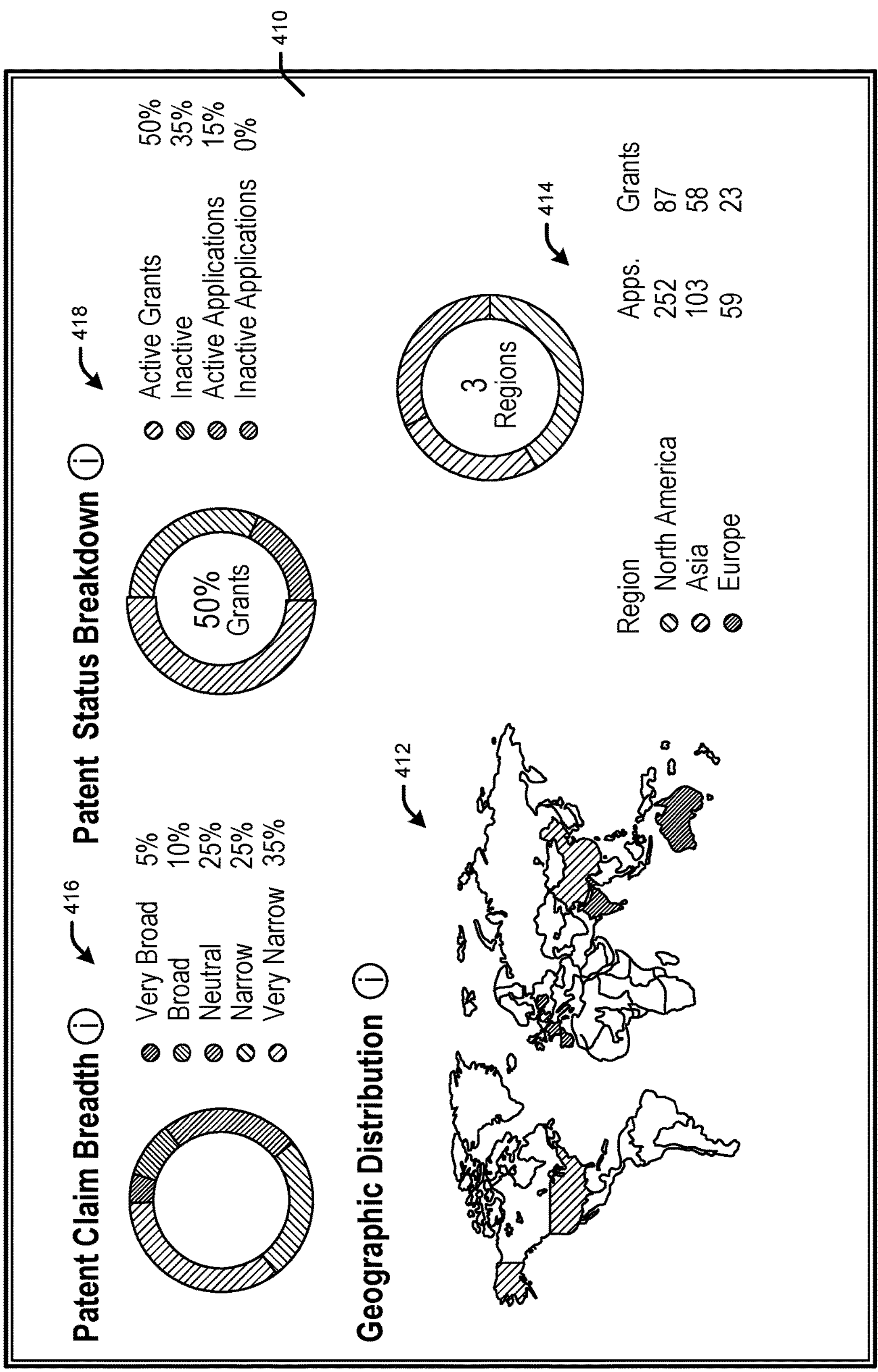
FIG. 4B illustrates an example user interface for displaying data associated with a user account representing an intellectual-property geographic data and/or one or more actionable elements.

FIGS. 4A and 4B illustrate an example user interface 400 for displaying data associated with a user account representing information associated with comprehensive breadth scores of IP assets of an entity. The user interface 400 may include a comprehensive breadth score page 402 and/or a geographic distribution page 410 and may be displayed on a display of an electronic device associated with a user account, such as, for example, the electronic device 102 as described with respect to FIG. 1 above.

In some examples, the comprehensive breadth score page 402 may include a number of views that may be presented in response to selection of a corresponding view selection element. For example, the comprehensive breadth score page 402 may display one or more markets 404 (e.g., music and video, smartphones, business/personal, wearable technology, tablets, etc.) associated with a technology area (e.g., electronics) as well as one or more metrics 406 generated by the sub-components of the IP analysis platform. In some cases, the metrics 406 may include a comprehensive breadth score (in some cases referred to as a "power score") associated with IP assets directed to each of the markets and/or technology areas as well as an overall (e.g., total) comprehensive breadth score for the total IP assets (e.g., the IP asset portfolio). In some cases, the comprehensive breadth scores may be plotted on a line graph 408 illustrating how the comprehensive breadth scores have changed year-to-year for each market and/or technology area as well as the overall comprehensive breadth score. In some cases, the metrics 406 may be displayed in response to a user input (e.g., a click, a hover, a touch input) received on the line graph 408. For example, a user may interact with one of the data points on the line graph 408 and the metrics 406 may be displayed that area associated with the selected data point. While a line graph 408 is depicted in the example user interface 400, the comprehensive breadth scores may be plotted on additional graphs, such as, a bar graph, a scatter plot, a table, a stacked area chart, a ribbon chart, and the like. The comprehensive breadth score page 402 may also illustrate values associated with the IP assets of a given entity, such as number active worldwide IP assets, number of active U.S. IP assets, number of IP asset families, and/or average age of an IP asset. In some cases, the data presented on the comprehensive breadth score page 402 may be generated by the comprehensive breadth score component 222.

In some examples, the geographic distribution page 410 may include a number of views that may be presented in response to selection of a corresponding view selection element. For example, the geographic distribution page 410 may present a map 412 showing regions in which portions of IP assets from an IP asset portfolio of an entity are filed. In some cases, the geographic distribution page 410 may further present a table 414 illustrating pending IP assets and granted IP assets and the associated regions in which they have been filed. In some examples, the geographic distribution page 410 may include an IP asset breadth indicator 416 that displays a breakdown of a comprehensive breadth score for individual IP assets of a group (e.g., portfolio) of IP assets. In some cases, the IP asset breadth indicator 416 may present the breakdown based on percentages and an associated breadth (e.g., very broad, broad, neutral, narrow, and/or very narrow) associated with each percentage. In some examples, the geographic distribution page 410 may include an IP asset status indicator 418 that displays a breakdown of a prosecution status for individual IP assets of a group (e.g., portfolio) of IP assets. In some cases, the IP asset status indicator 418 may present the breakdown based on percentages and an associated status (e.g., active grants, inactive, active applications, and/or inactive applications) associated with each percentage. In some cases, the data presented on the geographic distribution page 410 may be generated by the geographic distribution component 218.

Figure 5A:
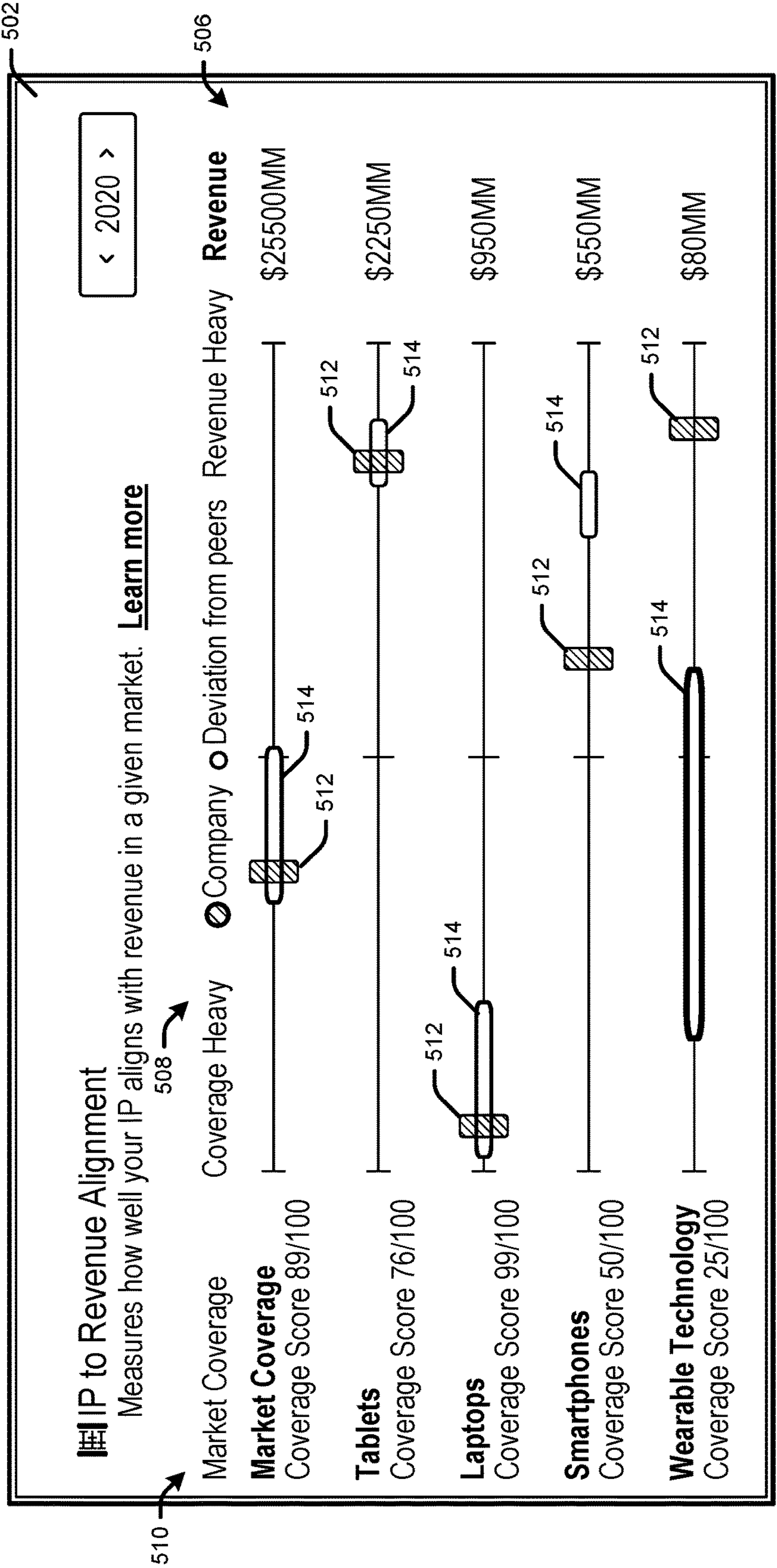
FIG. 5A illustrates an example user interface for displaying data associated with a user account representing an intellectual-property to revenue alignment data and/or one or more actionable elements.
Figure 5B:
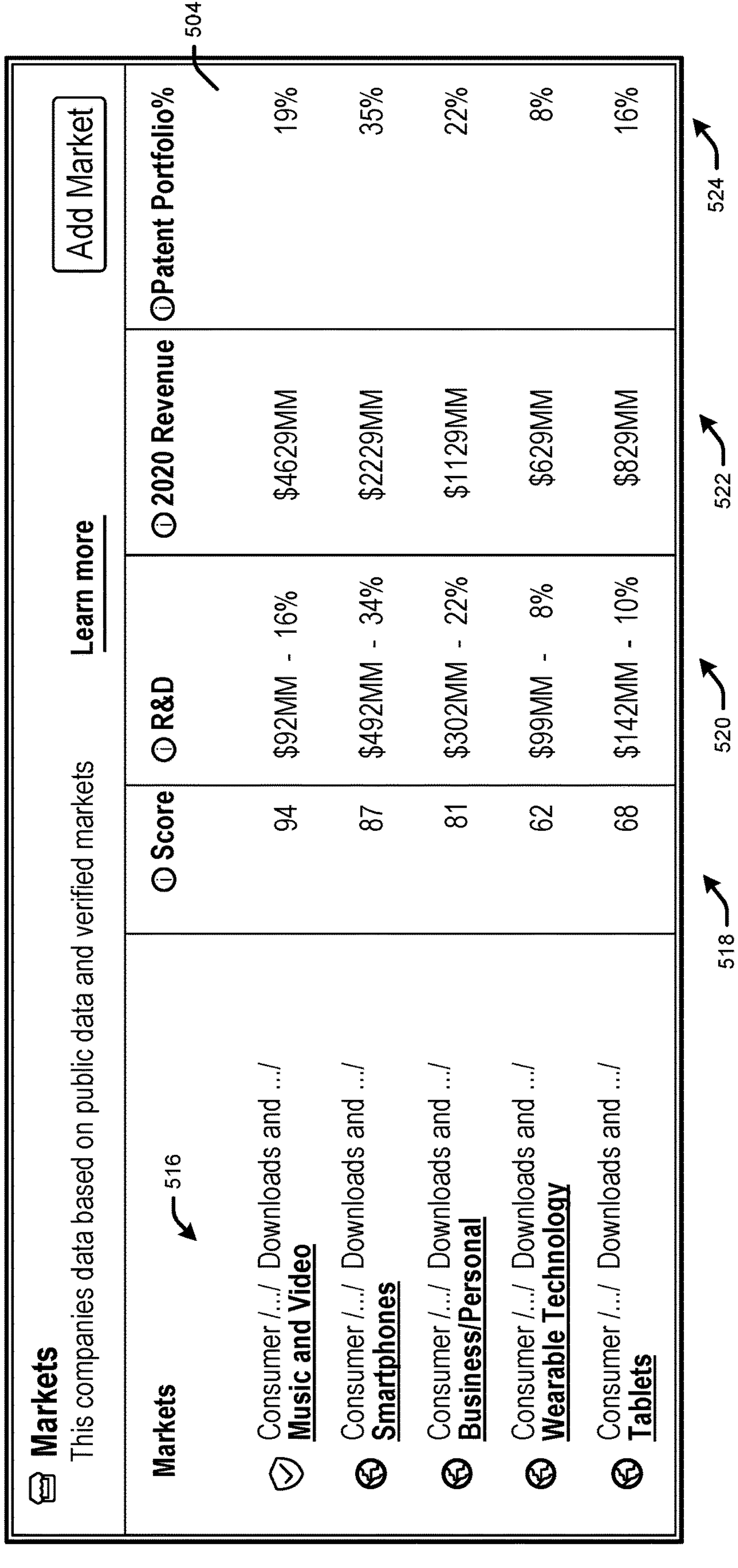
FIG. 5B illustrates an example user interface for displaying data associated with a user account representing an intellectual-property market data and/or one or more actionable elements.

FIGS. 5A and 5B illustrate an example user interface 500 for displaying data associated with a user account representing information associated with revenue alignment to IP assets of an entity. The user interface 500 may include an IP to revenue alignment page 502 and a market analysis page 504 and may be displayed on a display of an electronic device associated with a user account, such as, for example, the electronic device 102 as described with respect to FIG. 1 above.

In some examples, the IP to revenue alignment page 502 may include a number of views that may be presented in response to selection of a corresponding view selection element. For example, the revenue alignment page 502 may display one or more markets (e.g., music and video, smartphones, business/personal, wearable technology, tablets, etc.) associated with a technology area (e.g., electronics) as well as one or more metrics 508 generated by the sub-components of the IP analysis platform. In some cases, the IP revenue alignment page 502 may illustrate a revenue 506 generated by an entity from each of the markets and/or technology areas 510. The revenue alignment page 502 may also display an indication of a percentage of revenue generated in a market and/or technology area of a total amount of revenue generated by the entity compared to a percentage of intellectual-property assets directed to the one or more technology areas from a total amount of intellectual-property assets filed by the entity. For example, the IP to revenue alignment page 502 may include an indicators 512 that indicate whether the entity is "coverage heavy" or is "revenue heavy" with respect to an individual market area and/or technology area. In some examples, the indicators 512 may indicate that a percentage of IP assets of a group (e.g., portfolio) of IP assets directed towards a market area and/or technology area is less than or greater than a percentage of revenue generated from the market area and/or technology area. In some examples, the IP to revenue alignment page 502 may display an indication of a percentage of revenue obtained by other entities for each of the markets and/or technology areas and the percentage of intellectual-property assets associated with the other entities directed towards the markets and/or technology areas. For example, the IP to revenue alignment page 502 may include an indicators 514 that indicate whether other entities (e.g., entities that also operate in the market areas and/or technology areas) are "coverage heavy" or are "revenue heavy" with respect to an individual market area and/or technology area. In some examples, the indicators 514 may indicate that an aggregated percentage of IP assets of a group (e.g., portfolio) of IP assets directed towards a market area and/or technology area is less than or greater than an aggregated percentage of revenue generated from the market area and/or technology area for the other entities. In this way, the IP to revenue alignment page 502 may provide an indication to the entity how they compare to other entities with respect to a percentage of IP assets directed towards particular market areas and/or technology areas and the revenue generated by those market areas and/or technology areas. In some cases, the data presented on the IP to revenue alignment page 502 may be generated by the revenue alignment component 226.

In some examples, the market analysis page 504 may include a number of views that may be presented in response to selection of a corresponding view selection element. For example, the market analysis page 504 may display one or more markets 516 associated with an entity as well as one or more metrics generated by the sub-components of the IP analysis platform. For example, the market analysis page 504 may display a comprehensive breadth score metric 518 associated with IP assets of the entity that are directed towards each market and/or technology area, a research and development value 520 spent by the entity that was directed towards each market and/or technology area, a revenue value 522 generated by the entity from each market and/or technology area, and/or a percentage of IP assets 524 of a group of IP assets associated with the entity that are directed towards each market and/or technology area. In some cases, the data presented on the market analysis page 504 may be generated by the revenue alignment component 226. In some cases, the data used to generate the market analysis page 504 may be obtained by any one of the components discussed herein from a third party source (e.g., publicly available data source) and/or the historical data 208 and/or the market data 244.

Figure 6A:
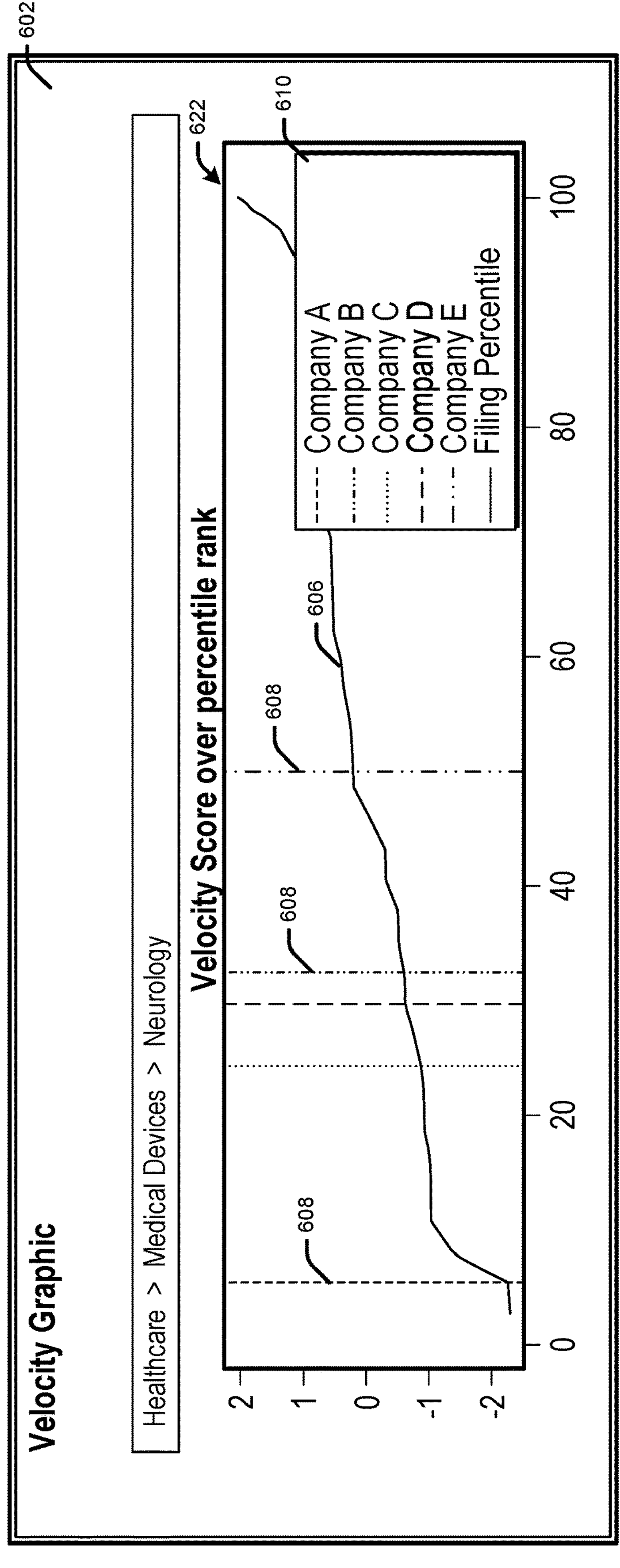
FIG. 6A illustrates an example user interface for displaying data associated with a user account representing an intellectual-property filing data and/or one or more actionable elements.
Figure 6B:
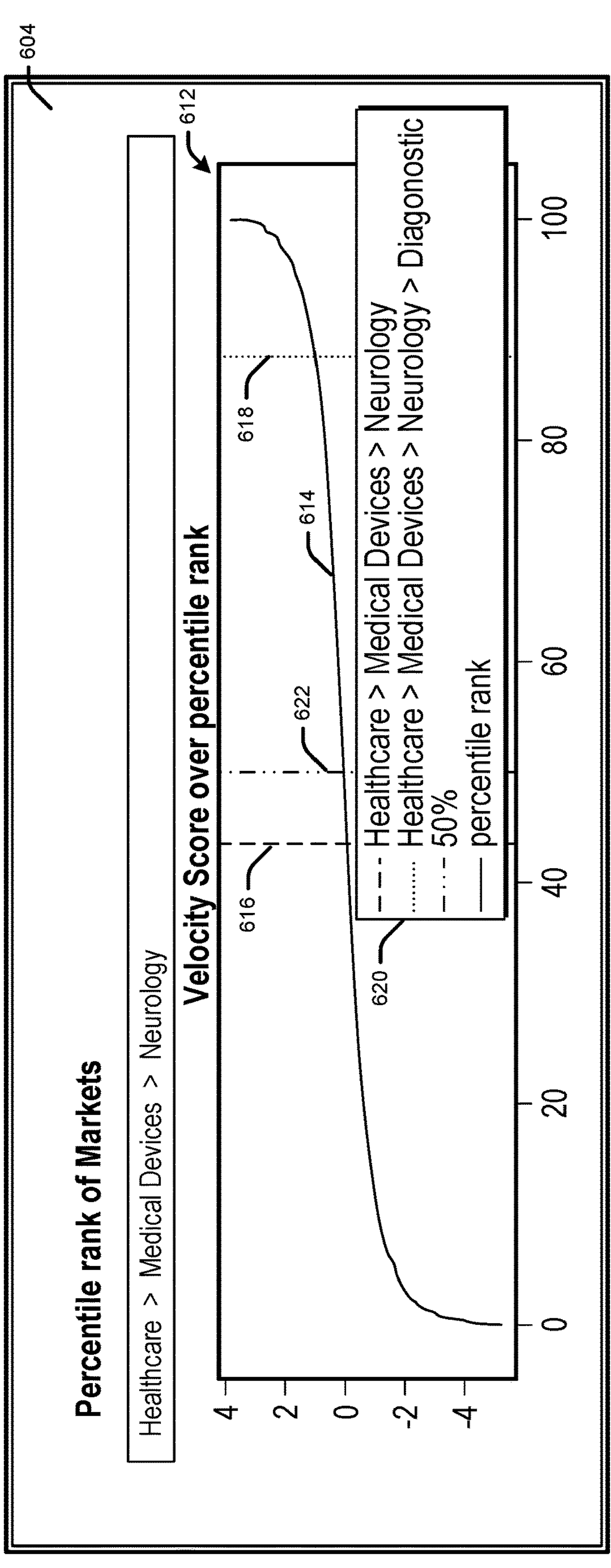
FIG. 6B illustrates an example user interface for displaying data associated with a user account representing an intellectual-property filing data and/or one or more actionable elements.

FIGS. 6A and 6B illustrate an example user interface 600 for displaying data associated with a user account representing information associated with filing of IP assets of an entity. The user interface 600 may include a filing velocity graph page 602 and a filing velocity curve page 604 that may be displayed on a display of an electronic device associated with a user account, such as, for example, the electronic device 102 as described with respect to FIG. 1 above. In some examples, the user interface 600 may be presented and/or utilized by the remote computing resources 104 and/or a device associated with the remote computing resources 104 for purposes internal to the remote computing resources 104 (e.g., for reference and/or utilization by engineers associated with the remote computing resources 104).

In some examples, the filing velocity graph page 602 may include a number of views that may be presented in response to selection of a corresponding view selection element. For example, the filing velocity graph page 602 may present a graph 622 illustrating a percentile rank associated with a number of IP assets filed by an entity (e.g., Company A, Company B, Company C, . . . ) directed towards a particular market and/or technology area (e.g., healthcare, medical device, neurology, etc.) with respect to a total number of IP assets filed that were directed towards the particular market and/or technology area. For example, a line 606 may represent a filing percentile of IP assets for a particular market and/or technology area. In the case of graph 622, the market and/or technology area includes neurology as a sub-category of medical devices and healthcare. The vertical lines 608 may illustrate the percentile rank of IP asset filing for the given market and/or technology area based on the vertical lines 608 intersection with the line 606. Each vertical line 608 may correspond to an entity found in the key 610. In some cases, the filing velocity graph page 602 may receive user input to switch which markets and/or technology areas and/or select sub-categories within a market and/or technology area. In some cases, the data presented on the filing velocity graph page 602 may be generated by the filing velocity component 230.

In some examples, the filing velocity curve page 604 may include a number of views that may be presented in response to selection of a corresponding view selection element. For example, the filing velocity curve page 604 may present a graph 612 illustrating an S-curve representing a percentile rank associated with a number of IP assets filed by an entity directed towards a particular market and/or technology area (e.g., healthcare, medical device, neurology, etc.) with respect to a total number of IP assets filed that were filed by that entity. For example, a line 614 may represent a filing percentile of IP assets for a particular market and/or technology area that the entity may be filing IP assets in. In the case of graph 612, the market and/or technology area includes diagnostic as a sub-category of neurology, medical devices, and healthcare. The vertical line 616 and vertical line 618 may illustrate the percentile rank of IP asset filing for a subcategory (e.g., neurology and/or diagnostic) of a given market and/or technology (e.g., healthcare) area based on the vertical lines 616 and 618 intersection with the line 614. Each vertical line 616 and vertical line 618 may correspond to a sub-category found in the key 620. In some cases, the graph 612 may include a $50^{th}$ percentile line 622 to illustrate a location of midway on the line 614. In some cases, the filing velocity curve page 604 may receive user input to switch which markets and/or technology areas and/or select sub-categories within a market and/or technology area. In some cases, the data presented on the filing velocity curve page 604 may be generated by the filing velocity component 230.

Figure 7A:
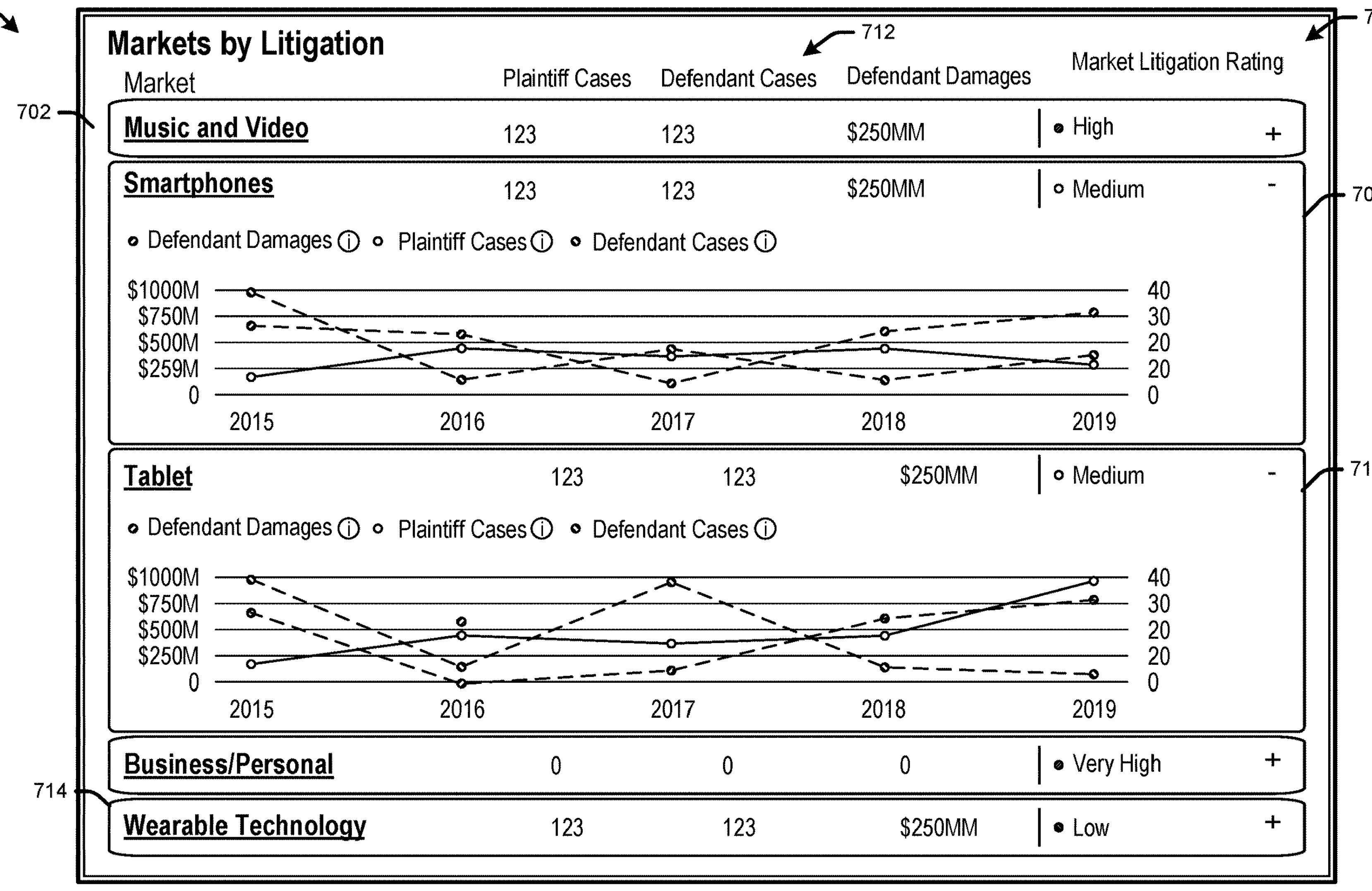
FIG. 7A illustrates an example user interface for displaying data associated with a user account representing an intellectual-property litigation data and/or one or more actionable elements.
Figure 7B:
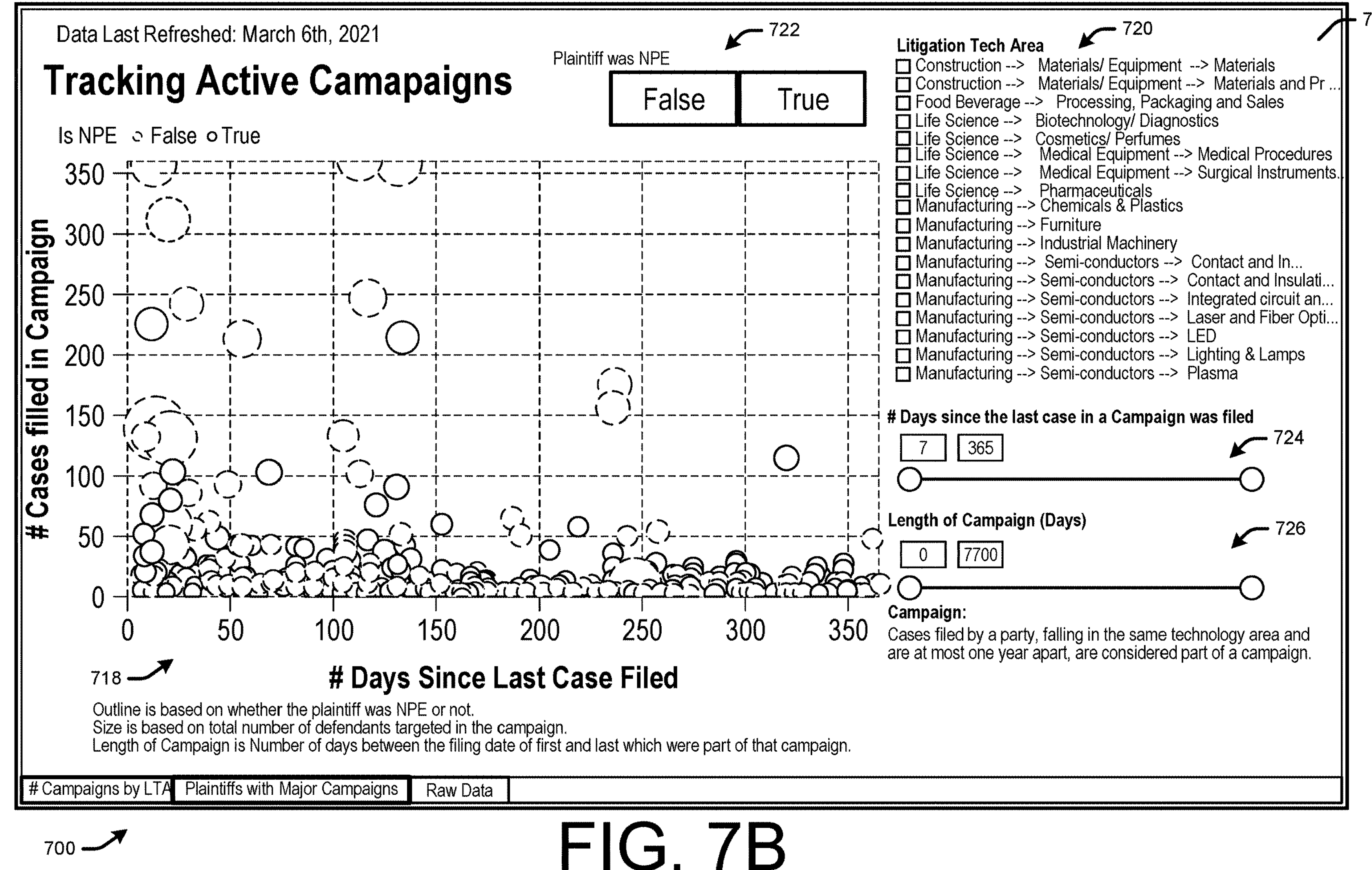
FIG. 7B illustrates an example user interface for displaying data associated with a user account representing an intellectual-property litigation data and/or one or more actionable elements.
Figure 7C:
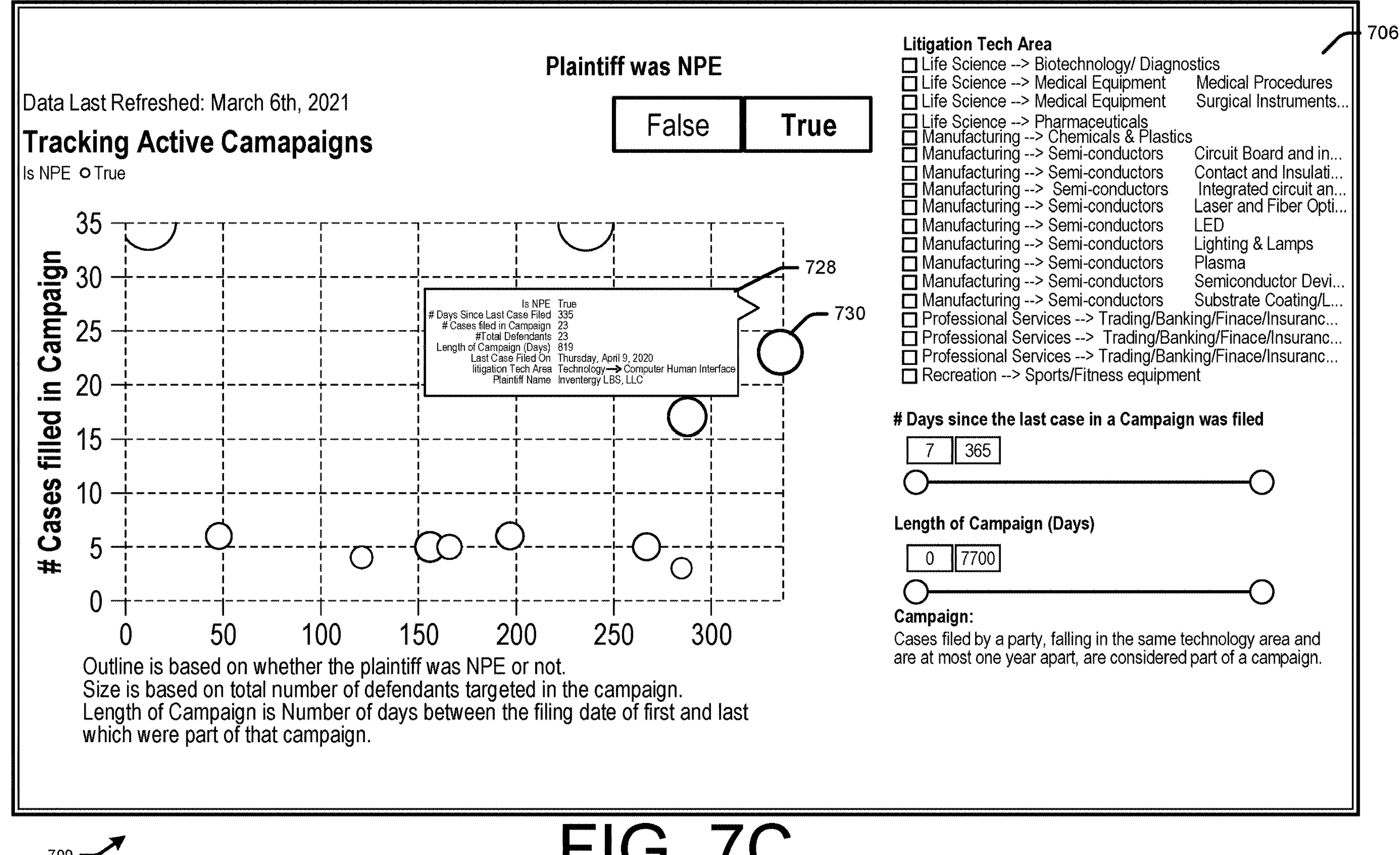
FIG. 7C illustrates an example user interface for displaying data representing an intellectual-property litigation data and/or one or more actionable elements.

FIGS. 7A-7C illustrate an example user interface 700 for displaying data associated with a user account representing information associated with litigation cases based on IP assets of an entity. The user interface 700 may include a market litigation page 702, a litigation campaign page 704, and a litigation campaign page 706. In some examples, the user interface 700 may be displayed on a display of an electronic device associated with a user account, such as, for example, the electronic device 102 as described with respect to FIG. 1 above.

In some examples, the market litigation page 702 may include a number of views that may be presented in response to selection of a corresponding view selection element. For example, the market litigation page 702 may illustrate market litigation data associated with a particular market and/or technology area. In some cases, the market litigation data may be a graphic, such as a, for example, a heatmap, a bar graph, a line graph, and/or any trend analysis graph. For example, the market litigation page 702 may include multiple graphs, such as a graph 708 and a graph 710, presenting litigation data 712 (e.g., defendant damages, plaintiff cases, defendant cases, etc.) for a particular market and/or technology area over a period of time (e.g., years). In some cases, the graphs may be collapsible and present the litigation data 712 in a collapsible view, such as the collapsible view 714. In some examples, the market litigation page 702 may include a market litigation rating 716 that indicates a rating (e.g., low, medium, high, very high, etc.) of how much litigation and/or damages may be associated with a particular market and/or technology area. In some cases, the data presented on the market litigation page 702 may be generated by the comprehensive litigation campaign component 236.

In some examples, the litigation campaign page 704 may include a number of views that may be presented in response to selection of a corresponding view selection element. For example, the litigation campaign page 704 may illustrate litigation campaign data associated with a particular market and/or technology area. In some cases, the litigation campaign page 704 may be a graphic, such as a, for example, a heatmap, a bar graph, a line graph, and/or any trend analysis graph. In some examples a graph 718 may include a graphic that may include a bubble (e.g., a circle) illustrating an identified litigation campaign. In some cases, different aspects of the bubble may represent different characteristics of the litigation campaign. For example, a size of the bubble may correspond to a total number of defendants targeted in the litigation campaign, a color of the bubble may indicate a non-practicing entity (NPE) status of the litigation campaign, the x-axis may represent the number of days since the filing of the most recent case in the litigation campaign, and the y-axis may represent a total number of cases filed in the litigation campaign. In some examples, the litigation campaign page 704 may include selectable options 720 that enable a user to select particular technology areas in which a litigation campaign may be active and that will cause the graph 718 to present litigation campaign data associated with the selected technology. In some examples, the litigation campaign page 704 may include an NPE status toggle 722 (e.g., indicating "True" or "False") that may remove bubbles or add bubbles to the graph 718 based on whether or not the entity that filed the litigation campaign is an NPE or a practicing entity. In some examples, the litigation campaign page 704 may include a filter 724 which may enable a user to filter the graph 718 based on a number of days since a most recent case was filed in a litigation campaign and a filter 726 which may enable a user to filter the graph 718 based on a length (e.g., number of days) a litigation campaign has lasted. FIG. 7C illustrates a window 728 that may be presented in response to a user input (e.g., touch input, click input, hover input, etc.) and may include details for a particular litigation campaign 730. For example, the details may include a non-practicing entity (NPE) status, a number of days since a most recent filing of a litigation case, a total number of case filings in the litigation campaign, a length of the litigation campaign, a total number of defendants in the litigation campaign, a technology area associated with the litigation campaign, and/or a plaintiff associated with the litigation campaign. In some cases, the data presented on the litigation campaign page 704 and the litigation campaign page 706 may be generated by the litigation campaign component 236.

FIGS. 8-17 illustrate example processes associated with the IP analysis platform. The processes described herein are illustrated as collections of blocks in logical flow diagrams, which represent a sequence of operations, some or all of which may be implemented in hardware, software or a combination thereof. In the context of software, the blocks may represent computer-readable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, although the processes may be implemented in a wide variety of other environments, architectures and systems.

Figure 8:
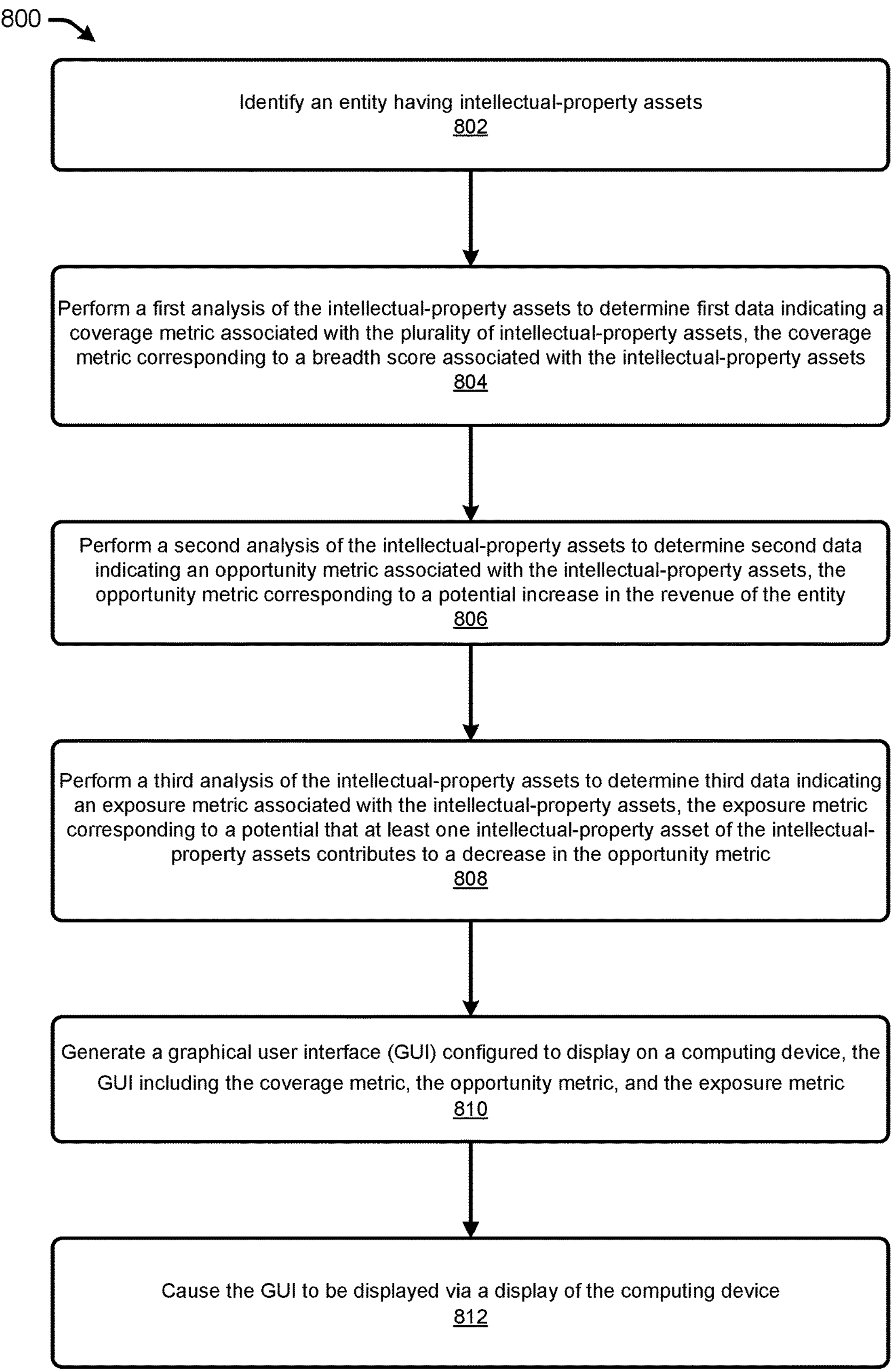
FIG. 8 illustrates an example flow diagram of an example process for utilizing a target entity having IP assets generate a user interface configured to present an analysis of the IP assets.

FIG. 8 illustrates an example flow diagram of an example process 800 for utilizing a target entity having IP assets generate a user interface configured to present an analysis of the IP assets. The order in which the operations or steps are described is not intended to be construed as a limitation, and any number of the described operations may be combined in any order and/or in parallel to implement process 800. The operations described with respect to the process 800 are described as being performed by an electronic device and/or a remote computing resource associated with the IP analysis platform. However, it should be understood that some or all of these operations may be performed by some or all of components, devices, and/or systems described herein.

At block 802, the process 800 may include identifying an entity having intellectual-property assets.

At block 804, the process 800 may include performing a first analysis of the intellectual-property assets to determine first data indicating a coverage metric associated with the plurality of intellectual-property assets, the coverage metric corresponding to a breadth score associated with the intellectual-property assets.

At block 806, the process 800 may include performing a second analysis of the intellectual-property assets to determine second data indicating an opportunity metric associated with the intellectual-property assets, the opportunity metric corresponding to a potential increase in the revenue of the entity.

At block 808, the process 800 may include performing a third analysis of the intellectual-property assets to determine third data indicating an exposure metric associated with the intellectual-property assets, the exposure metric corresponding to a potential that at least one intellectual-property asset of the intellectual-property assets contributes to a decrease in the opportunity metric.

At block 810, the process 800 may include generating a graphical user interface (GUI) configured to display on a computing device, the GUI including the coverage metric, the opportunity metric, and the exposure metric. In some examples, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 812, the process 800 may include causing the GUI to be displayed via a display of the computing device.

Additionally, or alternatively, the first analysis may include evaluating fourth data obtained from a plurality of first data sources to determine the first data. Additionally, or alternatively, the second analysis may include evaluating fifth data obtained from a plurality of second data sources to determine the second data. Additionally, or alternatively, the third analysis may include evaluating sixth data obtained from a plurality of third data sources to determine the third data. In some examples, the fourth data includes at least one of geographical data, breadth data, expiration data, diversity data, revenue alignment data, or invalidity data. In some examples, the fifth data includes at least one of filing velocity data, spending data, predictive analytics data, or precedence data. In some examples, the sixth data includes at least one of litigation data, market data, or revenue alignment data.

Additionally, or alternatively, the process 800 may include generating, based at least in part on the first data, the second data, and the third data, fourth data. In some examples, the fourth data indicates a comprehensive metric associated with the intellectual-property assets; Additionally, or alternatively, the process 800 may include causing the user interface to display the comprehensive metric.

Additionally, or alternatively, the process 800 may include calculating, for a document included in the intellectual-property assets, a word count score for individual portions of text included in the document, the word count score being based at least in part on a word count associated with the individual portions of text and word counts associated with additional portions of text from at least one other document of the plurality of documents. Additionally, or alternatively, the process 800 may include calculating a commonness score for the individual portions of text based at least in part a frequency in which words within the individual portions of text are found in the additional portions of text from the at least one other document. Additionally, or alternatively, the process 800 may include calculating a breadth score for the individual portions of text based at least in part on the word count score and the commonness score for the individual portions of text. Additionally, or alternatively, the process 800 may include calculating an overall breadth score for the document based at least in part on the breadth scores for the individual portions of text.

Additionally, or alternatively, the process 800 may include identifying one or more technology areas associated with the entity. Additionally, or alternatively, the process 800 may include identifying one or more revenue streams of the entity that are associated with the technology areas. Additionally, or alternatively, the process 800 may include identifying a number of the intellectual-property assets of the entity that are associated with the one or more technology areas. Additionally, or alternatively, the process 800 may include generating an alignment metric based at least in part on the number of the intellectual-property assets associated with the one or more technology areas. In some examples, the alignment metric corresponds to the coverage metric Additionally, or alternatively, the process 800 may include identifying a technology area associated with the entity. Additionally, or alternatively, the process 800 may include identifying a total number of intellectual-property assets filed between a first date and a second date, the intellectual-property assets being associated with the technology area. Additionally, or alternatively, the process 800 may include determining a number of intellectual-property assets filed by the entity between the first date and the second date, the intellectual-property assets being associated with the technology area. Additionally, or alternatively, the process 800 may include generating a percentile rank based at least in part on the number of intellectual-property assets filed by the entity compared to the total number of intellectual-property assets filed between the first date and the second date. In some examples, the percentile rank corresponds to the opportunity metric.

Additionally, or alternatively, the process 800 may include identifying historical data associated with the entity based at least in part on a priority date associated with individual ones of the intellectual-property assets and an expiration date associated with the individual ones of the intellectual-property assets, the historical data indicating one or more trends associated with the entity. In some examples, the exposure metric is based at least in part on the historical data. In some examples, the historical data further indicates a litigation history associated with the intellectual-property assets and the exposure metric is based at least in part on the litigation history of the intellectual-property assets.

Additionally, or alternatively, the process 800 may include identifying a technology area associated with the entity. Additionally, or alternatively, the process 800 may include identifying a total number of litigation cases filed between a first date and a second date, the litigation cases being associated with the technology area. Additionally, or alternatively, the process 800 may include identifying a number of intellectual-property assets filed by the entity that are associated with the technology area. Additionally, or alternatively, the process 800 may include generating a score based at least in part on the number of intellectual-property assets filed by the entity compared to the overall number of litigation cases filed between the first date and the second date. In some examples the exposure metric is based at least in part on the score. In some examples, generating the score may be based at least in part on a non-practicing entity (NPE) status of the total number of litigation cases, a first number of days since a most recent filing of a litigation case of the litigation cases, a length of a litigation case of the litigation cases, a second number of defendants associated with the litigation cases, a third number of filings associated with the litigation cases, or a plaintiff associated with the litigation cases.

Figure 9:
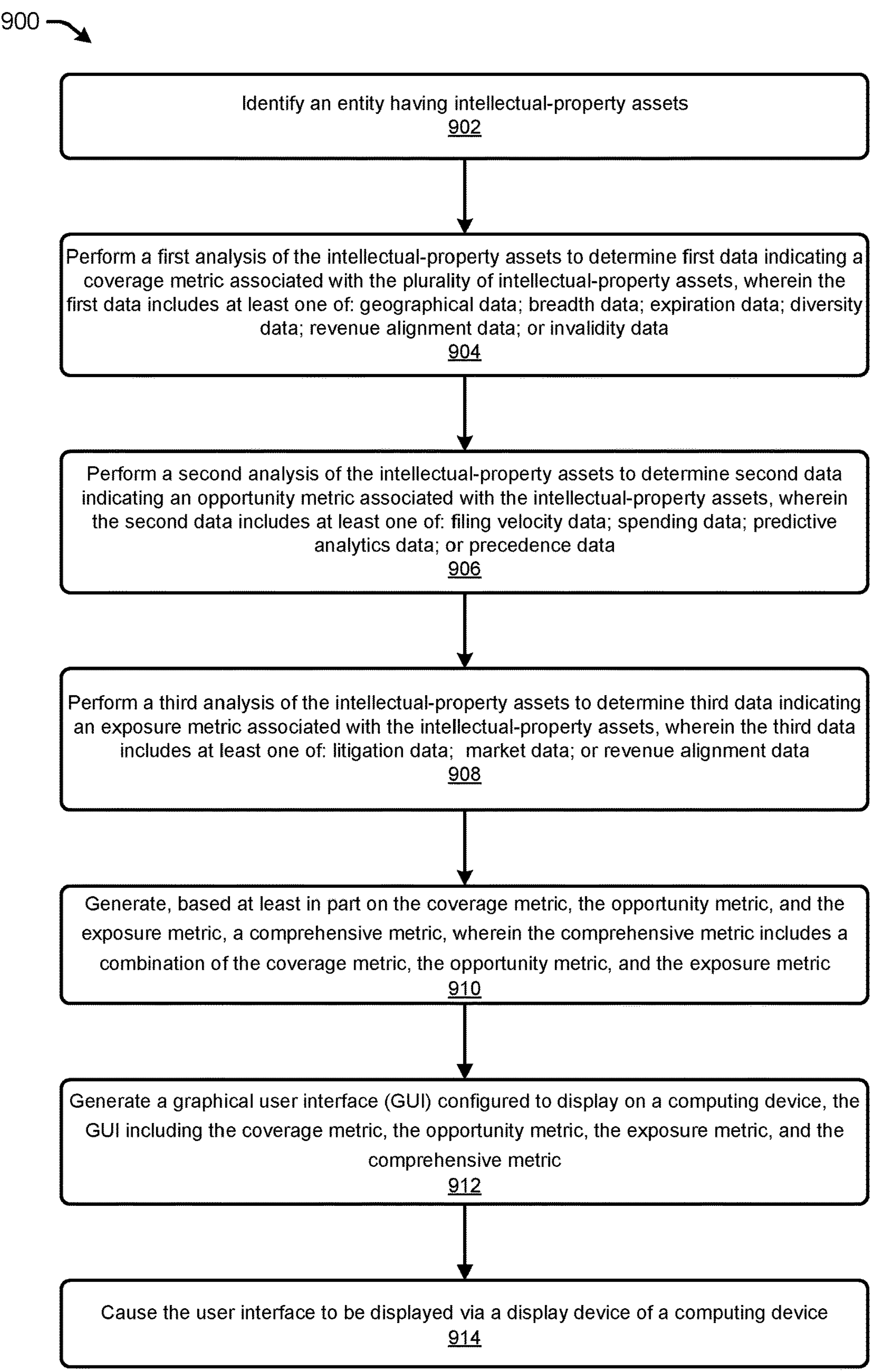
FIG. 9 illustrates an example flow diagram of an example process for utilizing a target entity having IP assets generate a user interface configured to present an analysis of the IP assets.

FIG. 9 illustrates an example flow diagram of an example process 900 for utilizing a target entity having IP assets generate a user interface configured to present an analysis of the IP assets. The order in which the operations or steps are described is not intended to be construed as a limitation, and any number of the described operations may be combined in any order and/or in parallel to implement process 900. The operations described with respect to the process 900 are described as being performed by an electronic device and/or a remote computing resource associated with the IP analysis platform. However, it should be understood that some or all of these operations may be performed by some or all of components, devices, and/or systems described herein.

At block 902, the process 900 may include identifying an entity having intellectual-property assets.

At block 904, the process 900 may include performing a first analysis of the intellectual-property assets to determine first data indicating a coverage metric associated with the plurality of intellectual-property assets, wherein the first data may include at least one of: geographical data; breadth data; expiration data; diversity data; revenue alignment data; or invalidity data.

At block 906, the process 900 may include performing a second analysis of the intellectual-property assets to determine second data indicating an opportunity metric associated with the intellectual-property assets, wherein the second data may include at least one of: filing velocity data; spending data; predictive analytics data; or precedence data.

At block 908, the process 900 may include performing a third analysis of the intellectual-property assets to determine third data indicating an exposure metric associated with the intellectual-property assets, wherein the third data may include at least one of: litigation data; market data; or revenue alignment data.

At block 910, the process 900 may include generating, based at least in part on the coverage metric, the opportunity metric, and the exposure metric, a comprehensive metric, wherein the comprehensive metric includes a combination of the coverage metric, the opportunity metric, and the exposure metric.

At block 912, the process 900 may include generating a graphical user interface (GUI) configured to display on a computing device, the GUI including the coverage metric, the opportunity metric, the exposure metric, and the comprehensive metric. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 914, the process 900 may include causing the user interface to be displayed via a display device of a computing device.

Additionally, or alternatively, the process 900 may include determining a first weight associated with the coverage metric. Additionally, or alternatively, the process 900 may include determining a second weight associated with the opportunity metric. Additionally, or alternatively, the process 900 may include determining a third weight associated with the exposure metric. Additionally, or alternatively, the process 900 may include applying the first weight, the second weight, and the third weight to generate the comprehensive metric. In some examples, at least one of the first weight, the second weight, or the third weight may be determined based at least in part on a confidence level value applied to at least one of the first data, the second data, or the third data. In some examples, the opportunity metric may be based at least in part on an estimated breadth score for at least one pending intellectual-property asset and an estimated issue date for the at least one pending intellectual-property asset. In some examples, the estimated breadth score may be based at least in part on an art unit associated with the at least one pending intellectual-property asset, an examiner associated with the at least one pending intellectual-property asset, or an originally filed claim associated with the at least one pending intellectual-property asset.

Additionally, or alternatively, the process 900 may include determining an examiner associated with at least one pending intellectual-property asset of the entity. Additionally, or alternatively, the process 900 may include determining a first breadth score for a first originally filed claim of an application previously examined by the examiner. Additionally, or alternatively, the process 900 may include determining a second breadth score for an issued version of the originally filed claim of the application. Additionally, or alternatively, the process 900 may include generating an examiner breadth score based at least in part on a difference between the first breadth score and the second breadth score. Additionally, or alternatively, the process 900 may include determining a predicted breadth score for the at least one pending intellectual-property asset based at least in part on the examiner breadth score. Additionally, or alternatively, the process 900 may include applying the predicted breadth score to the opportunity metric.

Additionally, or alternatively, the process 900 may include determining an art unit associated with at least one pending intellectual-property asset of the entity. Additionally, or alternatively, the process 900 may include determining a first breadth score for a first originally filed claim of an application previously filed in the art unit. Additionally, or alternatively, the process 900 may include determining a second breadth score for an issued version of the originally filed claim of the application. Additionally, or alternatively, the process 900 may include generating an art unit breadth score based at least in part on a difference between the first breadth score and the second breadth score. Additionally, or alternatively, the process 900 may include determining a predicted breadth score for the at least one pending intellectual-property asset based at least in part on the art unit breadth score. Additionally, or alternatively, the process 900 may include applying the predicted breadth score to the opportunity metric.

FIGS. 10A and 10B illustrate an example flow diagram of an example process 1000 for analyzing IP assets to generate a user interface configured to present a comprehensive score for the IP assets. The order in which the operations or steps are described is not intended to be construed as a limitation, and any number of the described operations may be combined in any order and/or in parallel to implement process 1000. The operations described with respect to the process 1000 are described as being performed by an electronic device and/or a remote computing resource associated with the IP analysis platform. However, it should be understood that some or all of these operations may be performed by some or all of components, devices, and/or systems described herein.

At block 1002, the process 1000 may include receiving a plurality of intellectual-property assets associated with an entity, individual intellectual-property assets of the plurality of intellectual-property assets including respective portions of text.

At block 1004, the process 1000 may include calculating, for the individual intellectual-property assets of the plurality of intellectual-property assets, a first breadth score based at least in part on a first word count score and a first commonness score for the respective portions of text included in the individual intellectual-property assets.

At block 1006, the process 1000 may include calculating a weighted score for the individual intellectual-property assets based at least in part on multiplying the first breadth score by a first weight, the first weight being based at least in part on respective breadth scores for the individual intellectual-property assets.

At block 1008, the process 1000 may include calculating a comprehensive breadth score for the plurality of intellectual-property assets by calculating an average of the weighted scores of the individual intellectual-property assets.

At block 1010, the process 1000 may include determining a technology area associated with at least a subset of intellectual-property assets of the plurality of intellectual-property assets.

At block 1012, the process 1000 may include calculating, for the subset of intellectual-property assets that are associated with the technology area, a subset breadth score based at least in part on a second word count score and a second commonness score for the respective portions of text included in the subset of intellectual-property assets that are associated with the technology area.

At block 1014, the process 1000 may include calculating a subset weighted score for the subset of intellectual-property assets that are associated with the technology area by multiplying individual subset breadth scores by a second weight based at least in part on a value of the respective subset breadth score for individual subset intellectual-property assets that are associated with the technology area.

At block 1016, the process 1000 may include calculating a technology breadth score for the subset of intellectual-property assets that are associated with the technology area by calculating an average of the individual subset weighted scores.

At block 1018, the process 1000 may include generating a graphical user interface (GUI) configured to display on a computing device, the GUI including at least one of the comprehensive breadth score or the technology breadth score. In some examples, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 1020, the process 1000 may include causing the GUI to be displayed via a display of the computing device.

Additionally, or alternatively, the process 1000 may include determining a technology area associated with at least a subset of intellectual-property assets of the plurality of intellectual-property assets. Additionally, or alternatively, the process 1000 may include calculating, for the subset of intellectual-property assets that are associated with the technology area, a subset breadth score based at least in part on a word count score and a commonness score for the respective portions of text included in the subset of intellectual-property assets that are associated with the technology area. Additionally, or alternatively, the process 1000 may include calculating a subset weighted score for the subset of intellectual-property assets that are associated with the technology area by multiplying individual subset breadth scores by a weight based at least in part on a value of the respective subset breadth score for individual subset intellectual-property assets that are associated with the technology area. Additionally, or alternatively, the process 1000 may include calculating a technology breadth score for the subset of intellectual-property assets that are associated with the technology area by calculating an average of the individual subset weighted scores. In some examples, the technology breadth score may include a first technology breadth score associated with a first time period. Additionally, or alternatively, the process 1000 may include determining at least a second technology breadth score for the subset of intellectual-property assets associated with a second time period and presenting the first technology breadth score and the second technology breadth score on the display.

Additionally, or alternatively, the process 1000 may include determining at least a second comprehensive score for the plurality of intellectual-property assets associated with a second time period, the second period of time being after the first period of time. Additionally, or alternatively, the process 1000 may include causing the GUI to display the first comprehensive score and the second comprehensive score. In some examples, the second comprehensive score may be different from the first comprehensive score based at least in part on: a first intellectual-property asset that is filed; a second intellectual-property asset that is granted; a third intellectual-property asset that is expired; a fourth intellectual-property asset that is abandoned; or a breadth score for a fifth intellectual-property asset that is changed.

Additionally, or alternatively, the process 1000 may include determining a market area associated with at least a subset of intellectual-property assets of the plurality of intellectual-property assets. Additionally, or alternatively, the process 1000 may include calculating, for the subset of intellectual-property assets that are associated with the market area, a subset breadth score based at least in part on a word count score and a commonness score for the respective portions of text included in the subset of intellectual-property assets that are associated with the market area. Additionally, or alternatively, the process 1000 may include calculating a subset weighted score for the subset of intellectual-property assets that are associated with the market area by multiplying individual subset breadth scores by a weight based at least in part on a value of the respective subset breadth score for individual subset intellectual-property assets that are associated with the market area. Additionally, or alternatively, the process 1000 may include calculating a market breadth score for the subset of intellectual-property assets that are associated with the market area by calculating an average of the individual subset weighted scores. In some examples, the market breadth score comprises a first market breadth score associated with a first time period. Additionally, or alternatively, the process 1000 may include determining at least a second market breadth score for the plurality of intellectual-property assets associated with a second time period, wherein the second time period is different from the first time period. Additionally, or alternatively, the process 1000 may include causing the GUI to display the first market breadth score and the second market breadth score.

Additionally, or alternatively, the process 1000 may include determining a technology area associated with at least a first subset of the intellectual-property assets of the plurality of intellectual-property assets. Additionally, or alternatively, the process 1000 may include identifying a second entity associated with the technology area. Additionally, or alternatively, the process 1000 may include identifying a second subset of intellectual-property assets that are associated with the second entity. Additionally, or alternatively, the process 1000 may include calculating, for the second subset of intellectual-property assets that are associated with the second entity, a subset breadth score based at least in part on a word count score and a commonness score for the respective portions of text included in the second subset of intellectual-property assets that are associated with the second entity. Additionally, or alternatively, the process 1000 may include calculating a subset weighted score for the second subset of intellectual-property assets that are associated with the second entity by multiplying individual subset breadth scores by a weight based at least in part on a value of the respective subset breadth score for individual second subset intellectual-property assets that are associated with the second entity. Additionally, or alternatively, the process 1000 may include calculating a subset comprehensive breadth score for the second subset of intellectual-property assets that are associated with the second entity by calculating an average of the individual subset weighted scores. In some examples, the subset comprehensive breadth score for the second subset of intellectual-property assets associated with the second entity may include a first subset comprehensive breadth score associated with a first time period. Additionally, or alternatively, the process 1000 may include determining at least a second subset comprehensive breadth score for the second subset of intellectual-property assets associated with the second entity. Additionally, or alternatively, the process 1000 may include causing the GUI to display the first subset comprehensive breadth score and the second subset comprehensive breadth score.

Figure 11:
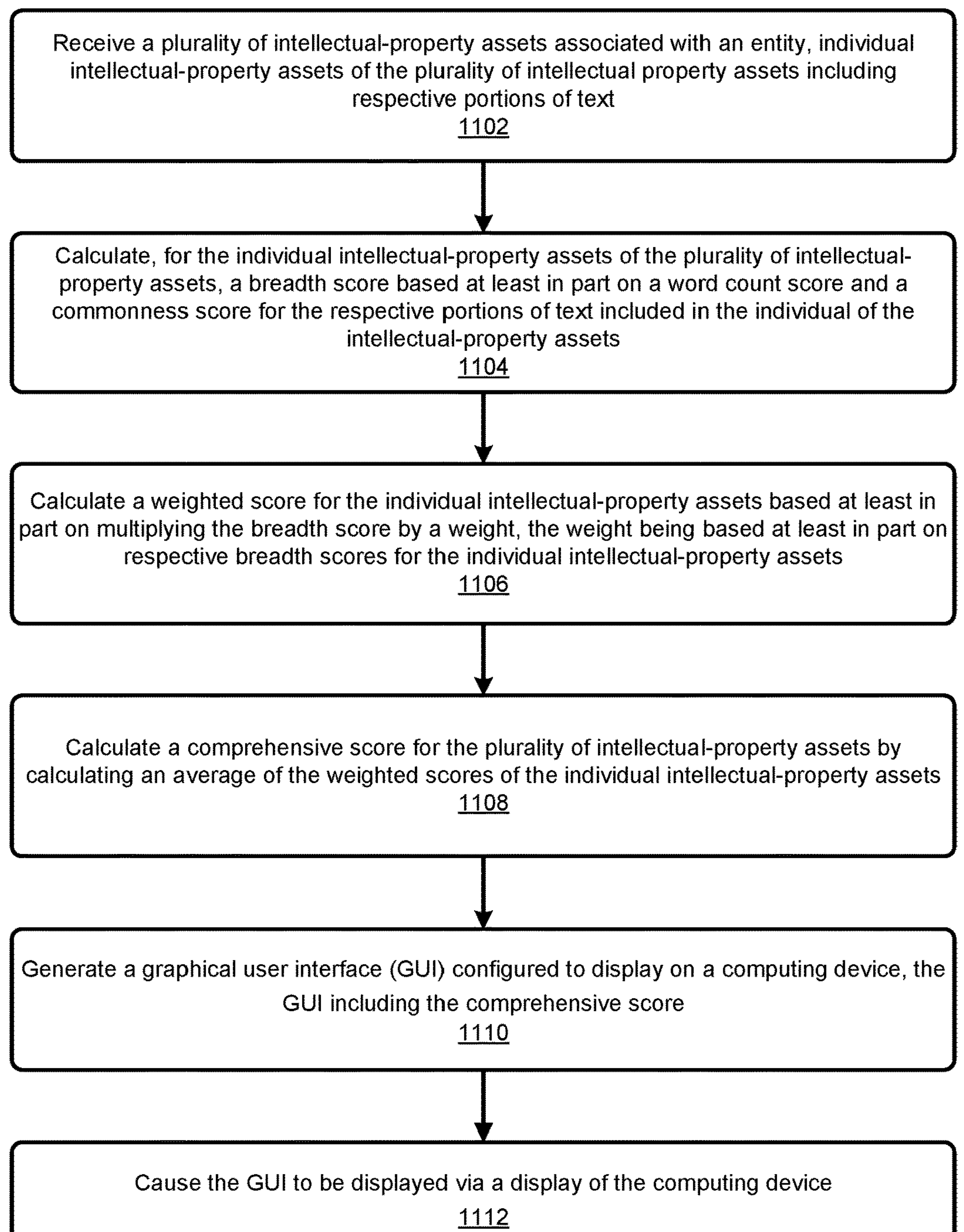
FIG. 11 illustrates an example flow diagram of an example process for analyzing IP assets to generate a user interface configured to present a comprehensive score for the IP assets.

FIG. 11 illustrates an example flow diagram of an example process 1100 for analyzing IP assets to generate a user interface configured to present a comprehensive score for the IP assets. The order in which the operations or steps are described is not intended to be construed as a limitation, and any number of the described operations may be combined in any order and/or in parallel to implement process 1100. The operations described with respect to the process 1100 are described as being performed by an electronic device and/or a remote computing resource associated with the IP analysis platform. However, it should be understood that some or all of these operations may be performed by some or all of components, devices, and/or systems described herein.

At block 1102, the process 1100 may include receiving a plurality of intellectual-property assets associated with an entity, individual intellectual-property assets of the plurality of intellectual-property assets including respective portions of text.

At block 1104, the process 1100 may include calculating, for the individual intellectual-property assets of the plurality of intellectual-property assets, a breadth score based at least in part on a word count score and a commonness score for the respective portions of text included in the individual of the intellectual-property assets.

At block 1106, the process 1100 may include calculating a weighted score for the individual intellectual-property assets based at least in part on multiplying the breadth score by a weight, the weight being based at least in part on respective breadth scores for the individual intellectual-property assets.

At block 1108, the process 1100 may include calculating a comprehensive score for the plurality of intellectual-property assets by calculating an average of the weighted scores of the individual intellectual-property assets.

At block 1110, the process 1100 may include generating a graphical user interface (GUI) configured to display on a computing device, the GUI including the comprehensive score. In some examples, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 1112, the process 1100 may include causing the GUI to be displayed via a display of the computing device Additionally, or alternatively, the process 1100 may include identifying, from the second intellectual-property assets, foreign intellectual-property assets and/or design intellectual-property assets as third intellectual-property assets. Additionally, or alternatively, the process 1100 may include removing the third intellectual-property assets from the second intellectual-property assets prior to generating the data representing the one or more result sets.

Additionally, or alternatively, the process 1100 may include categorizing the individual intellectual-property assets based at least in part on their respective weighted score. Additionally, or alternatively, the process 1100 may include presenting a visualization of the categorizing on the GUI. In some examples, the categorizing may include associating individual intellectual-property assets with being at least one of: very broad; broad; neutral; narrow; or very narrow.

Additionally, or alternatively, the process 1100 may include determining a prosecution status for the individual intellectual-property assets and presenting a visualization of the prosecution status on the GUI. In some examples, the prosecution status includes at least one of: active granted applications; inactive granted applications; active pending applications; or inactive pending applications.

Additionally, or alternatively, the process 1100 may include determining a geographic status for the individual intellectual-property assets and presenting a visualization of the geographic status on the user interface. In some examples, the geographic status indicates at least one of a pending application or a granted application filed in at least one of: North America; Asia; or Europe.

Additionally, or alternatively, the process 1100 may include determining a technology area associated with at least a subset of intellectual-property assets of the plurality of intellectual-property assets. Additionally, or alternatively, the process 1100 may include calculating, for the subset of intellectual-property assets that are associated with the technology area, a subset breadth score based at least in part on a word count score and a commonness score for the respective portions of text included in the subset of intellectual-property assets that are associated with the technology area. Additionally, or alternatively, the process 1100 may include calculating a subset weighted score for the subset of intellectual-property assets that are associated with the technology area by multiplying individual subset breadth scores by a weight based at least in part on a value of the respective subset breadth score for individual subset intellectual-property assets that are associated with the technology area. Additionally, or alternatively, the process 1100 may include calculating a technology breadth score for the subset of intellectual-property assets that are associated with the technology area by calculating an average of the individual subset weighted scores. In some examples, the technology breadth score may include a first technology breadth score associated with a first time period. Additionally, or alternatively, the process 1100 may include determining at least a second technology breadth score for the subset of intellectual-property assets associated with a second time period and presenting the first technology breadth score and the second technology breadth score on the display.

In some examples, the comprehensive score may include a first comprehensive score associated with a first time period. Additionally, or alternatively, the process 1100 may include determining at least a second comprehensive score for the plurality of intellectual-property assets associated with a second time period, the second period of time being after the first period of time and causing the GUI to display the first comprehensive score and the second comprehensive score. In some examples, the second comprehensive score may be different from the first comprehensive score based at least in part on: a first intellectual-property asset that is filed; a second intellectual-property asset that is granted; a third intellectual-property asset that is expired; a fourth intellectual-property asset that is abandoned; or a breadth score for a fifth intellectual-property asset that is changed.

Figure 12:
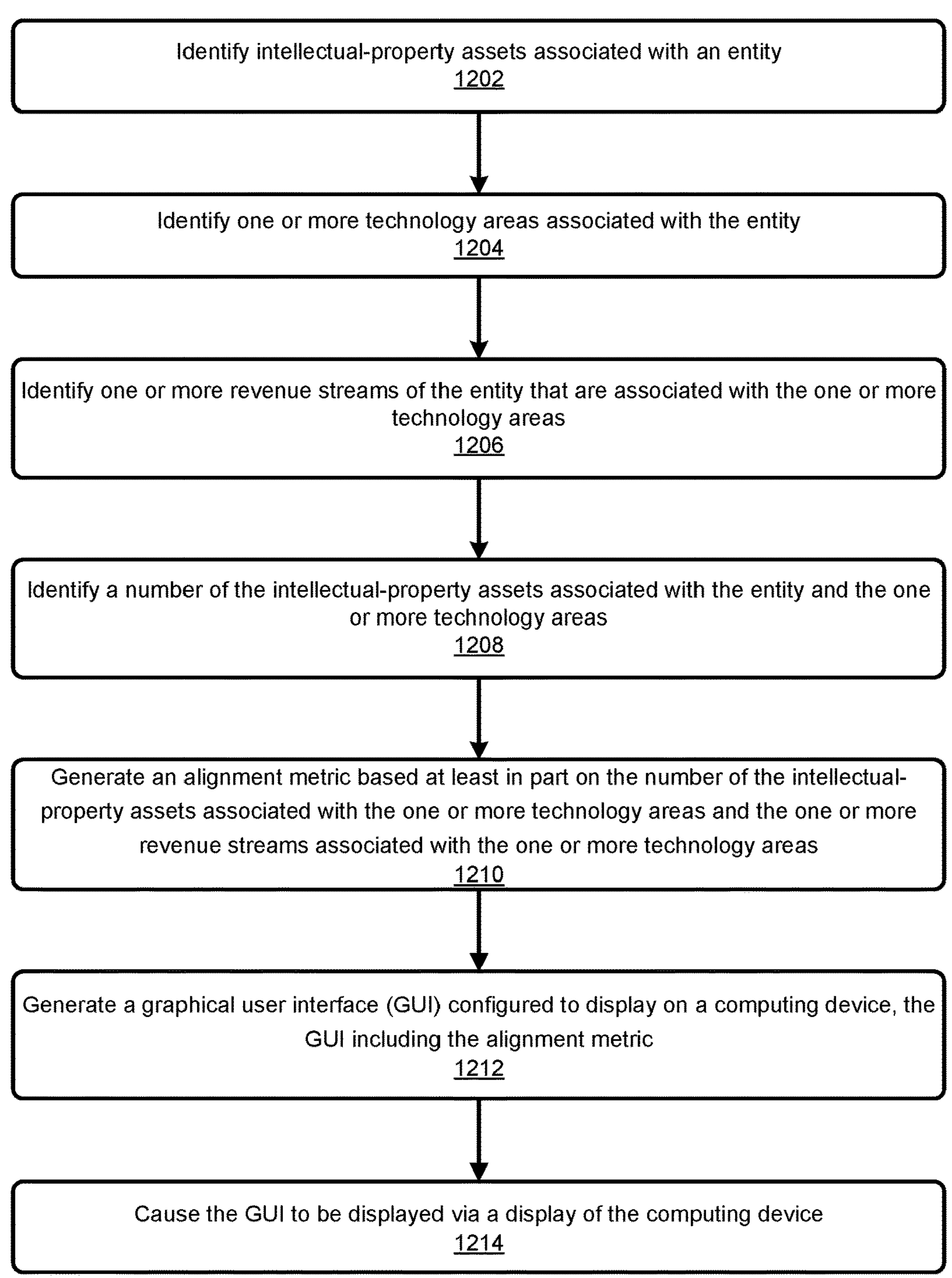
FIG. 12 illustrates an example flow diagram of an example process for generating data representing IP asset and data representing revenue alignment on a graphical user interface.

FIG. 12 illustrates an example flow diagram of an example process 1200 for generating data representing IP asset and data representing revenue alignment on a graphical user interface. The order in which the operations or steps are described is not intended to be construed as a limitation, and any number of the described operations may be combined in any order and/or in parallel to implement process 1200. The operations described with respect to the process 1200 are described as being performed by an electronic device and/or a remote computing resource associated with the IP analysis platform. However, it should be understood that some or all of these operations may be performed by some or all of components, devices, and/or systems described herein.

At block 1202, the process 1200 may include identifying intellectual-property assets associated with an entity.

At block 1204, the process 1200 may include identifying one or more technology areas associated with the entity.

At block 1206, the process 1200 may include identifying one or more revenue streams of the entity that are associated with the one or more technology areas.

At block 1208, the process 1200 may include identifying a number of the intellectual-property assets associated with the entity and the one or more technology areas.

At block 1210, the process 1200 may include generating an alignment metric based at least in part on the number of the intellectual-property assets associated with the one or more technology areas and the one or more revenue streams associated with the one or more technology areas.

At block 1212, the process 1200 may include generating a graphical user interface (GUI) configured to display on a computing device, the GUI including the alignment metric. In some examples, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 1214, the process 1200 may include causing the GUI to be displayed via a display of the computing device.

In some examples, the one or more technology areas may be identified from a taxonomy of market sets.

In some examples, the one or more revenue streams associated with the one or more technology areas may include a percentage of revenue generated in a market of a total amount of revenue generated by the entity between a first date and a second date.

In some examples, the number of the intellectual-property assets associated with the one or more technology areas includes a percentage of intellectual-property assets directed to the one or more technology areas from among an additional intellectual-property assets filed by the entity between a first date and a second date.

Additionally, or alternatively, the process 1200 may include determining a first percentage of revenue generated by the entity in a market based at least in part on comparing the revenue generated by the entity in the market with a total revenue generated by the entity;

Additionally, or alternatively, the process 1200 may include determining a second percentage of intellectual-property assets directed to the one or more technology areas based at least in part on comparing the number of intellectual-property assets directed to the one or more technology areas with a total number of intellectual-property assets associated with the entity. In some examples, the alignment metric may include a comparison of the first percentage and the second percentage. Additionally, or alternatively, the process 1200 may include determining that the entity is revenue heavy in the one or more technology areas based at least in part on the first percentage of revenue generated by the entity in the market being greater than the second percentage of intellectual-property assets directed to the one or more technology areas and presenting an indication that the entity is revenue heavy on the GUI. Additionally, or alternatively, the process 1200 may include determining that the entity is coverage heavy in the one or more technology areas based at least in part on the first percentage of revenue generated by the entity in the market being less than the second percentage of intellectual-property assets directed to the one or more technology areas and presenting an indication that the entity is coverage heavy on the GUI.

In some examples, the alignment metric comprises a first alignment metric. Additionally, or alternatively, the process 1200 may include determining additional entities generating revenue in the one or more technology areas. Additionally, or alternatively, the process 1200 may include identifying additional intellectual-property assets associated with the additional entities, the additional intellectual-property assets associated with the additional entities being associated with the one or more technology areas. Additionally, or alternatively, the process 1200 may include generating a second alignment metric associated with the additional entity based at least in part on the additional intellectual-property assets associated with the additional entities and the revenue generated by the additional entities in the one or more technology areas. Additionally, or alternatively, the process 1200 may include presenting the second alignment metric on the GUI.

Additionally, or alternatively, the process 1200 may include determining a breadth score associated with individual ones of the number of intellectual-property assets, wherein identifying the alignment metric is based at least in part on the breadth score.

Additionally, or alternatively, the process 1200 may include generating a coverage metric based at least in part on the alignment metric that indicating a coverage related to the intellectual-property assets.

Figure 13:
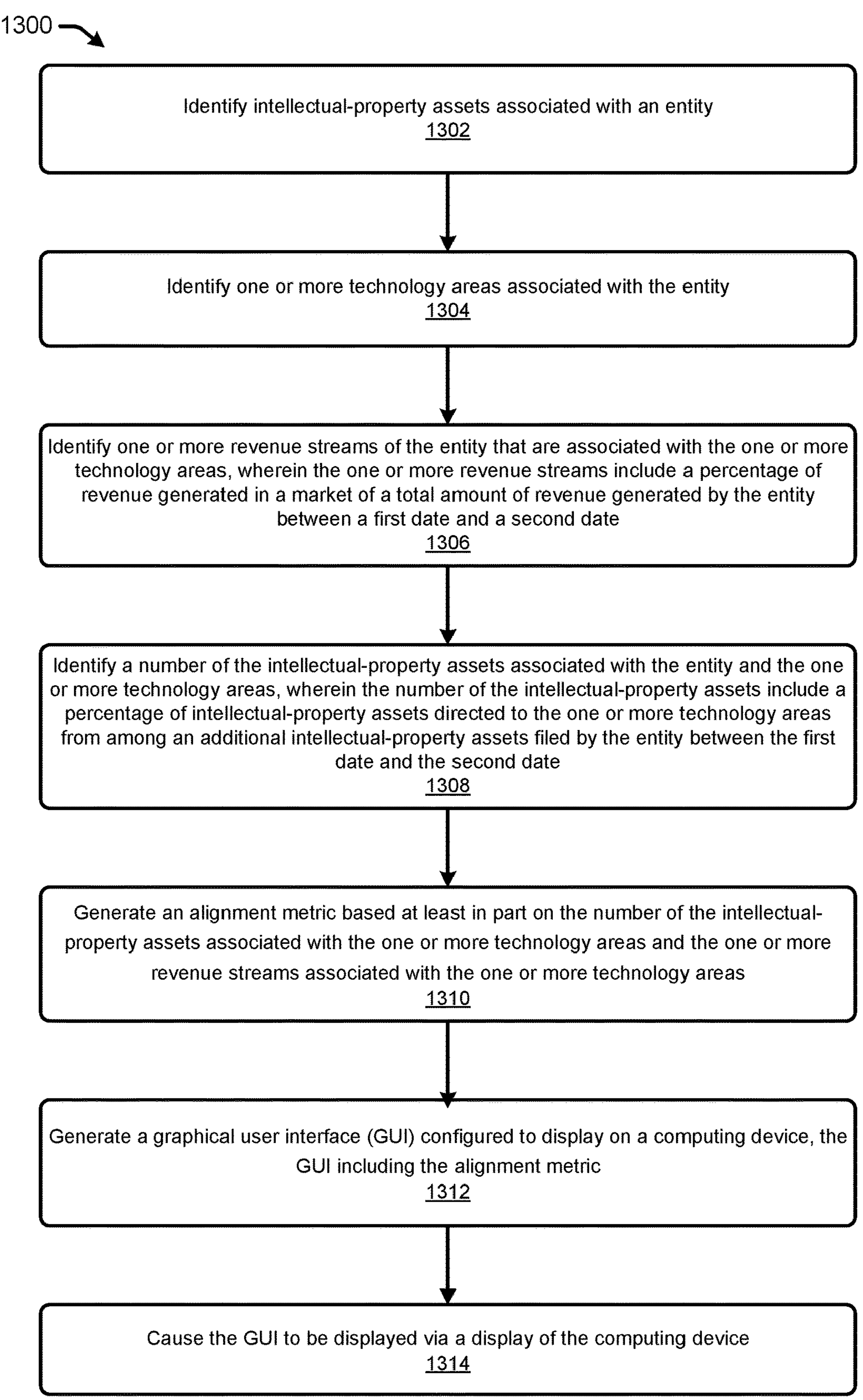
FIG. 13 illustrates an example flow diagram of an example process for generating data representing IP asset and data representing revenue alignment on a graphical user interface.

FIG. 13 illustrates an example flow diagram of an example process 1300 for generating data representing IP asset and data representing revenue alignment on a graphical user interface. The order in which the operations or steps are described is not intended to be construed as a limitation, and any number of the described operations may be combined in any order and/or in parallel to implement process 1300. The operations described with respect to the process 1300 are described as being performed by an electronic device and/or a remote computing resource associated with the IP analysis platform. However, it should be understood that some or all of these operations may be performed by some or all of components, devices, and/or systems described herein.

At block 1302, the process 1300 may include identifying intellectual-property assets associated with an entity.

At block 1304, the process 1300 may include identifying one or more technology areas associated with the entity.

At block 1306, the process 1300 may include identifying one or more revenue streams of the entity that are associated with the one or more technology areas, wherein the one or more revenue streams include a percentage of revenue generated in a market of a total amount of revenue generated by the entity between a first date and a second date.

At block 1308, the process 1300 may include identifying a number of the intellectual-property assets associated with the entity and the one or more technology areas, wherein the number of the intellectual-property assets include a percentage of intellectual-property assets directed to the one or more technology areas from among an additional intellectual-property assets filed by the entity between the first date and the second date At block 1310, the process 1300 may include generating an alignment metric based at least in part on the number of the intellectual-property assets associated with the one or more technology areas and the one or more revenue streams associated with the one or more technology areas.

At block 1312, the process 1300 may include generating a graphical user interface (GUI) configured to display on a computing device, the GUI including the alignment metric. In some examples, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 1314, the process 1300 may include causing the GUI to be displayed via a display of the computing device.

Figure 14:
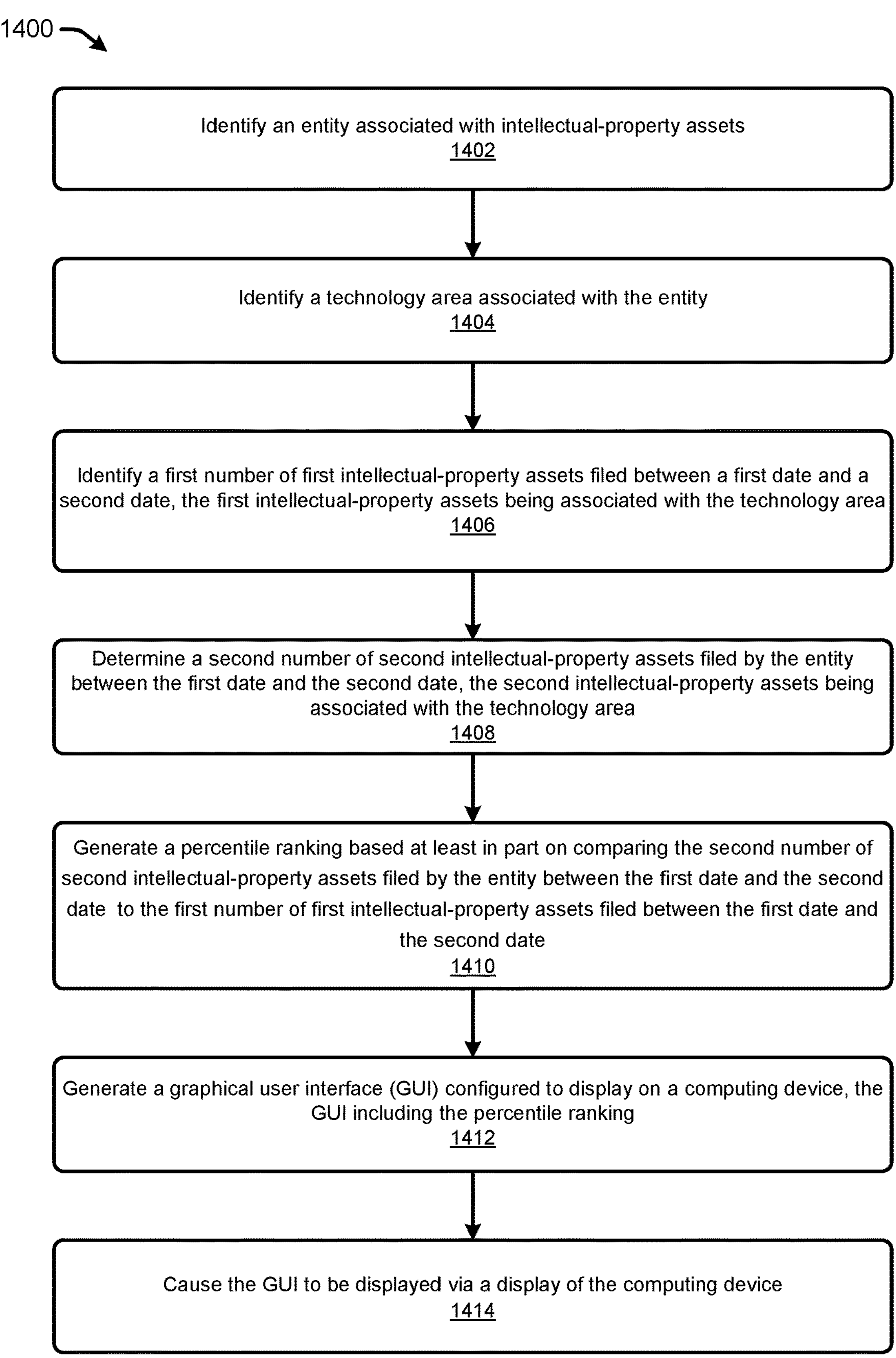
FIG. 14 illustrates an example flow diagram of an example process for generating data representing a percentile ranking with regard to IP asset filing and generating a graphical user interface displaying the result sets.

FIG. 14 illustrates an example flow diagram of an example process 1400 for generating data representing a percentile ranking with regard to IP asset filing and generating a graphical user interface displaying the result sets. The order in which the operations or steps are described is not intended to be construed as a limitation, and any number of the described operations may be combined in any order and/or in parallel to implement process 1400. The operations described with respect to the process 1400 are described as being performed by an electronic device and/or a remote computing resource associated with the IP analysis platform. However, it should be understood that some or all of these operations may be performed by some or all of components, devices, and/or systems described herein.

At block 1402, the process 1400 may include identifying an entity associated with intellectual-property assets.

At block 1404, the process 1400 may include identifying a technology area associated with the entity.

At block 1406, the process 1400 may include identifying a first number of first intellectual-property assets filed between a first date and a second date, the first intellectual-property assets being associated with the technology area.

At block 1408, the process 1400 may include determining a second number of second intellectual-property assets filed by the entity between the first date and the second date, the second intellectual-property assets being associated with the technology area.

At block 1410, the process 1400 may include generating a percentile ranking based at least in part on comparing the second number of second intellectual-property assets filed by the entity between the first date and the second date to the first number of first intellectual-property assets filed between the first date and the second date.

At block 1412, the process 1400 may include generating a graphical user interface (GUI) configured to display on a computing device, the GUI including the percentile ranking. In some examples, the GUI may be configured to receive at least a first input from the computing device. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 1414, the process 1400 may include causing the GUI to be displayed via a display of the computing device.

In some examples the entity may comprise a first entity and the percentile ranking comprises a first percentile ranking. Additionally, or alternatively, the process 1400 may include identifying a second entity associated with the technology area. Additionally, or alternatively, the process 1400 may include determining a third number of third intellectual-property assets that are associated with the second entity. Additionally, or alternatively, the process 1400 may include generating a second percentile ranking based at least in part on comparing the third number of third intellectual-property assets filed by the second entity between the first date and the second date to the first number of first intellectual-property assets filed between the first date and the second date. Additionally, or alternatively, the process 1400 may include causing the GUI to present the first percentile ranking and the second percentile ranking.

In some examples, the technology area comprises a first technology area and is a subset of a second technology area.

In some examples, the percentile ranking comprises a first percentile ranking. Additionally, or alternatively, the process 1400 may include identifying a market area associated with the entity. Additionally, or alternatively, the process 1400 may include identifying a third number of third intellectual-property assets filed between a third date and a fourth date, the third intellectual-property assets being associated with the market area and the third date and the fourth date being different from the first date and the second date. Additionally, or alternatively, the process 1400 may include determining a fourth number of fourth intellectual-property assets filed by the entity between the third date and the fourth date, the fourth intellectual-property assets being associated with the market area. Additionally, or alternatively, the process 1400 may include generating a second percentile ranking based at least in part on comparing the fourth number of fourth intellectual-property assets filed by the entity to the third number of third intellectual-property assets filed between the third date and the fourth date. Additionally, or alternatively, the process 1400 may include causing the GUI to present the second percentile ranking.

In some examples, the entity comprises a first entity and the percentile ranking comprises a first percentile ranking. Additionally, or alternatively, the process 1400 may include identifying a market area associated with the first entity. Additionally, or alternatively, the process 1400 may include identifying a second entity associated with the market area. Additionally, or alternatively, the process 1400 may include determine a third number of third intellectual-property assets that are associated with the second entity. Additionally, or alternatively, the process 1400 may include generating a second percentile ranking based at least in part on comparing the third number of third intellectual-property assets filed by the second entity to the first number of first intellectual-property assets filed between the first date and the second date. Additionally, or alternatively, the process 1400 may include causing the GUI to present the first percentile ranking and the second percentile ranking.

In some examples, the percentile ranking comprises a first percentile ranking. identifying an art unit associated with the second number of second intellectual-property assets associated with the entity. Additionally, or alternatively, the process 1400 may determining a third number of third intellectual-property assets that are associated with the art unit and filed between a third date and a fourth date, the third date and the fourth date being different from the first date and the second date. Additionally, or alternatively, the process 1400 may determining a fourth number of fourth intellectual-property assets that are associated with the art unit and filed by the entity between the third date and the fourth date;

In some examples, the entity comprises a first entity and the percentile ranking comprises a first percentile ranking identifying an art unit associated with the second number of second intellectual-property assets associated with the first entity. Additionally, or alternatively, the process 1400 may identifying a second entity associated with the art unit. Additionally, or alternatively, the process 1400 may identifying a third number of third intellectual-property assets that are associated with the second entity. Additionally, or alternatively, the process 1400 may generating a second percentile ranking based at least in part on comparing the third number of third intellectual-property assets filed by the second entity to the first number of first intellectual-property assets filed between the first date and the second date. Additionally, or alternatively, the process 1400 may causing the GUI to present the first percentile ranking and the second percentile ranking. Additionally, or alternatively, the process 1400 may generating a second percentile ranking based at least in part on comparing the fourth number of fourth intellectual-property assets filed by the entity to the third number of third intellectual-property assets filed between the third date and the fourth date. Additionally, or alternatively, the process 1400 may causing the GUI to present the second percentile ranking Additionally, or alternatively, the process 1400 may include generating an opportunity metric based at least in part on the percentile ranking, the opportunity metric corresponding to a potential increase in a revenue of the entity attributable to the intellectual-property assets.

Additionally, or alternatively, the process 1400 may include determining that the percentile ranking is above a threshold percentile and causing the opportunity metric to improve based at least in part on the percentile ranking being above the threshold percentile.

Additionally, or alternatively, the process 1400 may include determining that the percentile ranking is below a threshold percentile and decreasing the opportunity metric based at least in part on the percentile ranking being below the threshold percentile.

Figure 15A:
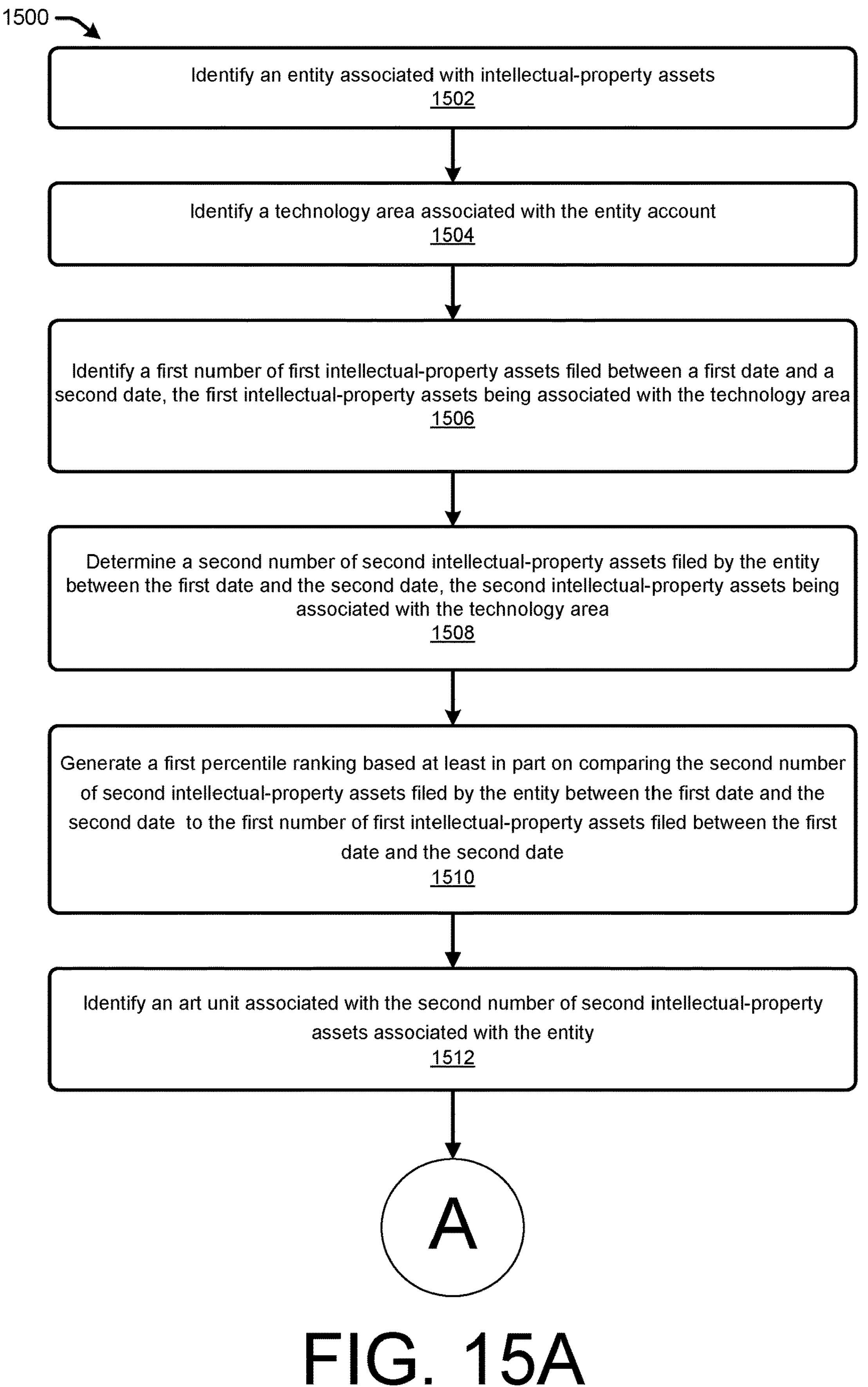
FIG. 15A illustrates an example flow diagram of an example process for generating data representing a percentile ranking with regard to IP asset filing and generating a graphical user interface displaying the result sets.

FIGS. 15A and 15B illustrate an example flow diagram of an example process 1500 for generating data representing a percentile ranking with regard to IP asset filing and generating a graphical user interface displaying the result sets. The order in which the operations or steps are described is not intended to be construed as a limitation, and any number of the described operations may be combined in any order and/or in parallel to implement process 1500. The operations described with respect to the process 1500 are described as being performed by an electronic device and/or a remote computing resource associated with the IP analysis platform. However, it should be understood that some or all of these operations may be performed by some or all of components, devices, and/or systems described herein.

At block 1502, the process 1500 may include identifying an entity associated with intellectual-property assets.

At block 1504, the process 1500 may include identifying a technology area associated with the entity.

At block 1506, the process 1500 may include identifying a first number of first intellectual-property assets filed between a first date and a second date, the first intellectual-property assets being associated with the technology area.

At block 1508, the process 1500 may include determining a second number of second intellectual-property assets filed by the entity between the first date and the second date, the second intellectual-property assets being associated with the technology area.

At block 1510, the process 1500 may include generating a first percentile ranking based at least in part on comparing the second number of second intellectual-property assets filed by the entity between the first date and the second date to the first number of first intellectual-property assets filed between the first date and the second date.

At block 1512, the process 1500 may include identifying an art unit associated with the second number of second intellectual-property assets associated with the entity s.

At block 1514, the process 1500 may include determining a third number of third intellectual-property assets that are associated with the art unit and filed between a third date and a fourth date, the third date and the fourth date being different from the first date and the second date.

At block 1516, the process 1500 may include determining a fourth number of fourth intellectual-property assets that are associated with the art unit and filed by the entity between the third date and the fourth date.

At block 1518, the process 1500 may include generating a second percentile ranking based at least in part on comparing the fourth number of fourth intellectual-property assets filed by the entity to the third number of third intellectual-property assets filed between the third date and the fourth date At block 1520, the process 1500 may include generating a graphical user interface (GUI) configured to display on a computing device, the GUI including the first percentile ranking and the second percentile ranking. In some examples, the GUI may be configured to receive one or more inputs. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 1522, the process 1500 may include causing the GUI to be displayed via a display of the computing device.

Figure 16:
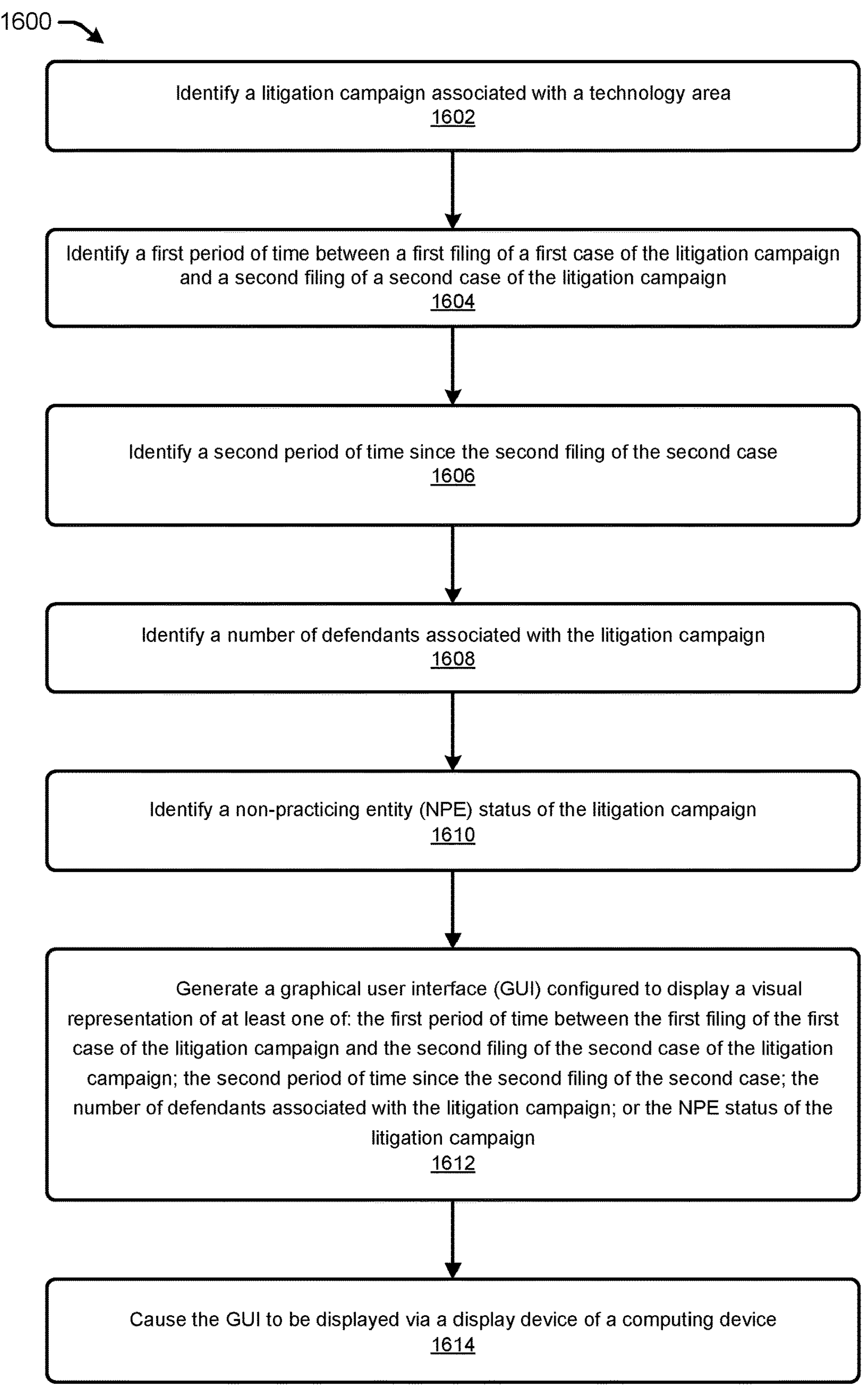
FIG. 16 illustrates an example flow diagram of an example process for generating data representing a litigation campaign with regard to IP assets and/or market areas and/or technology areas and generating a graphical user interface displaying the result sets.

FIG. 16 illustrates an example flow diagram of an example process 1600 for generating data representing a litigation campaign with regard to IP assets and/or market areas and/or technology areas and generating a graphical user interface displaying the result sets. The order in which the operations or steps are described is not intended to be construed as a limitation, and any number of the described operations may be combined in any order and/or in parallel to implement process 1600. The operations described with respect to the process 1600 are described as being performed by an electronic device and/or a remote computing resource associated with the IP analysis platform. However, it should be understood that some or all of these operations may be performed by some or all of components, devices, and/or systems described herein.

At block 1602, the process 1600 may include identifying a litigation campaign associated with a technology area.

At block 1604, the process 1600 may include identifying a first period of time between a first filing of a first case of the litigation campaign and a second filing of a second case of the litigation campaign.

At block 1606, the process 1600 may include identifying a second period of time since the second filing of the second case.

At block 1608, the process 1600 may include identifying a number of defendants associated with the litigation campaign.

At block 1610, the process 1600 may include identifying a non-practicing entity (NPE) status of the litigation campaign.

At block 1612, the process 1600 may include generating a graphical user interface (GUI) configured to display a visual representation of at least one of the first period of time between the first filing of the first case of the litigation campaign and the second filing of the second case of the litigation campaign, the second period of time since the second filing of the second case, the number of defendants associated with the litigation campaign, the NPE status of the litigation campaign. In some examples, the GUI may be configured to receive at least a first input from the computing device. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 1614, the process 1600 may include causing the GUI to be displayed via a display device of a computing device.

In some examples the NPE status may be determined based at least in part on evaluating first data obtained from first data sources or the NPE status may be determined based at least in part on a confidence level of an algorithm applied to second data obtained from second data sources.

In some examples, the NPE status may indicate that an entity, associated with the litigation campaign, comprises an NPE or a practicing entity.

In some examples, identifying the litigation campaign may include determining that more than one litigation cases have been filed that are associated with the technology area, and determining that the more than one litigation cases have been filed within a calendar year.

In some examples, the visual representation may comprise a circle presented on an x-y axis. In some examples, a size of the circle corresponds to a total number of defendants targeted in the litigation campaign, a color of the circle indicates the NPE status of the litigation campaign, and/or the x-axis represents the second period of time since the filing of the second. case; and the y-axis represents an additional number of cases filed in the litigation campaign Additionally, or alternatively, the process 1600 may include receiving user input via the user interface and presenting, in response to the user input, at least one of a first indication of a plaintiff associated with the litigation campaign or at least one defendant associated with the litigation campaign.

Additionally, or alternatively, the process 1600 may include generating an exposure metric based at least in part on the first period of time between the first filing of the first case of the litigation campaign and the second filing of the second case of the litigation campaign, the second period of time since the second filing of the second case, the number of defendants associated with the litigation campaign, or the NPE status of the litigation campaign.

In some examples, identifying the litigation campaign associated with the technology area may include accessing a taxonomy of technology areas and associating the litigation campaign with one of the technology areas from the taxonomy of technology areas.

Additionally, or alternatively, the process 1600 may include receiving, via the GUI, a user input indicating an entity. Additionally, or alternatively, the process 1600 may include determining that the entity is associated with the technology area associated with the litigation campaign. Additionally, or alternatively, the process 1600 may include presenting the visual representation based at least in part on determining that the entity is associated with the technology area associated with the litigation campaign.

Figure 17:
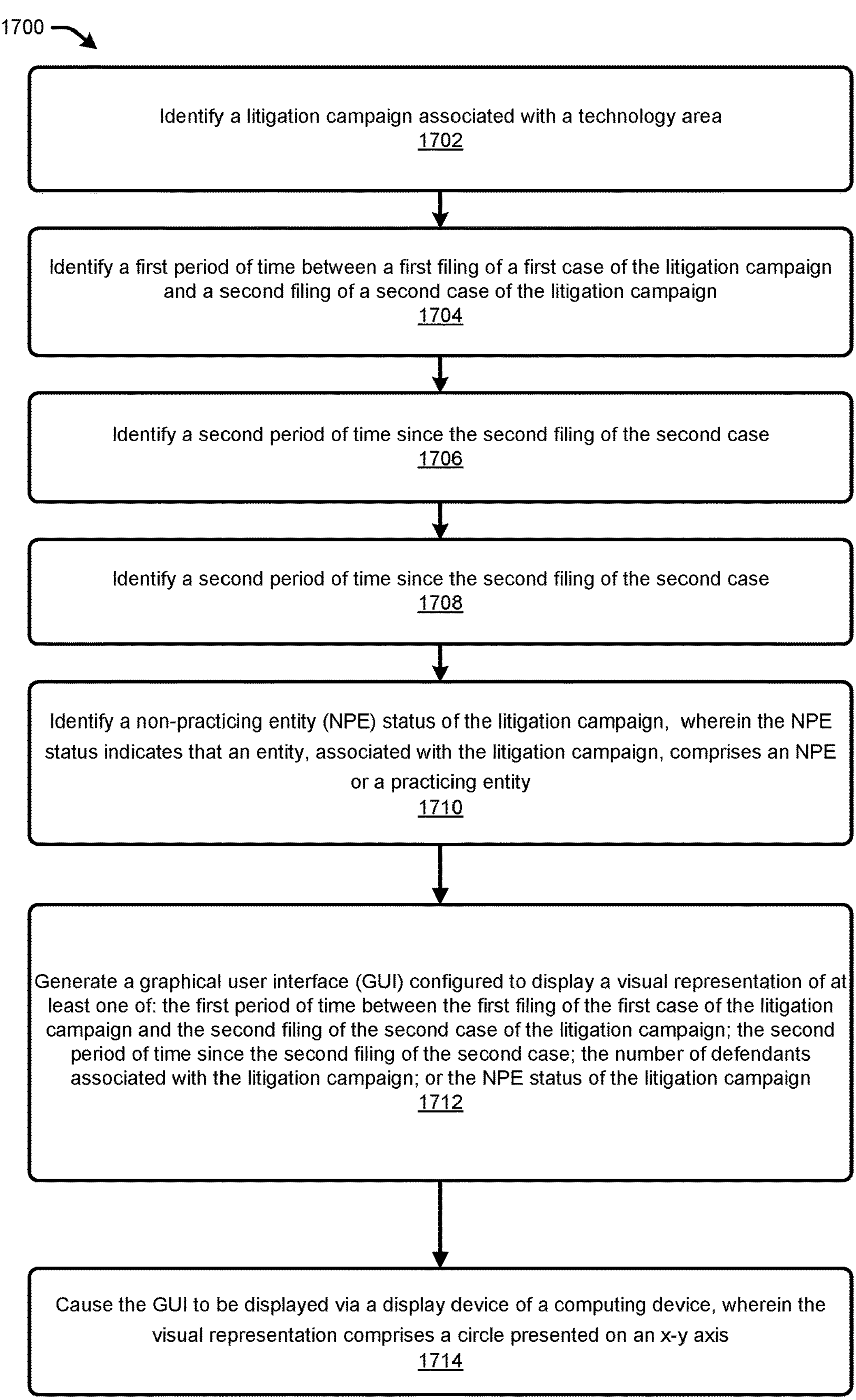
FIG. 17 illustrates an example flow diagram of an example process for generating data representing a litigation campaign with regard to IP assets and/or market areas and/or technology areas and generating a graphical user interface displaying the result sets.

FIG. 17 illustrates an example flow diagram of an example process 1700 for generating data representing a litigation campaign with regard to IP assets and/or market areas and/or technology areas and generating a graphical user interface displaying the result sets. The order in which the operations or steps are described is not intended to be construed as a limitation, and any number of the described operations may be combined in any order and/or in parallel to implement process 1700. The operations described with respect to the process 1700 are described as being performed by an electronic device and/or a remote computing resource associated with the IP analysis platform. However, it should be understood that some or all of these operations may be performed by some or all of components, devices, and/or systems described herein.

At block 1702, the process 1700 may include identifying a litigation campaign associated with a technology area.

At block 1704, the process 1700 may include identifying a first period of time between a first filing of a first case of the litigation campaign and a second filing of a second case of the litigation campaign.

At block 1706, the process 1700 may include identifying a second period of time since the second filing of the second case.

At block 1708, the process 1700 may include identifying a number of defendants associated with the litigation campaign.

At block 1710, the process 1700 may include identifying a non-practicing entity (NPE) status of the litigation campaign, wherein the NPE status indicates that an entity, associated with the litigation campaign, comprises an NPE or a practicing entity.

At block 1712, the process 1700 may include generating a graphical user interface (GUI) configured to display a visual representation of at least one of the first period of time between the first filing of the first case of the litigation campaign and the second filing of the second case of the litigation campaign, the second period of time since the second filing of the second case, the number of defendants associated with the litigation campaign, or the NPE status of the litigation campaign. In some examples, the GUI may be configured to receive one or more inputs. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 1714, the process 1700 may causing the GUI to be displayed via a display device of a computing device, wherein the visual representation comprises a circle presented on an x-y axis.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:

receiving, via a network protocol, a seeded search query from a computing device;

identifying intellectual-property assets associated with an entity based on the seeded search query;

identifying one or more technology areas associated with the entity;

identifying one or more revenue streams of the entity that are associated with the one or more technology areas, wherein the one or more revenue streams include a percentage of revenue generated in a market of a total amount of revenue generated by the entity between a first date and a second date and the one or more technology areas are identified from a taxonomy of market sets;

identifying a number of the intellectual-property assets associated with the entity and the one or more technology areas, wherein the number of the intellectual-property assets include a percentage of intellectual-property assets directed to the one or more technology areas from among an additional intellectual-property assets filed by the entity between the first date and the second date;

determining a breadth score associated with individual ones of the number of intellectual-property assets;

generating an alignment metric based at least in part on i) the number of the intellectual-property assets associated with the one or more technology areas, ii) the one or more revenue streams associated with the one or more technology areas, and iii) the breadth score associated with individual ones of the number of intellectual-property assets;

determining a first percentage of revenue generated by the entity in a market based at least in part on comparing the revenue generated by the entity in the market with a total revenue generated by the entity;

determining a second percentage of intellectual-property assets directed to the one or more technology areas based at least in part on comparing the number of intellectual-property assets directed to the one or more technology areas with a total number of intellectual-property assets associated with the entity, wherein the alignment metric includes a comparison of the first percentage and the second percentage;

generating a graphical user interface (GUI) with associated access controls;

refraining from displaying the GUI based on the access controls being associated with the GUI;

authenticating a user requesting the GUI;

displaying to the user, based on the user being authenticated, the GUI configured to display at least the alignment metric and one or more actionable items;

sending, via the network protocol over a network to the computing device, the alignment metric;

causing, in response to receipt of the alignment metric, the GUI of the computing device to display, without user input, the alignment metric; and causing, in response to receipt of the alignment metric, the GUI of the computing device to display dynamic animation sequences in association with the alignment metric, the dynamic animation sequences causing animation sequences corresponding to asset indicators and alignment indicators displayed via the GUI to be dynamically displayed on-the-fly and in real time.

2. The method of claim 1, further comprising determining that a first percentage of revenue generated by the entity in the market is less than a second percentage of intellectual-property assets directed to the one or more technology areas.

3. A method comprising:

receiving, via a network protocol, a seeded search query from a computing device;

identifying intellectual-property assets associated with an entity based on the seeded search query;

identifying one or more technology areas associated with the entity;

identifying one or more revenue streams of the entity that are associated with the one or more technology areas;

identifying a number of the intellectual-property assets associated with the entity and the one or more technology areas;

generating an alignment metric based at least in part on the number of the intellectual-property assets associated with the one or more technology areas and the one or more revenue streams associated with the one or more technology areas;

determining that the entity has a first percentage of revenue generated by the entity in a market that is greater than a second percentage of intellectual-property assets directed to the one or more technology areas;

determining a first percentage of revenue generated by the entity in a market based at least in part on comparing the revenue generated by the entity in the market with a total revenue generated by the entity;

determining a second percentage of intellectual-property assets directed to the one or more technology areas based at least in part on comparing the number of intellectual-property assets directed to the one or more technology areas with a total number of intellectual-property assets associated with the entity, wherein the alignment metric includes a comparison of the first percentage and the second percentage;

generating a graphical user interface (GUI) with associated access controls;

refraining from displaying the GUI based on the access controls being associated with the GUI;

authenticating a user requesting the GUI;

displaying to the user, based on authenticating the user, the GUI configured to display at least the alignment metric and one or more actionable items;

sending, via the network protocol over a network to the computing device, the alignment metric and an indication that the first percentage of revenue generated by the entity in the market is greater than the second percentage of intellectual-property assets directed to the one or more technology areas;

causing, in response to receipt of the alignment metric and the indication, the GUI of the computing device to display, without user input, the alignment metric and the indication; and causing, in response to receipt of the alignment metric, the GUI of the computing device to display dynamic animation sequences in association with the alignment metric, the dynamic animation sequences causing animation sequences corresponding to asset indicators and alignment indicators displayed via the GUI to be dynamically displayed on-the-fly and in real time.

4. The method of claim 3, wherein the one or more technology areas are identified from a taxonomy of market sets.

5. The method of claim 3, wherein the one or more revenue streams associated with the one or more technology areas includes a percentage of revenue generated in a market of a total amount of revenue generated by the entity between a first date and a second date.

6. The method of claim 3, wherein the number of the intellectual-property assets associated with the one or more technology areas includes a percentage of intellectual-property assets directed to the one or more technology areas from among an additional intellectual-property assets filed by the entity between a first date and a second date.

7. The method of claim 3, wherein the alignment metric comprises a first alignment metric, and the method further comprising:

determining additional entities generating revenue in the one or more technology areas;

identifying additional intellectual-property assets associated with the additional entities, the additional intellectual-property assets associated with the additional entities being associated with the one or more technology areas;

generating a second alignment metric associated with the additional entity based at least in part on the additional intellectual-property assets associated with the additional entities and the revenue generated by the additional entities in the one or more technology areas; and presenting the second alignment metric on the GUI.

8. The method of claim 3, further comprising determining a breadth score associated with individual ones of the number of intellectual-property assets, wherein identifying the alignment metric is based at least in part on the breadth score.

9. The method of claim 3, further comprising generating a coverage metric based at least in part on the alignment metric that indicating a coverage related to the intellectual-property assets.

10. A system comprising:

one or more processors; and one or more non-transitory computer-readable media comprising instructions that, when executed by the one or more processors, cause the one or more processors to perform operations comprising:

receiving, via a network protocol, a seeded search query from a computing device;

vectorizing intellectual-property assets;

identifying intellectual-property assets associated with an entity based on the seeded search query and the vectorized intellectual-property assets;

identifying one or more technology areas associated with the entity;

identifying one or more revenue streams of the entity and associated with the one or more technology areas;

identifying a number of the intellectual-property assets associated with the entity and the one or more technology areas;

generating a first alignment metric based at least in part on the number of the intellectual-property assets associated with the one or more technology areas and the one or more revenue streams associated with the one or more technology areas;

determining a first percentage of revenue generated by the entity in a market based at least in part on comparing the revenue generated by the entity in the market with a total revenue generated by the entity;

determining a second percentage of intellectual-property assets directed to the one or more technology areas based at least in part on comparing the number of intellectual-property assets directed to the one or more technology areas with a total number of intellectual-property assets associated with the entity, wherein the first alignment metric includes a comparison of the first percentage and the second percentage;

generating a graphical user interface (GUI) with associated access controls;

refraining from displaying the GUI based on the access controls being associated with the GUI;

authenticating a user requesting the GUI;

displaying to the user, based on authenticating the user, the GUI configured to display at least the first alignment metric, a second alignment metric, and one or more actionable items;

determining additional entities generating revenue in the one or more technology areas;

identifying additional intellectual-property assets associated with the additional entities, the additional intellectual-property assets associated with the additional entities being associated with the one or more technology areas;

generating the second alignment metric associated with the additional entity based at least in part on the additional intellectual-property assets associated with the additional entities and the revenue generated by the additional entities in the one or more technology areas;

sending, via the network protocol over a network to the computing device, the second alignment metric;

causing, in response to receipt of the second alignment metric, the GUI of the computing device to display, without user input, the second alignment metric; and causing, in response to receipt of the alignment metric, the GUI of the computing device to display dynamic animation sequences in association with the alignment metric, the dynamic animation sequences causing animation sequences corresponding to asset indicators and alignment indicators displayed via the GUI to be dynamically displayed on-the-fly and in real time.

11. The system of claim 10, wherein the one or more technology areas are identified from a taxonomy of market sets.

12. The system of claim 10, wherein the intellectual-property assets include at least one of a patent, a trademark, or a copyright.

13. The system of claim 10, further comprising determining a percentage of the intellectual-property assets associated with the one or more technology areas is based at least in part on a training model applied to text included in at least one of the number of the intellectual-property assets.

14. The system of claim 10, further comprising determining that a first percentage of revenue generated by the entity in the market is greater than a second percentage of intellectual-property assets directed to the one or more technology areas.

15. The system of claim 10, further comprising determining that a first percentage of revenue generated by the entity in the market is less than a second percentage of intellectual-property assets directed to the one or more technology areas.

* * * * *